United States Patent
Tanner et al.

(10) Patent No.: US 7,544,224 B2
(45) Date of Patent: Jun. 9, 2009

(54) CYCLONIC VACUUM CLEANER

(75) Inventors: Mark Tanner, Normal, IL (US);
Christer Kontio, Bloomington, IL (US);
Arnold Sepke, Hudson, IL (US); Brad Chenoweth, Cooksville, IL (US)

(73) Assignee: Electrolux Home Care Products, Inc., Cleveland, OH (US)

( * ) Notice: Subject to any disclaimer, the term of this patent is extended or adjusted under 35 U.S.C. 154(b) by 877 days.

(21) Appl. No.: 10/911,384

(22) Filed: Aug. 4, 2004

(65) Prior Publication Data

US 2005/0138763 A1      Jun. 30, 2005

Related U.S. Application Data

(60) Provisional application No. 60/492,498, filed on Aug. 5, 2003.

(51) Int. Cl.
*B01D 45/12* (2006.01)

(52) U.S. Cl. .............. 55/337; 55/423; 55/429; 55/430; 55/459.1; 55/466; 55/DIG. 3; 15/350; 15/353

(58) Field of Classification Search ............... 55/337, 55/423, 426, 430, 428, 429, 459.1, 466, DIG. 3; 15/350, 353
See application file for complete search history.

(56) References Cited

U.S. PATENT DOCUMENTS

| | | | |
|---|---|---|---|
| 458,773 A | 1/1891 | Lee | |
| 941,675 A | 11/1909 | Green | |
| 963,139 A | 7/1910 | Griffiths | |
| 1,029,562 A | 6/1912 | Prentiss | |
| 1,133,543 A | 3/1915 | Duffie | |
| 1,507,271 A | 9/1924 | Bennett | |
| 1,508,315 A | 9/1924 | Brockway | |
| 1,565,318 A | 12/1925 | Fisher | |
| 1,871,111 A | 8/1932 | Campbell | |
| 2,118,167 A | 5/1938 | Connor | |
| 2,193,479 A | 3/1940 | Donaldson | |
| 2,375,608 A | 5/1945 | Young | |
| 2,482,166 A | 9/1949 | Gage | |
| 2,934,494 A | 4/1960 | Kleiber | |
| 3,543,325 A | 12/1970 | Hamrick | |

(Continued)

FOREIGN PATENT DOCUMENTS

EP     0 489 565 A1    6/1992

(Continued)

OTHER PUBLICATIONS

"Unconventional cyclone separators" by P. Schmidt, International Chemical Engineering, vol. 33, No. 1, Jan. 1993, pp. 8-17.

(Continued)

*Primary Examiner*—Robert A Hopkins
(74) *Attorney, Agent, or Firm*—Hunton & Williams

(57) ABSTRACT

A cyclonic vacuum cleaner includes a body portion, a nozzle portion and a dirt cup which is removable from the body portion. The dirt cup collects dirt and other debris separated by a cyclone and a cyclone slinger portion in the body portion. A main filter may be housed in a transparent filter door downstream of the cyclone. The dirt cup may be inserted into and sealingly held within the body portion by using a rotational camming structure.

17 Claims, 46 Drawing Sheets

U.S. PATENT DOCUMENTS

| | | | |
|---|---|---|---|
| 3,626,545 | A | 12/1971 | Sparrow |
| 3,853,518 | A | 12/1974 | Tu |
| 4,108,778 | A | 8/1978 | Lambert |
| 4,593,429 | A | 6/1986 | Dyson |
| 4,678,588 | A | 7/1987 | Shortt |
| 4,853,008 | A | 8/1989 | Dyson |
| 4,944,780 | A | 7/1990 | Usmani |
| 5,078,761 | A | 1/1992 | Dyson |
| 5,080,697 | A | 1/1992 | Finke |
| 5,106,488 | A | 4/1992 | Jonasson |
| 5,135,552 | A | 8/1992 | Weistra |
| 5,160,356 | A | 11/1992 | Dyson |
| 5,230,722 | A | 7/1993 | Yonkers |
| 5,248,323 | A | 9/1993 | Stevenson |
| 5,287,591 | A | 2/1994 | Rench |
| 5,307,538 | A | 5/1994 | Rench |
| 5,350,432 | A | 9/1994 | Lee |
| 5,725,623 | A | 3/1998 | Bowerman |
| 5,779,745 | A | 7/1998 | Kilstrom |
| 5,840,103 | A | 11/1998 | Dyson |
| 5,853,440 | A | 12/1998 | Dyson |
| 5,858,038 | A | 1/1999 | Dyson |
| 5,893,936 | A | 4/1999 | Dyson |
| 5,914,416 | A | 6/1999 | Thode |
| 5,935,279 | A | 8/1999 | Kilstrom |
| 5,950,274 | A | 9/1999 | Kilstrom |
| 6,003,196 | A | 12/1999 | Wright |
| 6,026,540 | A | 2/2000 | Wright |
| 6,070,291 | A | 6/2000 | Bair |
| 6,085,382 | A | 7/2000 | Bobrosky |
| 6,141,826 | A | 11/2000 | Conrad |
| 6,192,550 | B1 | 2/2001 | Hamada |
| 6,238,451 | B1 | 5/2001 | Conrad |
| 6,260,234 | B1 | 7/2001 | Wright |
| 6,269,518 | B1 | 8/2001 | Yung |
| 6,332,239 | B1 | 12/2001 | Dubos |
| 6,334,234 | B1 | 1/2002 | Conrad |
| 6,341,404 | B1 | 1/2002 | Salo |
| 6,350,292 | B1 | 2/2002 | Lee |
| 6,558,453 | B2 | 5/2003 | Sepke |
| 6,596,045 | B2 * | 7/2003 | Qian .......................... 55/337 |
| 6,829,804 | B2 | 12/2004 | Sepke |
| 2002/0029436 | A1 | 3/2002 | Hawkins |

FOREIGN PATENT DOCUMENTS

| | | | |
|---|---|---|---|
| EP | 0 885 585 | A1 | 12/1998 |
| EP | 0 966 912 | A1 | 12/1999 |
| EP | 1 157 650 | A2 | 11/2001 |
| EP | 1 199 023 | A1 | 4/2002 |
| FR | 1468142 | | 2/1967 |
| GB | 1111074 | | 4/1968 |
| GB | 2298598 | A | 9/1996 |
| GB | 2367512 | A | 4/2002 |
| JP | 54-121568 | | 9/1979 |
| JP | 8-322769 | | 12/1996 |
| SE | 119307 | | 7/1947 |
| WO | WO 99/22873 | | 5/1999 |
| WO | WO 99/22874 | | 5/1999 |
| WO | WO 00/21428 | | 4/2000 |
| WO | WO 00/49932 | | 8/2000 |
| WO | WO 00/64321 | | 11/2000 |
| WO | WO 02/03844 | A1 | 1/2002 |
| WO | WO 02/03845 | A1 | 1/2002 |
| WO | WO 02/03846 | A1 | 1/2002 |
| WO | WO 2004/026485 | A1 | 4/2004 |
| WO | WO 2004/030508 | A1 | 4/2004 |

OTHER PUBLICATIONS

"Chapter 6: Centrifugal Separators" Industrial Gas Cleaning Second Edition, by W. Strauss, Pergamon Press, 1975, pp. 216-276.

Eureka Lightweight Upright Vacuum Cleaner Owner's Guide 410 Series (© 2000).

9 pictures of the Eureka Lightweight Upright Vacuum Cleaner 410 Series (© 2000).

"Cyclone Separator For Vacuum Cleaners" by Per Fonser, Nov. 1995.

Enstaubungstechnik, by Dr. Ing. Wilhelm Batel, 1972.

"Chapter 7: Cyclone Dust Separators" Dust Control And Air Cleaning, by R.G. Dorman, Pergamon Press, pp. 236-279, 1974.

* cited by examiner

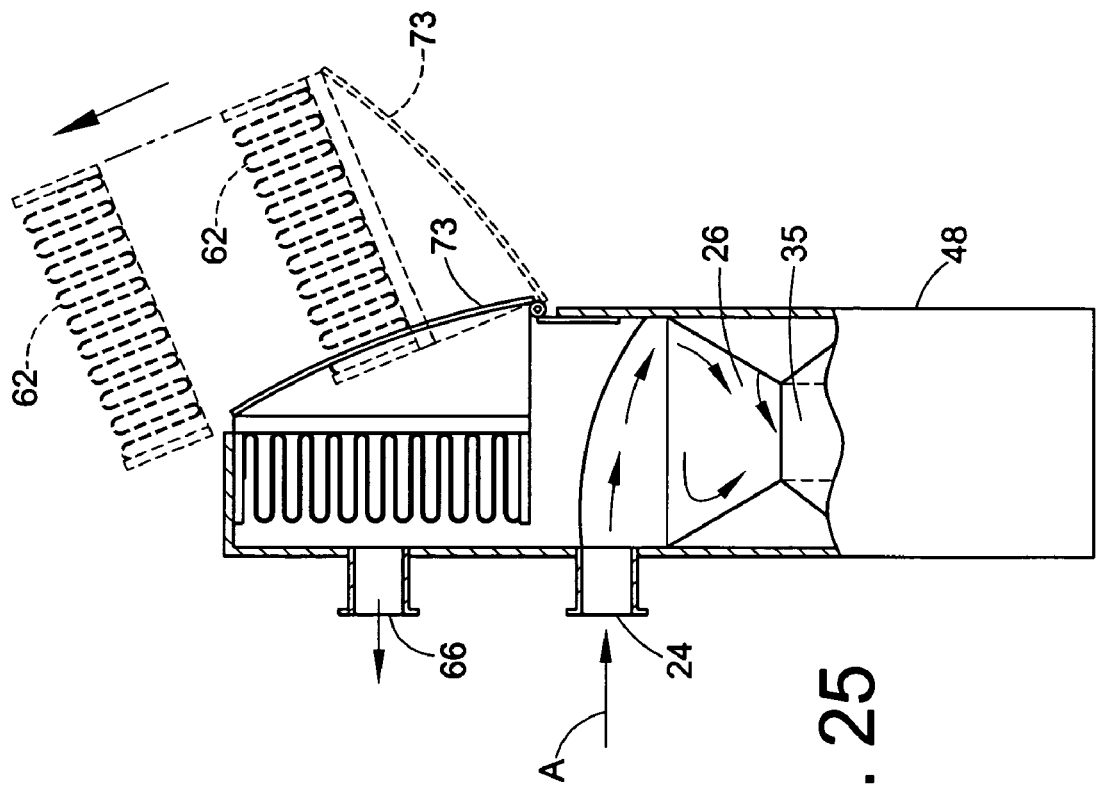
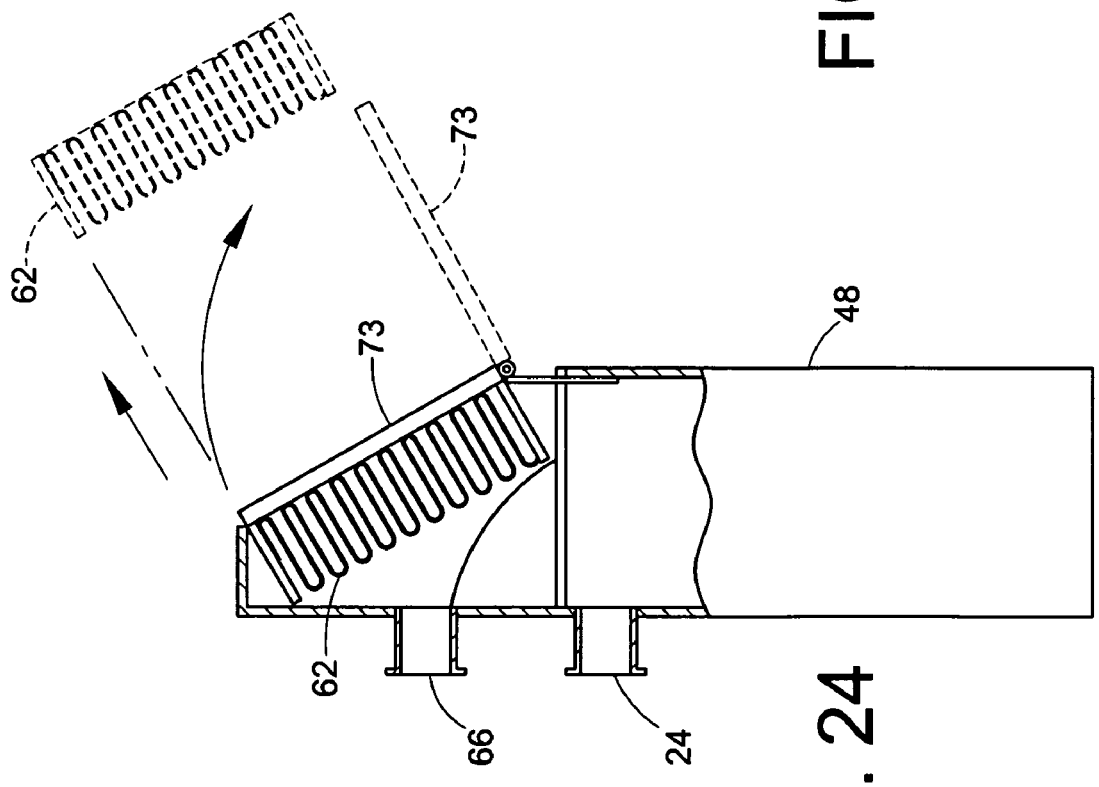
FIG. 25
FIG. 24

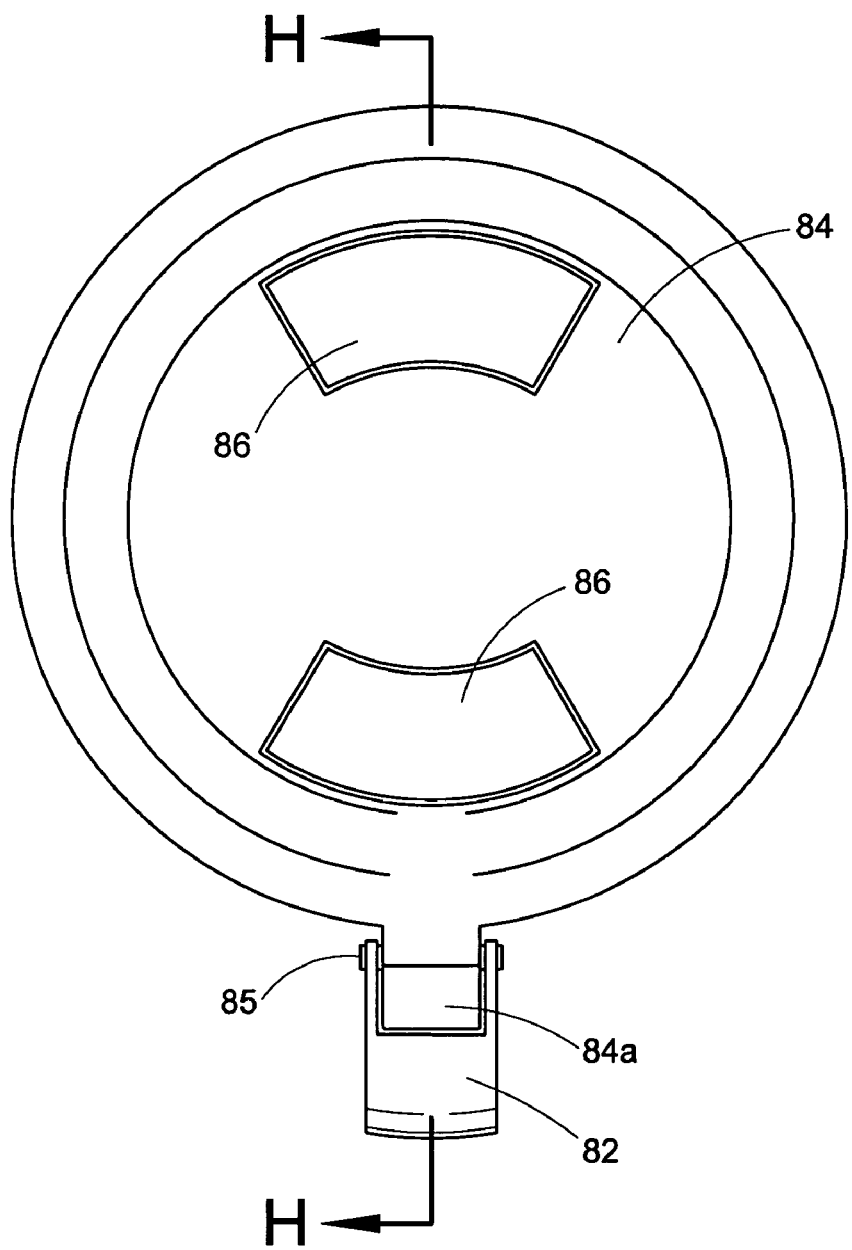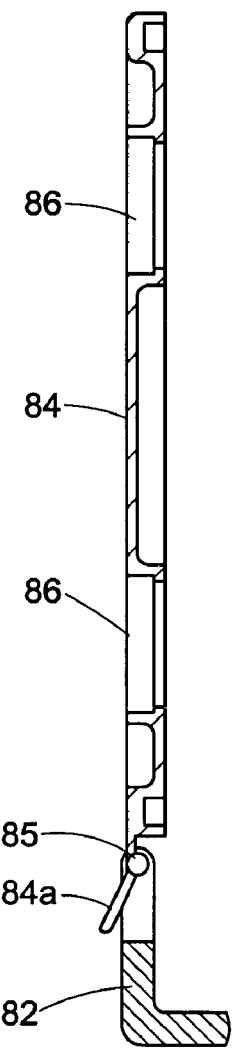
FIG. 38G
FIG. 38H

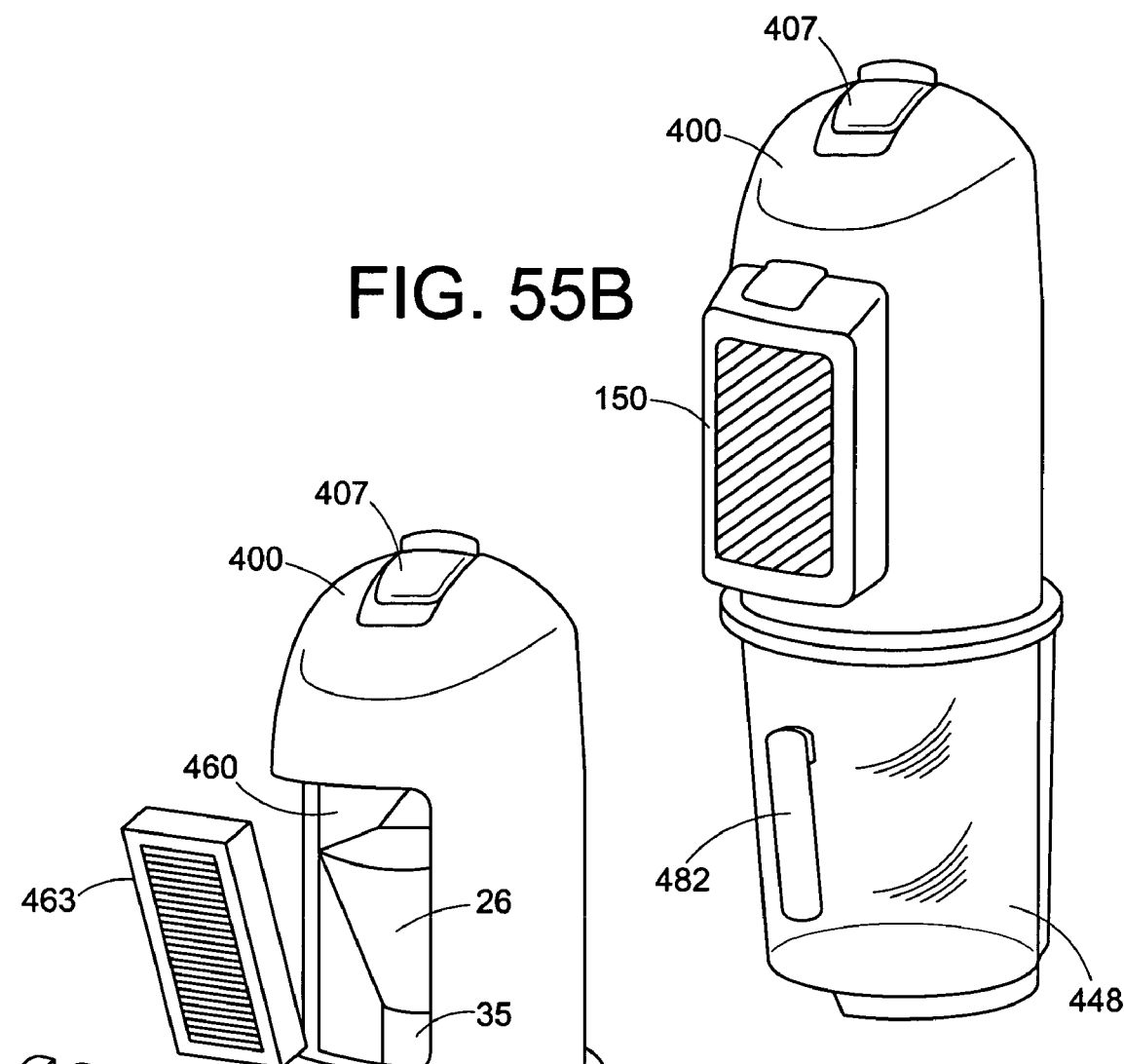
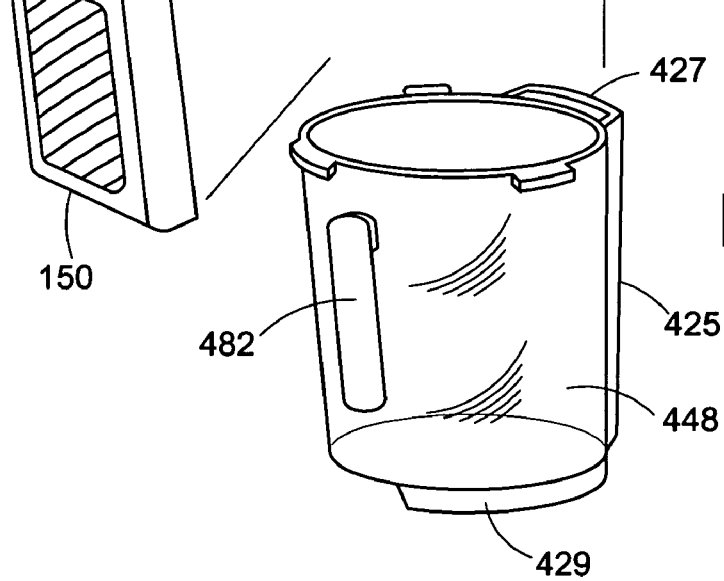

CYCLONIC VACUUM CLEANER

RELATED APPLICATION

This application claims the benefit of U.S. Provisional patent application Ser. No. 60/492,498 filed on Aug. 5, 2003, the entire disclosure of which is hereby fully incorporated by reference.

FIELD OF THE INVENTION

The present invention concerns a cyclonic vacuum cleaner. In particular it concerns a structure and method whereby the efficiency of cyclonic separation of dirt from air may be enhanced. The structure and method have additional applicability to cyclonic separation outside of the vacuum cleaner field.

BACKGROUND OF THE INVENTION

Cyclonic separation systems in all types of vacuum cleaners, particularly but not exclusively bagless cleaners, are well known. Examples of cyclonic separation systems in upright cleaners include U.S. Pat. Nos. 6,026,540 to Wright, et al. and U.S. Pat.No. 5,078,761 to Dyson. Examples of cyclonic separation systems in canister cleaners include U.S. Pat. Nos. 5,248,323 to Stevenson, et al. and U.S. Pat. No. 5,080,697 to Finke, et al. Examples of cyclonic separation systems in central cleaners include U.S. Pat. Nos. 4,944,780 to Usmani and U.S. Pat. No. 3,626,545 to Sparrow, et al.

Many of these bagless cyclonic vacuum cleaners utilize the dirt cup as the cyclonic separation chamber or as one of several cyclonic separation chambers. Many further utilize a filter positioned directly in the cyclonic chamber and / or in the dirt cup. See for example the patents referenced above, respectively granted to Wright, Dyson, Stevenson, Finke, Usmani and Sparrow.

It is well known to form the cyclonic separation chamber of a vacuum cleaner in a frustoconical shape. See for example the Dyson patent referenced above, as well as U.S. Pat. No. 5,307,538 to Rench, et al.

It has been previously known for vacuum cleaners to be designed with two cyclones in a series, a first cyclone for separating relatively coarse or large particles and a second cyclone for separating relatively fine or smaller particles. It has been known to dispose these first and second cyclones coaxially, so that the first cyclone forms a dirt cup which surrounds the second cyclone and holds dirt separated from both cyclones. See, for example, the Dyson patent referenced above.

Several configurations have been known for collecting dirt cyclonically separated from a suction airstream in a vacuum cleaner for retention and eventual disposal. For example, the cyclonic chamber may itself be defined by a dirt cup which collects the dirt separated cyclonically from the airstream, as in the Dyson and Wright patents referenced above. In those systems, however, the dirt can some times become re-entrained in the suction airstream and so reduce the efficiency of dirt separation. It has therefore also been known to collect cyclonically separated dirt in a dirt collection chamber which is separate from the cyclonic chamber. For example, in each of U.S. Pat. No. 6,332,239 B1 to Dubos, et al., U.S. Pat. No. 6,350,292 B1 to Lee, et al., and European patent application EP 0 966 912 A1 to Tuvin, dirt exits the cyclonic chamber via an exit port disposed in the side of the cyclonic chamber at an opposite end from where cyclonic airflow starts. The dirt flows through a channel leading away from an exit port and down into a dirt cup for collection.

SUMMARY OF THE INVENTION

The present invention involves a new cyclone separator design and method useful in vacuum cleaners and other cyclonic separators. The new design incorporates a slinger assembly disposed at the bottom of the cyclone separator. The slinger assembly increases the efficiency of cyclonic separation in a small space and substantially isolates the dirt collected in the dirt cup from the cyclonic chamber of the vacuum cleaner. This acts to prevent dirt collected in the dirt cup from becoming re-entrained in the working airstream. Moreover, in this way the interior of the dirt cup may be kept substantially free of any other structures, such as a second cyclone or a filter, so that the entire volume of the dirt cup may be used to collect and hold dirt and the dirt cup is easier to empty.

The present invention also involves use of a post-cyclone, pre-motor filter chamber with a door which facilitates filter removal and maintenance. The filter is mounted in a transparent door, so that the user may see the side of the filter which collects dirt without opening the door but then handles the opposite, clean side of the filter when removing it for maintenance. This greatly facilitates cleaning and replacing the filter.

The present invention further involves a camming structure used to insert and retain a dirt cup in the body of a vacuum cleaner so that a good seal is maintained in the airflow passages of the vacuum cleaner.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated. These drawings, together with the general description of the invention given above and the detailed description given below, serve to example the principles of this invention.

FIG. 24 is a schematic sectional view taken vertically through a main filter contained in a filter chamber disposed above a dirt cup such that when the filter door is opened the main filter stays within the filter chamber.

FIG. 25 is a schematic sectional view taken vertically through a main filter contained in a filter chamber disposed above a dirt cup such that when the filter door is opened the main filter comes away with the door.

FIG. 38G is a top plan view of a lid on a dust cup having a handle and a hinge, the lid having two openings for passage of dirt and other debris sealed by gaskets and gasket flaps.

FIG. 38H is a sectional view taken along line H-H in FIG. 38G.

FIG. 48A shows the relationship just as rotation of the dust cup begins. FIG. 48B shows the projections on the dirt cup following the ramps on the cam rib during rotation of the dirt cup, so that the dirt cup is cammed upwardly. FIG. 48C shows the final resting place of the dirt cup, where the projections have just passed bumps on the cam rib.

FIG. 55A is a telescopic perspective view of the embodiment of FIG. 54, illustrating the dirt cup being separated from the cyclone starter and filter module as well as the filter cover and filter removed from the upper module.

FIG. 55B is a perspective view of the embodiment of FIG. 54 showing the dirt cup assembled to the cyclone starter and filter module.

DETAILED DESCRIPTION OF THE PREFERRED EMBODIMENTS

Figure 1:
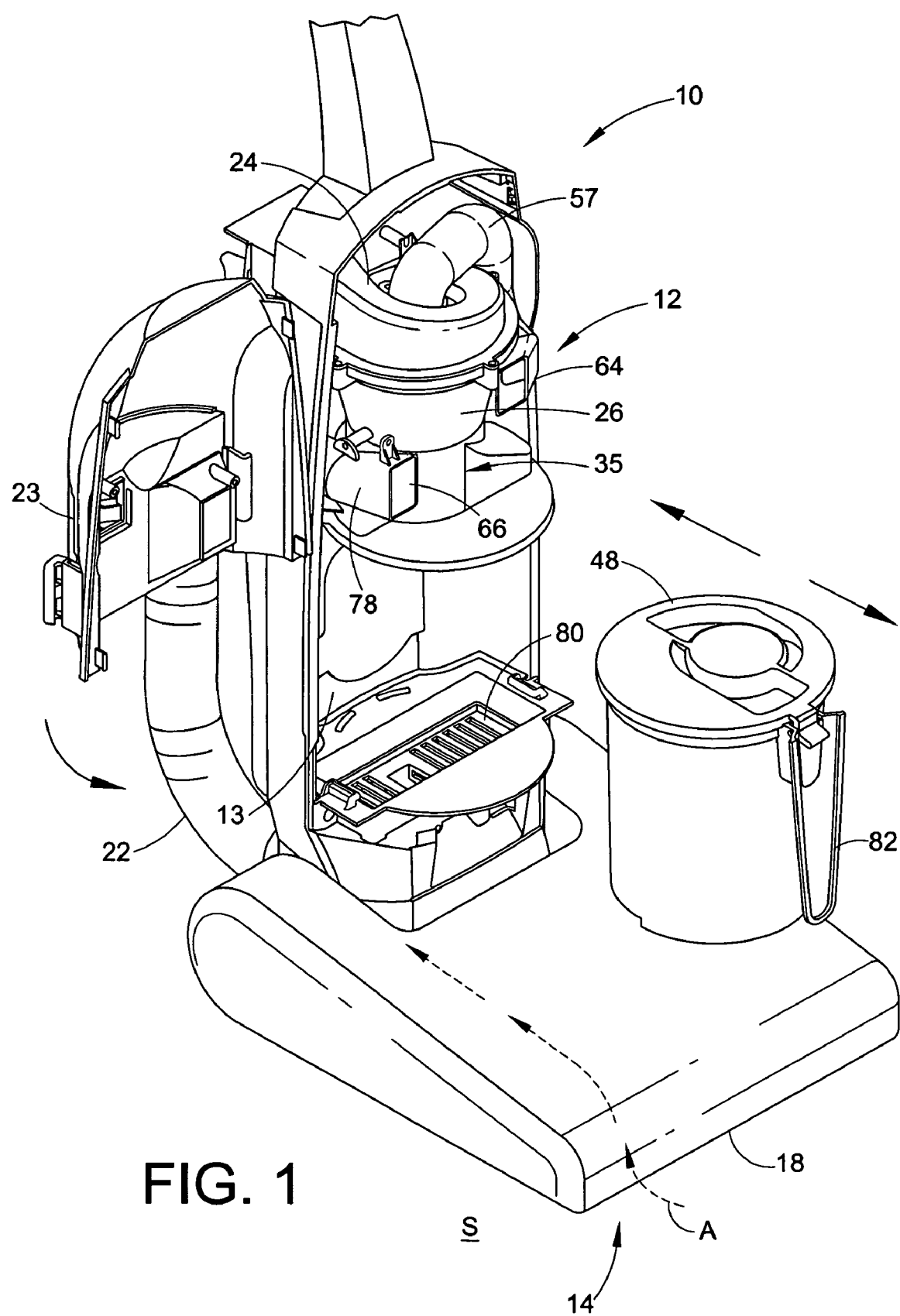
FIG. 1 is a front, right, top perspective view of one embodiment of an upright vacuum cleaner incorporating the cyclone separation system of the present invention, with a filter door embodiment swung to an open position for ease of illustration. An optional partition wall separating the cyclonic dirt separation portion and the filter door is not shown so that the cyclonic dirt separation portion may be seen.

Referring now to the drawings in which like numerals designate like parts throughout the various views, preferred embodiments of a bagless cyclonic vacuum cleaner 10 are shown. FIG. 1 illustrates a vacuum cleaner 10 comprising an upright body 12 hingedly mounted to a base 14. The base 14 includes a nozzle opening 18 and wheels (not shown) for easy movement of the vacuum cleaner 10 over a surface S to be cleaned by pulling dirt and other debris into the nozzle opening 18. An airstream A is generated at the nozzle opening 18 by a motor and fan assembly 20 (FIG. 2), or some other suction generator. As it enters the nozzle opening 18 the airstream A is carrying dirt and other debris from the surface S to be cleaned. A brush roll may be disposed in or near the nozzle opening 18 to aid in removing dirt and debris from the surface S to be cleaned. The dirt and debris are thereafter filtered from the airstream A in one or more filtration stages, as described below. The Figures show a "clean air" system, wherein substantially all of the filtration occurs before the airstream A passes through the motor and fan assembly 20, best shown in FIG. 2. The invention may just as easily be practiced with a "dirty air" system (not shown in the Figures), wherein the airstream A first passes through the motor and fan assembly 20 before proceeding to the filtration stages.

Figure 2:
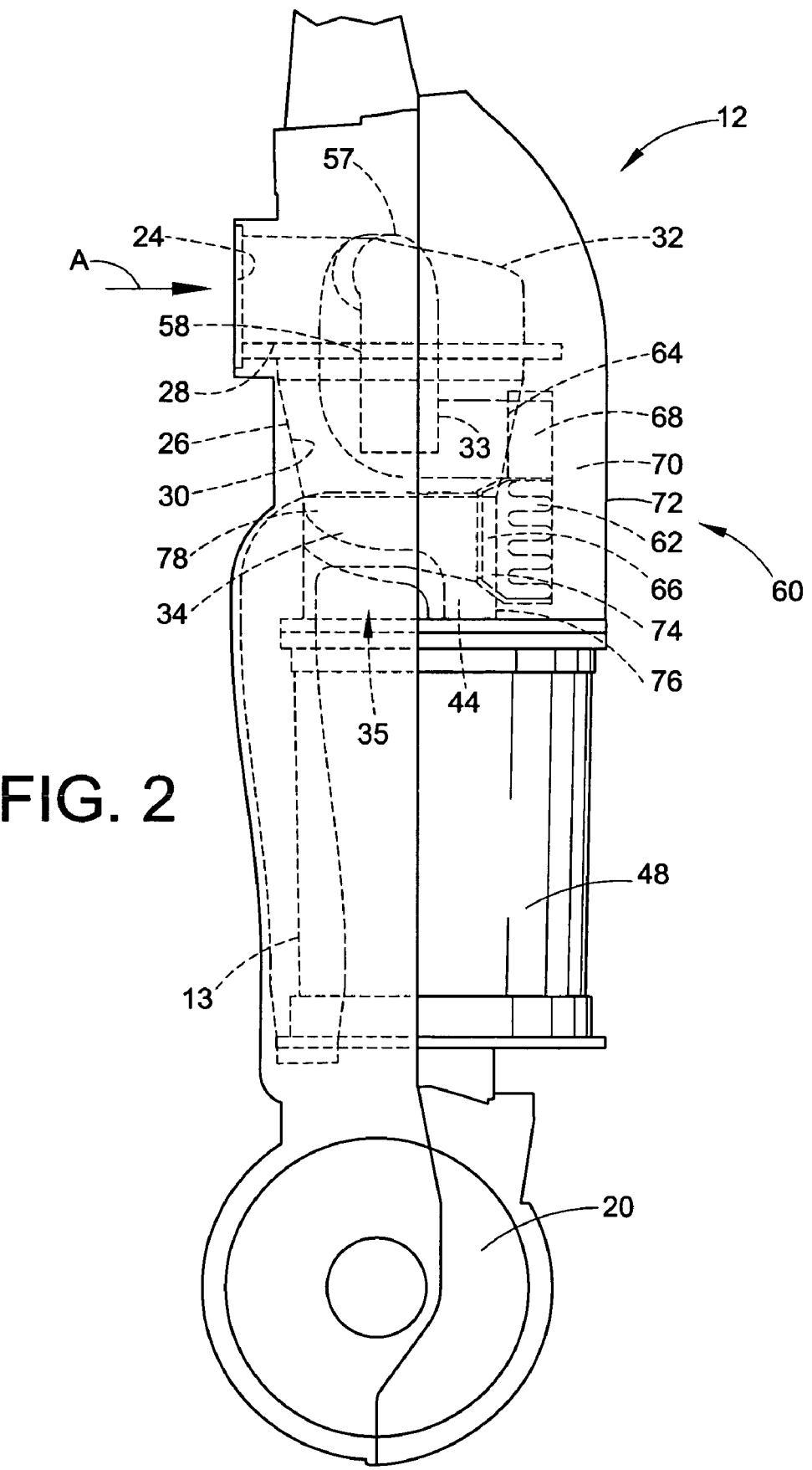
FIG. 2 is a schematic side elevation of the cyclone separation system of the embodiment shown in FIG. 1, with the filter door closed.
Figure 3:
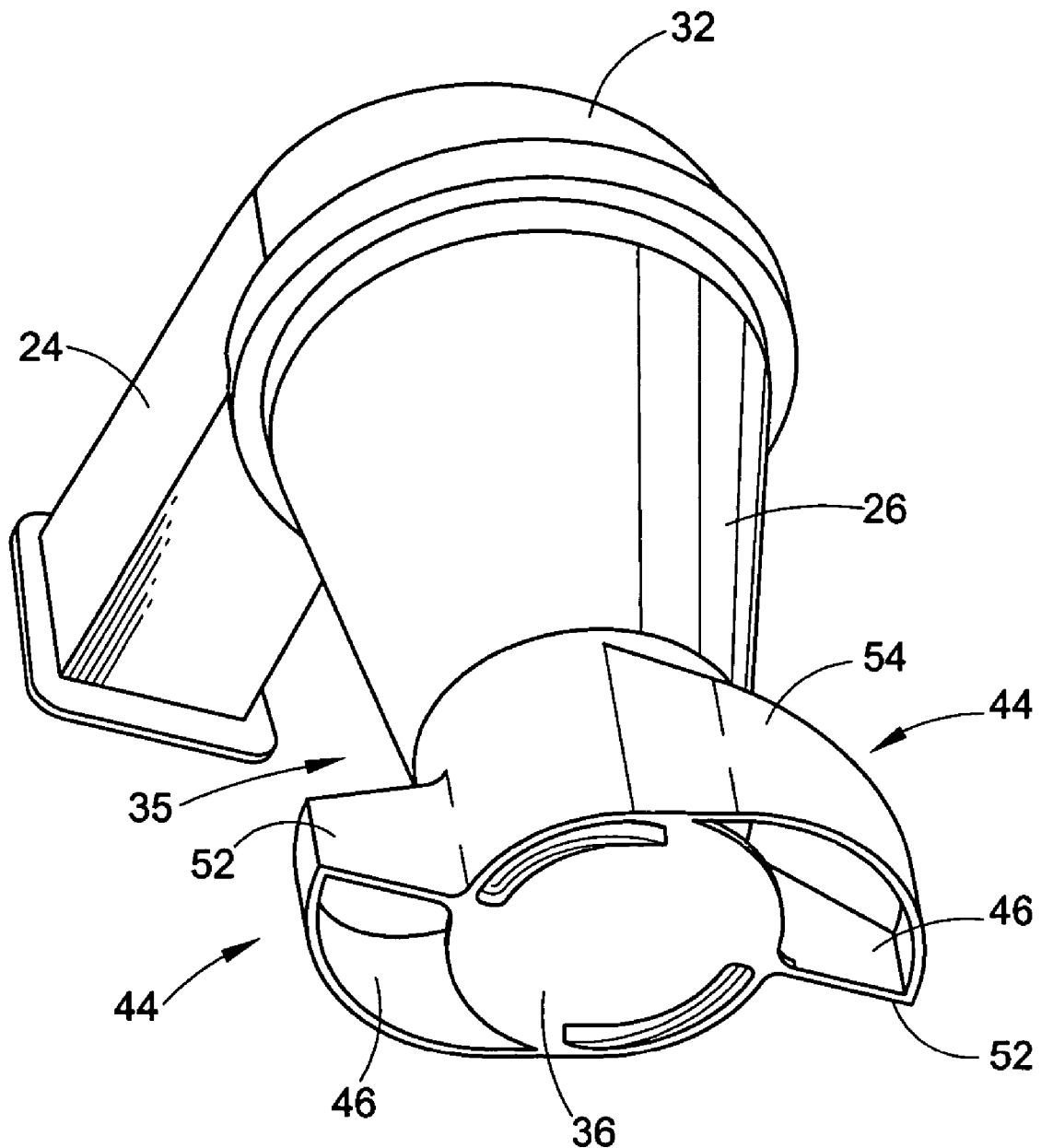
FIG. 3 is a front, right, bottom perspective view of the cyclone separation system shown in FIG. 1, with details of the two slinger arms being illustrated.
Figure 4:
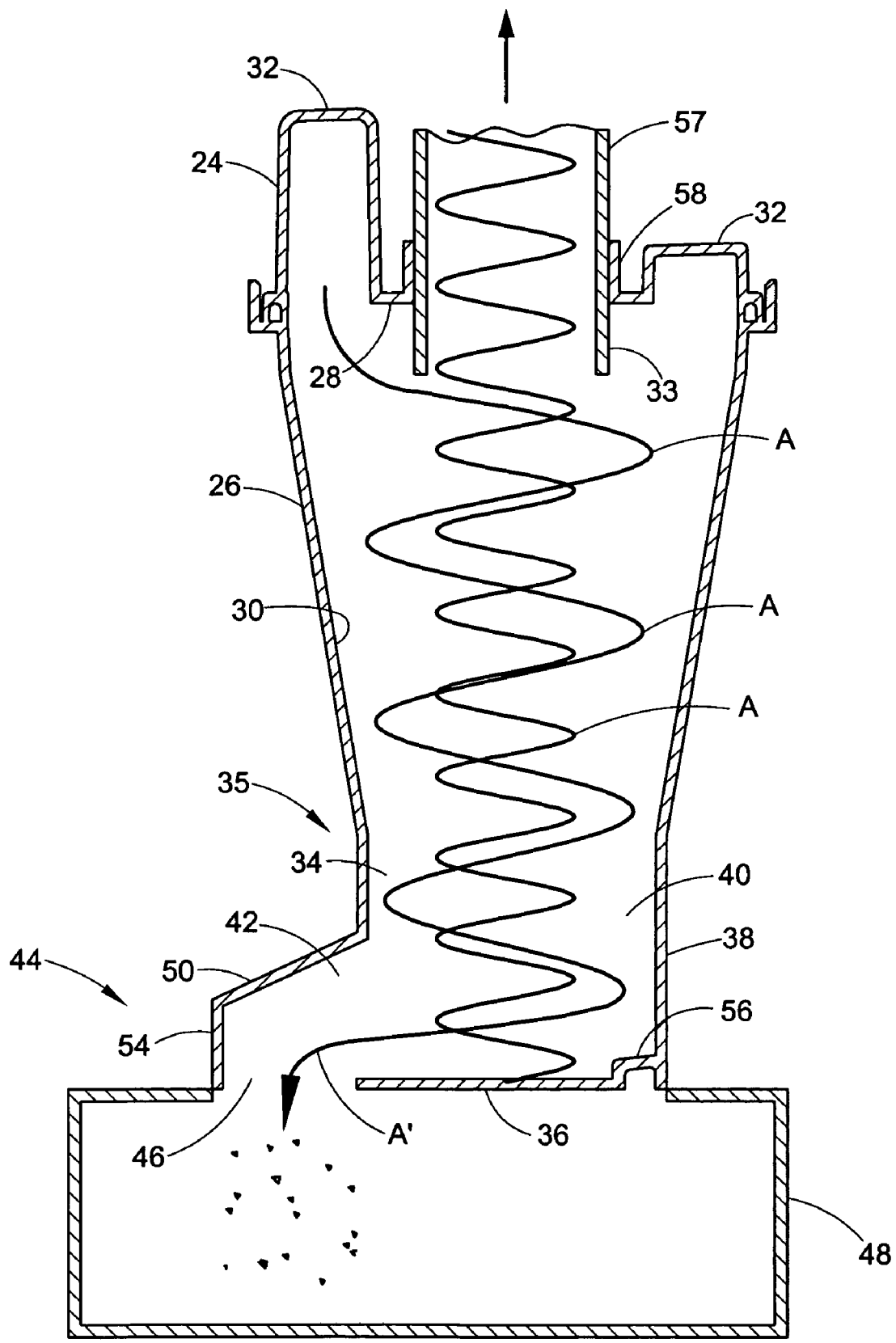
FIG. 4 is a schematic sectional view taken vertically through the cyclone separation system shown in FIG. 3, including the subjacent dirt cup of the embodiment of FIG. 1, illustrating the entering and exiting air flow paths, one of the two slinger arms, and the return air platform at the bottom of the slinger portion of the cyclone.

A conduit 22 carries the airstream A from the nozzle opening 18 to an inlet 24 of a cyclone 26, shown in FIGS. 2-4. The inlet 24 can be a helical entry ramp to the cyclone 26 or a tangential entry to a sidewall of the cyclone 26 or some other well known cyclone starter. The cyclone 26 acts as a first filtration stage that cyclonically separates from the airstream A relatively large particles of dust, dirt fibers and other debris commonly picked up by a vacuum cleaner, such as paper clips, rubber bands and the like. Typically such a cyclone 26 has a cylindrical configuration or, as shown for example in the Figures, a frustoconical configuration. However any configuration suitable for a cyclone may be employed. The frustoconical configuration is preferred here because the decreasing circumference of air circulation acts to increase the rotational velocity of the airflow A as it proceeds axially downward in the cyclone 26. This increased rotational speed results in an increase of centrifugal force acting to separate dirt and debris from the airstream A, thus enhancing efficiency. In this way the frustoconical configuration separates finer particles from the airstream A than would a cylindrical configuration. Although the slinger structure described further below will work efficiently when mated with a cylindrically configured cyclone, efficiency of particle separation is slightly inferior to that provided in a frustoconical form.

The cyclone inlet 24 is disposed near the top wall 28 of the cyclone 26 (FIG. 2) and is configured so that the airstream A enters the cyclone 26 tangentially. This creates a swirling airflow along the interior surface 30 of the cyclone 26, causing dirt and debris to separate or precipitate out of the airstream A cyclonically by centrifugal force. The cyclonically separated or precipitated dirt proceeds down in the cyclone 26 along or close to its interior surface 30 until it enters a slinger chamber 34 disposed at the bottom of the cyclone 26. As further discussed below, finer dirt and other debris may remain entrained in the airstream A after it passes all the way through the cyclone 26, so further filtration steps are preferably utilized.

The configuration of the cyclone 26 may be optimized to improve cyclonic separation of dirt and other debris from the airstream A. For example, the top wall 28 of the cyclone 26 may be in the shape of a spiral ramp 32 to drive the airstream A axially downward into the cyclone 26. Alternatively or in addition to the spiral ramp 32, a center tube 33 may depend downwardly from the top wall 28 of the cyclone 26 into the cyclone chamber. Use of such a center tube 33 encourages the dirt-entrained airstream A entering the cyclone inlet 24 to follow a swirling path along the interior surface 30 of the cyclone 26.

The airstream A helically passes through the cyclone 26 to reach a cyclone slinger portion generally indicated at 35. The cyclone slinger portion 35 is comprised of a slinger chamber 34 and one or more slinger passages or arms 44, as shown in FIGS. 3-8. The slinger chamber 34 is defined by a bottom wall or platform 36, a peripheral wall 38 and an open top 40. The bottom wall 36 is of non-porous construction and acts as a central vortex return air platform because it does not contain any ports for the passage of air or dirt. Conversely the peripheral wall 38 of the slinger chamber 34 has one or more slinger expansion ports 42, as best shown in FIG. 4. Each one of these expansion ports 42 leads to a slinger passage or arm 44 which extends from the slinger chamber 34. The slinger arms 44 may extend outwardly from the slinger chamber 34 in a radial direction, and preferably also in a tangential direction either following the swirling direction of the airflow A (as shown in the Figures) or a tangential direction opposite the swirling direction of the airflow A. Each slinger arm 44 leads to a bottom exit port 46 opening into a dust cup 48 positioned in a receptacle 13 below the cyclone 26 and slinger arms 44 (FIG. 1). The dust cup 48 is removably disposed in the upright body 12 for the collection of dirt and other debris separated from the airstream A by the cyclone 26 or the cyclone slinger portion 35.

The cyclonically flowing airstream A exits from the bottom of cyclone 26 and enters the slinger chamber 34 via the open top 40. The open top 40 of the slinger chamber 34 may have any configuration and size. As shown in the Figures, the open top 40 preferably may be approximately circular in shape with approximately the same diameter as the exit from the cyclone 26, in order not to interfere with the cyclonic flow of the airstream A. This promotes continued cyclonic separation of dirt from the airstream A as it passes through the slinger chamber 34. Dust and debris cyclonically separated from the airstream A either in the cyclone 26 or the slinger chamber 34 is centrifugally swept by the cyclonically moving air into the slinger arm(s) 44.

Any number of slinger arm(s) 44 may be used, and any configuration of multiple slinger arms 44 around the slinger chamber 34 may be employed. When two or more slinger arms 44 are employed, it is preferred that they be evenly disposed around the circumference of the slinger chamber 34. For example, FIGS. 1-8 illustrate two slinger arms 44 disposed approximately 180° apart from each other around the circumference of the slinger chamber 34. It is believed this kind of distribution of multiple slinger arms acts to balance out the airflow and thus leads to a more stable and predictable suction airstream flow path.

Figure 9:
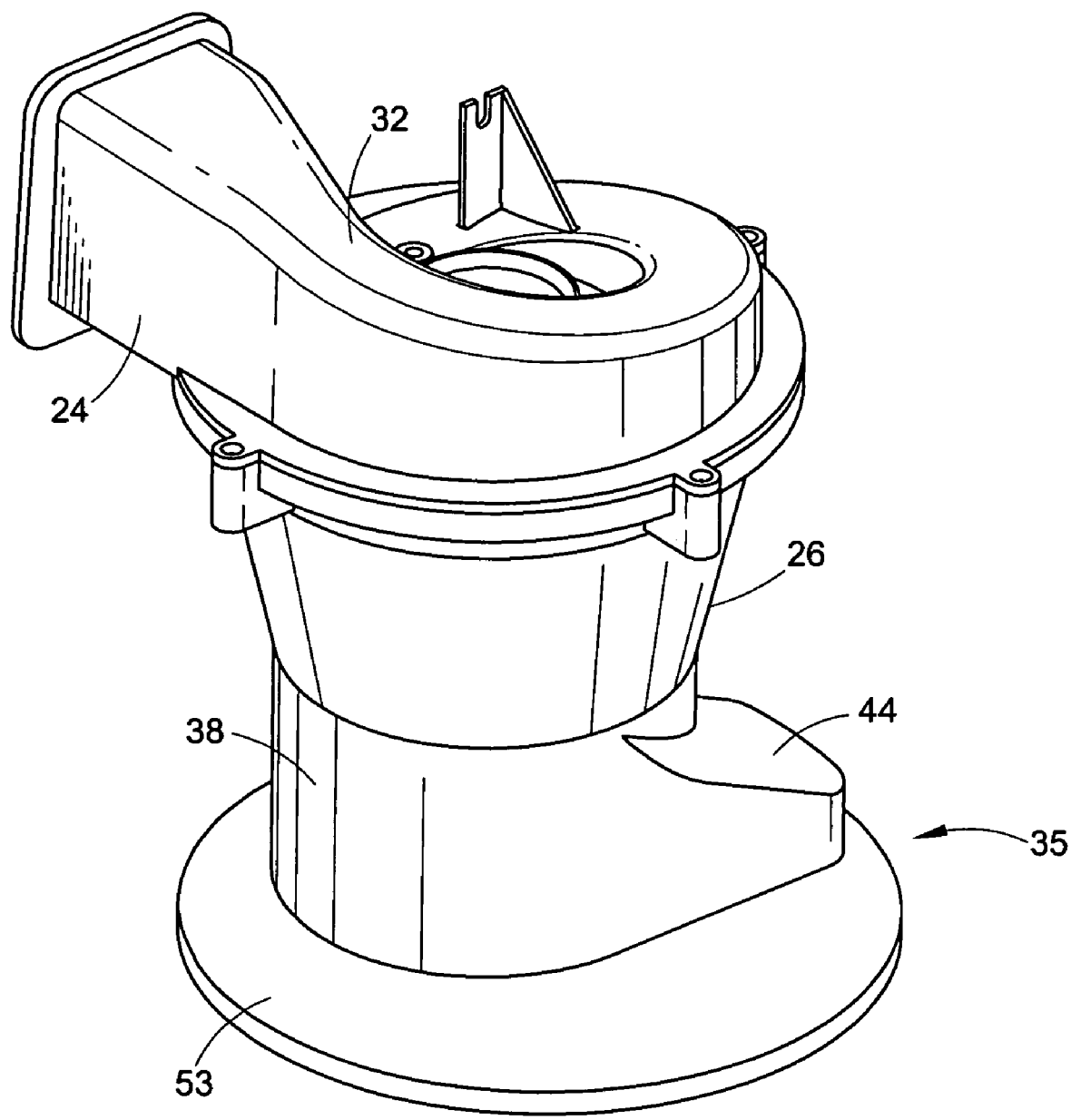
FIG. 9 is a perspective view of a cyclone including a cyclone slinger portion having a cylindrical side wall.
Figure 10:
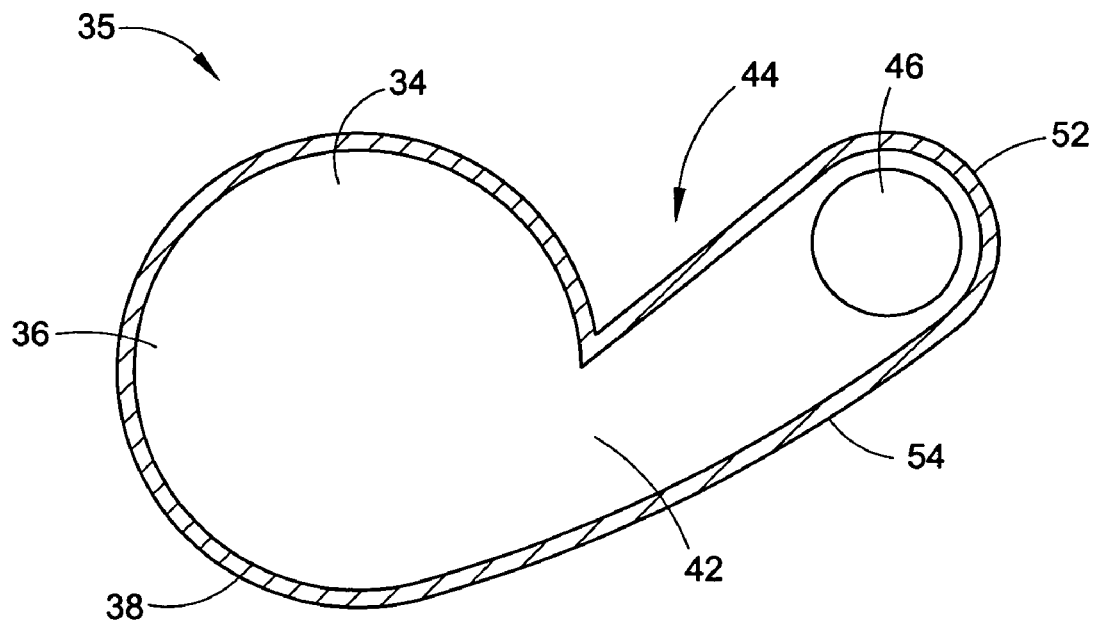
FIG. 10 shows a sectional view taken along line 10-10 in FIG. 11 of a cyclone slinger portion with a slinger arm lengthened so that the exit port is far away from the slinger chamber.
Figure 11:
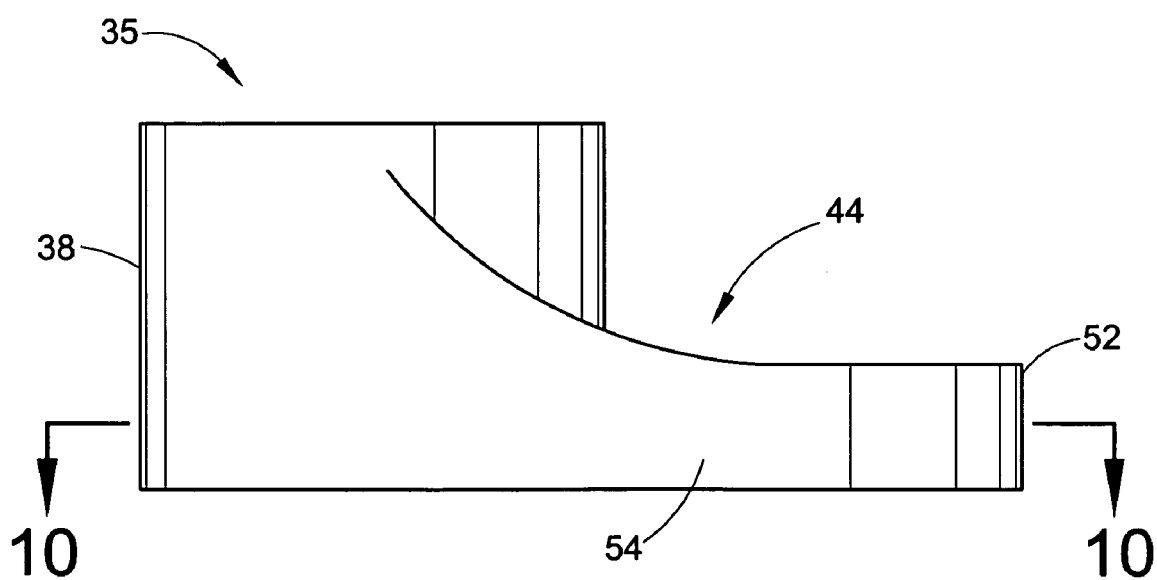
FIG. 11 shows a side view of a cyclone slinger portion with a slinger arm lengthened so that the exit port is far away from the slinger chamber.

Just one slinger arm may also be employed, as shown in FIG. 9. Use of only one slinger arm might be preferred over multiple slinger arms for any one of several reasons. For example, it leaves more space in the overall vacuum cleaner assembly for other parts to fit; it provides a wider passage to discourage clogs; it allows the slinger arm passage to be lengthened so that the exit port 46 is extended further radially outwardly from the slinger chamber 34 (see FIGS. 10 and 11);

and it reduces the number and simplifies the configuration of the sealing arrangements required to maintain good suction and prevent dirt from escaping the vacuum cleaner.

Figure 12:
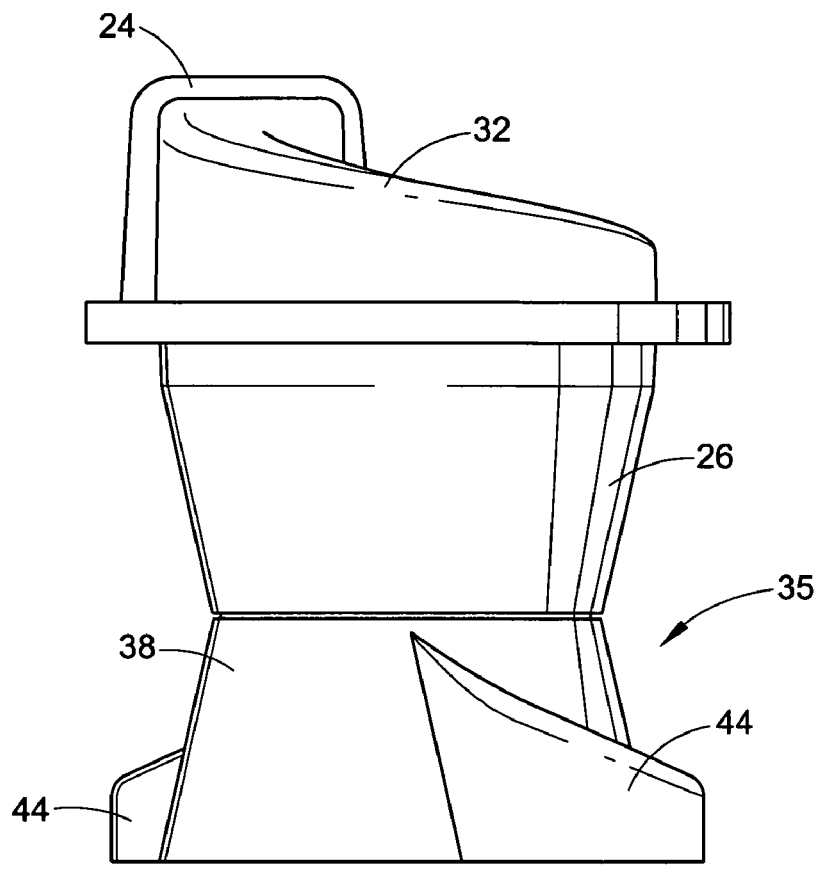
FIG. 12 is a side view of a cyclone including a cyclone slinger portion having a frustoconical side wall, where the diameter of the cone increases in the downward axial direction.
Figure 13:
FIG. 13 is a side view of a cyclone including a cyclone slinger portion having a frustoconical side wall, where the diameter of the cone continually decreases in the downward axial direction.

The peripheral wall 38 of the slinger chamber 34 is preferably configured to promote cyclonic airflow within the slinger chamber 34. For example, the peripheral wall 38 may have a cylindrical configuration as shown in FIG. 9. It may alternatively have a frustoconical configuration, as shown in FIG. 12 (where the diameter of the cone increases in the downward axial direction) and FIG. 13 (where the diameter of the cone decreases in the downward axial direction), or any other configuration compatible with cyclonic airflow. The cyclone slinger portion 35 may be manufactured as a separate component and assembled to a cyclone portion, or it may be integrally manufactured therewith.

Figure 5:
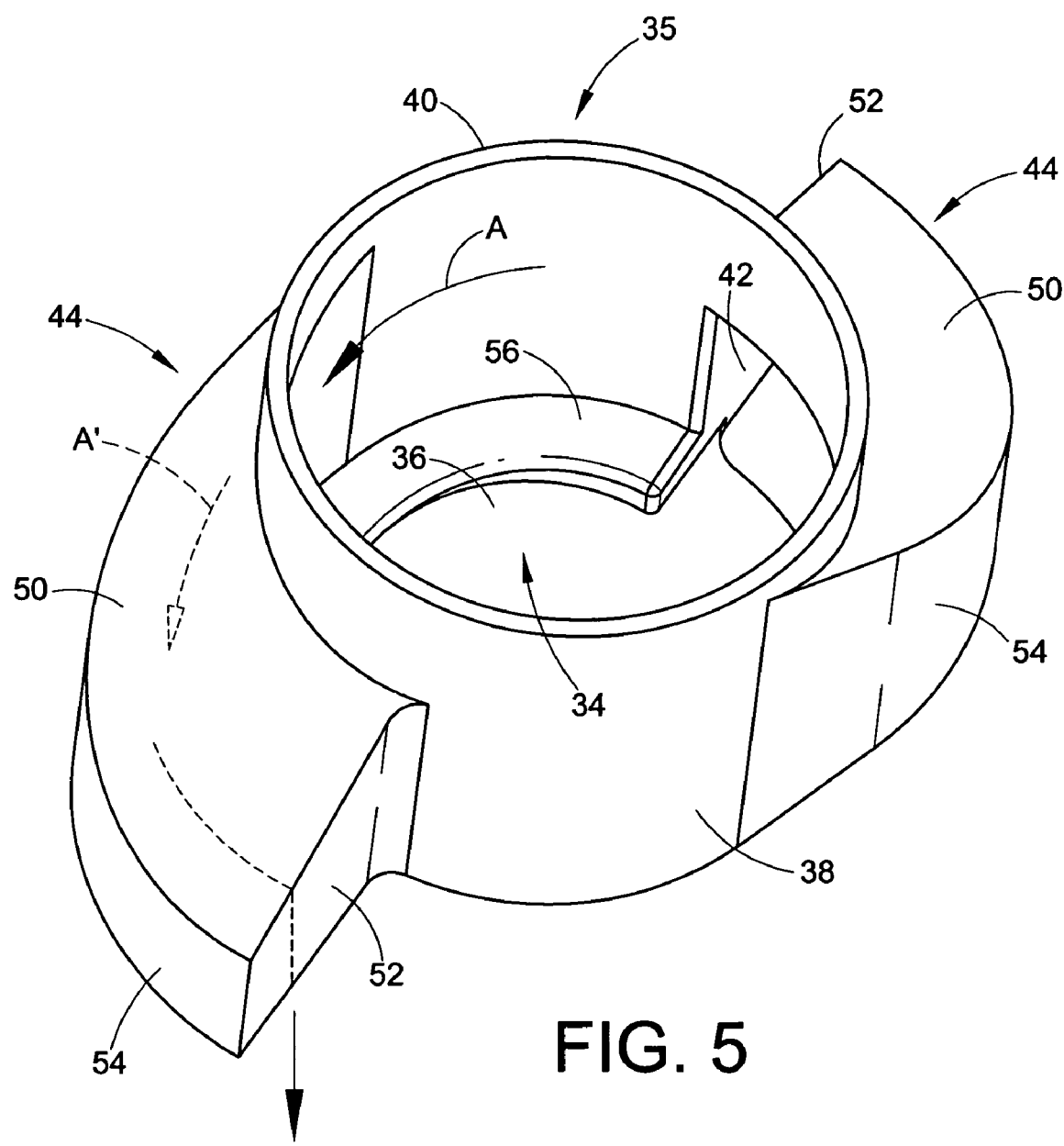
FIG. 5 is a front, top, right perspective of the slinger portion of the cyclone separation system of FIG. 3, looking from the top and showing the two slinger arms tangentially extending from the generally cylindrical center section and a ramp in the return air platform to break up dirt clumps or bundles, and showing the entering dust-laden air path moving tangentially from the slinger chamber into and through the slinger arms, and then downwardly to the dust cup (not shown) below the cyclone slinger portion.
Figure 6:
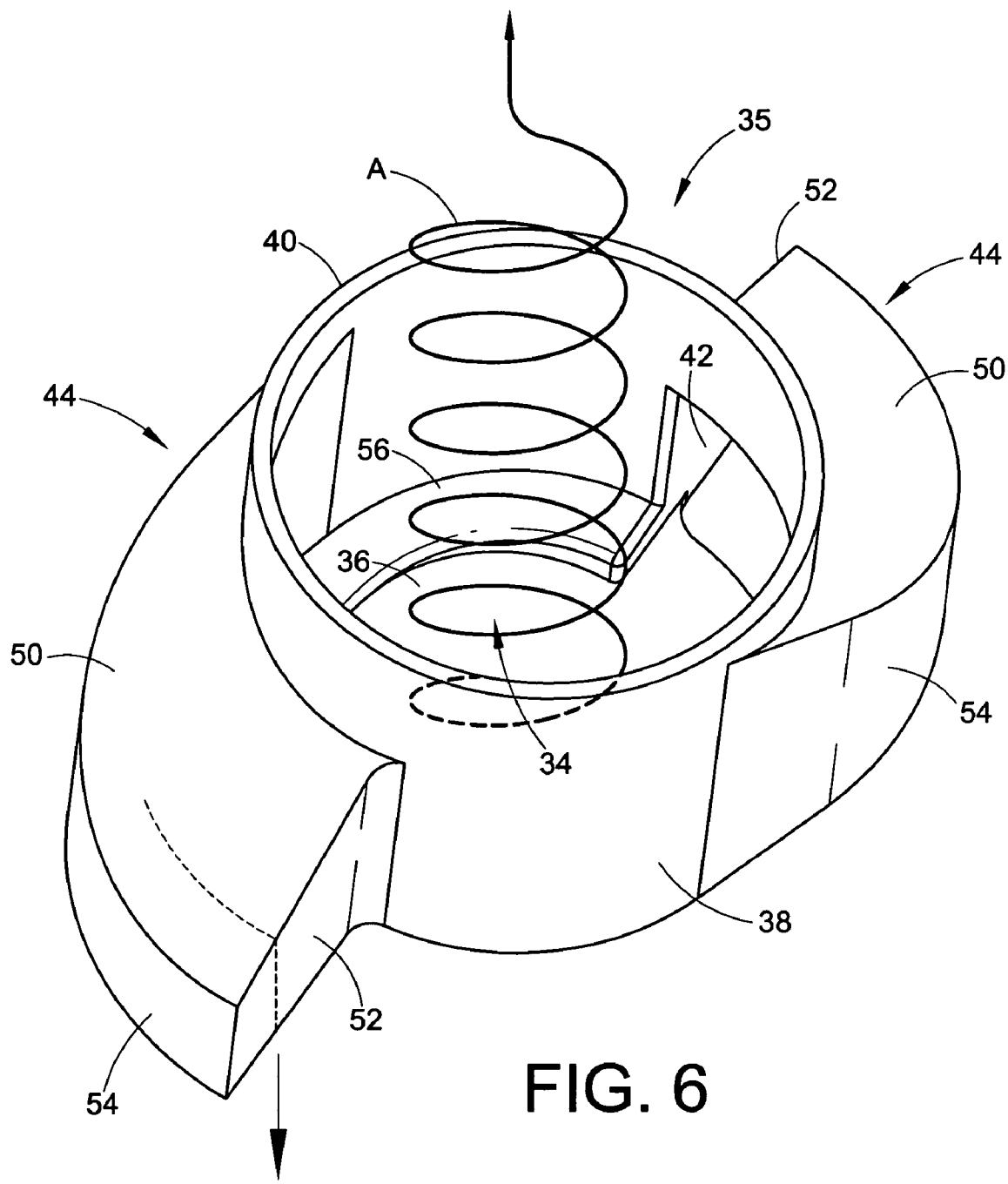
FIG. 6 is another view of the cyclone slinger portion of FIG. 5, schematically showing the return air platform at the bottom of the cyclone slinger portion assisting in returning relatively clean air back to the central part of the cyclone.
Figure 8:
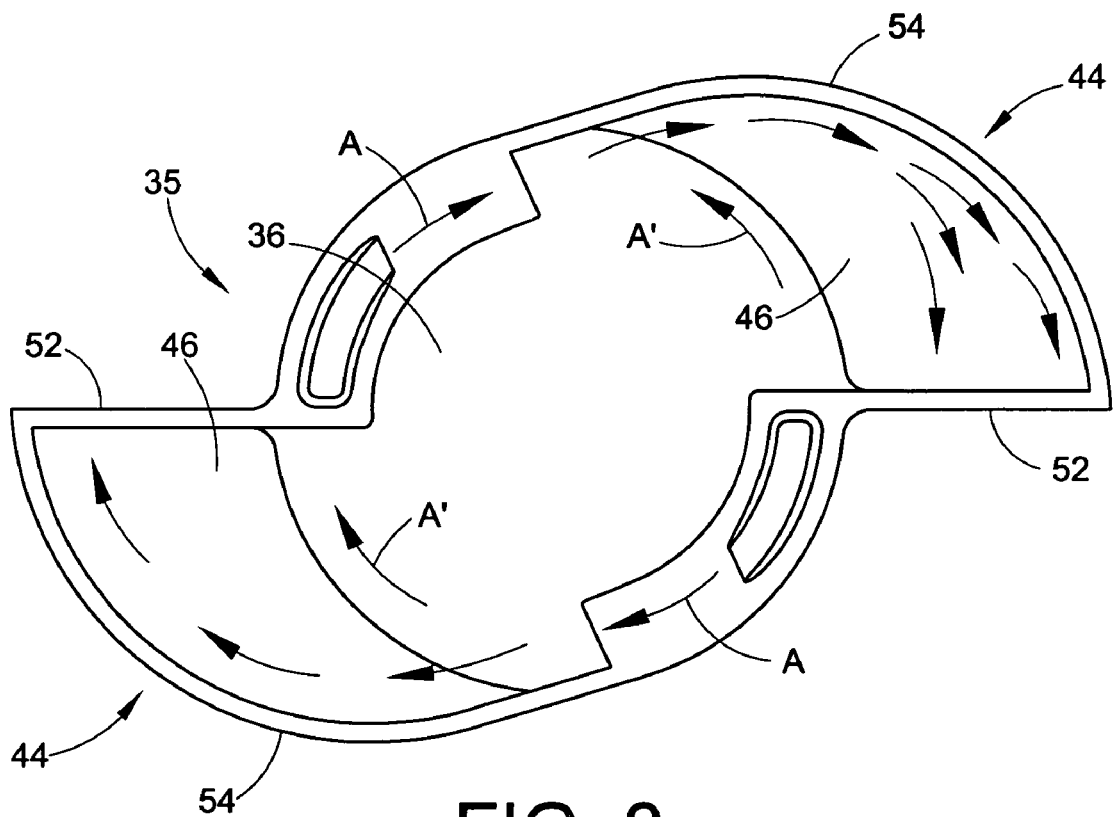
FIG. 8 is a bottom plan view of the cyclone slinger portion of FIG. 7 illustrating exemplary dust path movement in the slinger arms before falling through openings in the bottom of the slinger arms into the dust cup beneath.

As the airstream A passes down through the slinger chamber 34, part of the airstream (designated A' in the Figures) containing the highest concentration of dust and debris is diverted by centrifugal force into the slinger passages 44, as shown in FIGS. 5 and 8. The remaining, main airstream A—now centrifugally cleansed of most particulate matter—strikes the bottom wall or platform 36 of the slinger chamber 34 and reverses direction. It thus passes back upwardly though the center of the slinger chamber 34 and the cyclone 26, as shown in FIGS. 3, 4 and 6.

Figure 14:
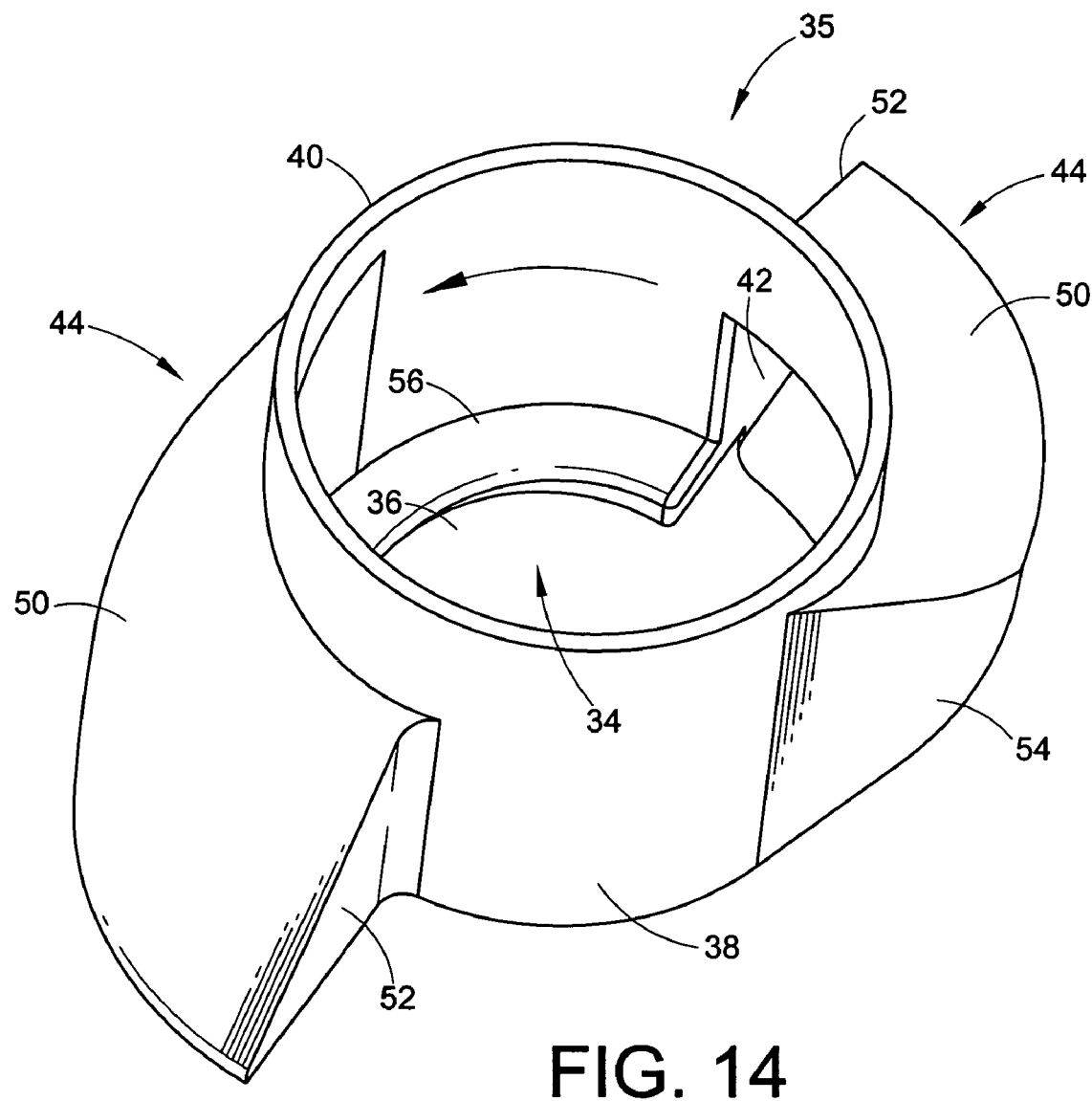
FIG. 14 shows a cyclone slinger portion wherein a ceiling slopes continuously downwardly to the bottom edge of the slinger arm so the sidewall does not extend all the way to the deflector wall.

The slinger arms 44 may be shaped in any desired manner. They may, for example, extend outwardly from the slinger chamber 34 in a tangential, radial and/or circumferential manner. The slinger arms 44 may advantageously have a ceiling 50 that slopes downwardly in both a radial and a tangential direction, as shown in the Figures (especially FIGS. 4 and 5). This downwardly sloping configuration directs the diverted airstream A' and dirt particles downwardly toward the dust cup 48, encouraging dirt and debris entering the slinger arms 44 to fall down into the dust cup 48. This can help to prevent the separated dirt and other debris from being carried back into the slinger chamber 34. The downwardly sloping ceilings 50 of the slinger arms 44 might transition smoothly into their respective exit ports 46, without any sharp bends. Alternatively a deflector wall 52 may be disposed at the end of a slinger arm 44, which will redirect the airflow direction abruptly by about 90° down into the dirt cup. This separates dirt and other debris still surviving in the airstream A' out of that airstream, and further prevents it from re-entering the airstream. Dirt and other debris separated from the diverted airstream A' falls down through the exit port 46 and into the dust cup 48 when the diverted airstream A' strikes the deflector wall 52. The slinger arms 44 also have an arcuately shaped sidewall 54 generally tangential to the slinger chamber 34 to promote a smooth transition of air and carried dirt into the slinger arms 44. Dirt may also impact the sidewall 54 and then fall through the opening 46 into the dirt cup 48. FIG. 14 shows yet another configuration, wherein the ceiling 50 slopes downwardly continuously to the bottom edge of the slinger arm 44 so that the sidewall 54 does not extend all the way to the deflector wall 52.

As partially shown in FIG. 8, once the diverted airstream A' passes into a slinger arm 44, dirt and other debris may precipitate out of the diverted airstream A' and/or be deflected downward through the exit port 46 by striking any one or more of the ceiling 50, the deflector wall 52, or the sidewall 54. The dirt and other debris falls through the exit ports 46 and collects and remains within the inside of the dust cup 48. Thus the dirt and debris is forced to exit the cyclone slinger portion 35 in a downward direction, substantially parallel to the axis of the cyclone 26. Positive pressure from the diverted airstream A' flowing into the slinger arms 44 helps to discourage re-entrainment of the stored dirt and other debris back into the main airstream A.

It is desirable to minimize the amount of airflow in the dirt cup 48, particularly rotational airflow. Reducing the airflow helps ensure no dirt or debris becomes re-entrained from the dirt cup 48 back into the airstream A. One known method of minimizing airflow is to place one or more baffles in the dirt cup 48 to break up the airflow. Placing such structures in the dirt cup 48, however, has some drawbacks. For example they reduce the effective dirt-containing capacity of the dirt cup, and they hamper the process of emptying the dirt cup 48. To avoid these drawbacks, an anti-rotation structure may be included as part of the cyclone slinger portion 35 outside of the dirt cup 48. One example of such an anti-rotation structure is the deflector wall 52.

Figure 15A:
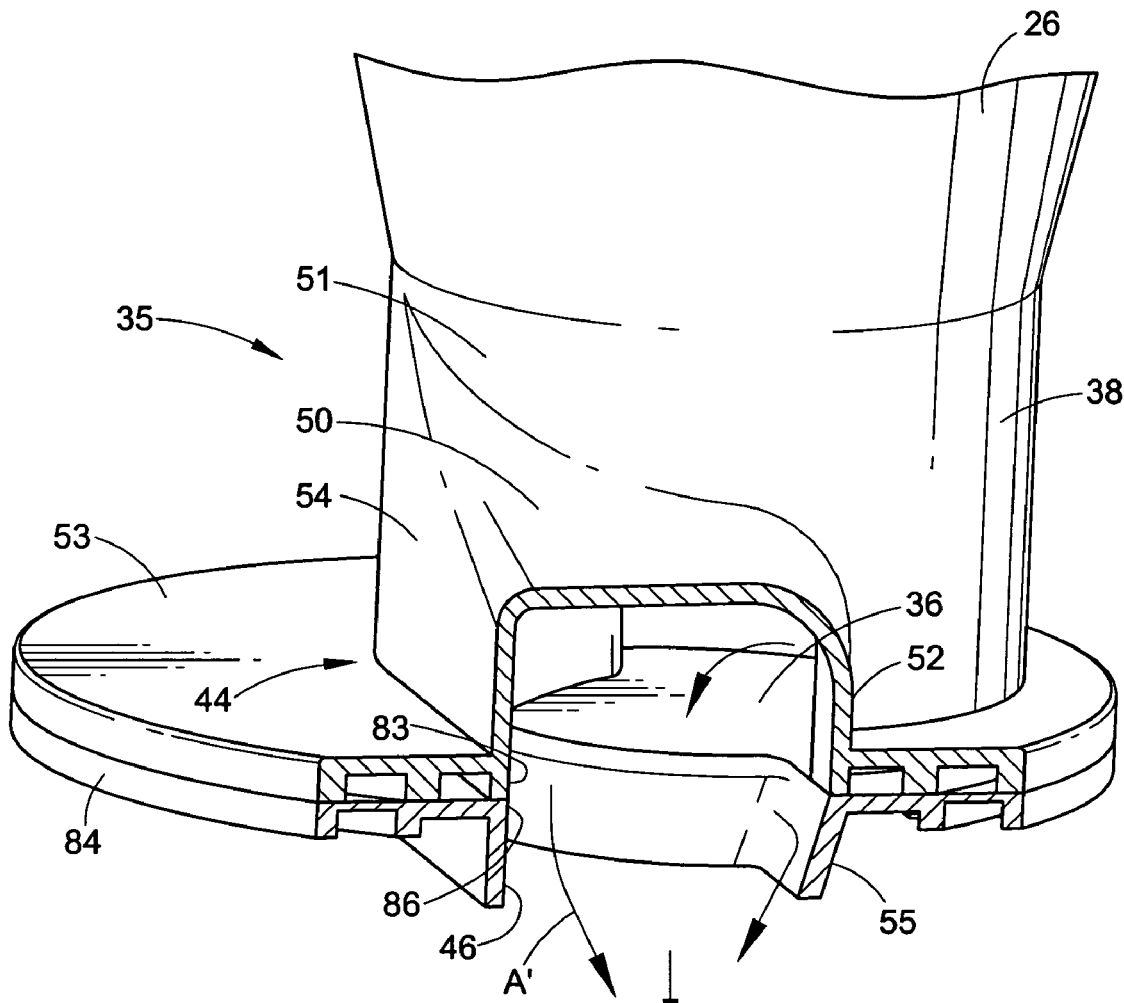
FIG. 15A is a sectional view taken vertically through a cyclone slinger portion with the return air platform being defined by a dirt cup lid, and a lid deflector wall slanted in a direction opposite to the rotational direction of the airstream.
Figure 15B:
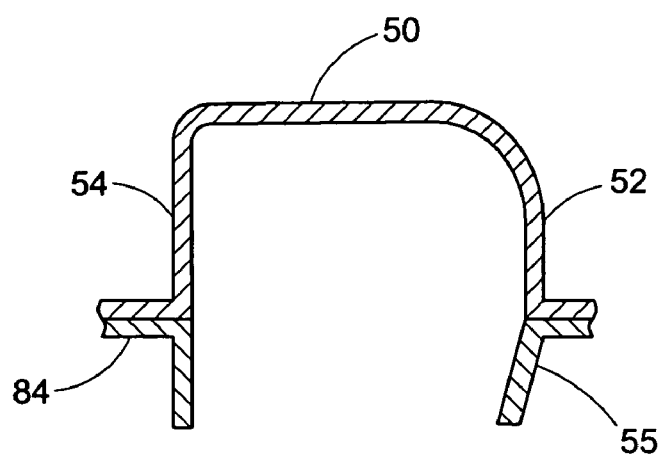
FIG. 15B is a simplified representation of the sectional view of FIG. 15A.

FIGS. 15A and 15B show another embodiment of an anti-rotation structure. In those Figures the cyclone slinger portion 35 is formed by two separate components: a top portion 51 and a dirt cup lid 84 placed on top of a dirt cup 48 (not shown). The top portion 51 has a skirt 53 of approximately the same size as the dirt cup lid 84 for easy mating of the two components. The top surface of the dirt cup lid 84 forms the bottom wall 36 of the cyclone slinger portion 35. Dirt and debris separated from the airstream A and A' passes down out of the top portion 51 through an aperture 83 in the top portion, to enter an aperture 86 in the dirt cup lid 84. The dirt and other debris then falls further through an exit port 46 from the slinger arm 44 and into the dirt cup 48. A lid deflector wall 55 depends from the aperture 86 down into the dirt cup 48 to form a continuation of the deflector wall 52 in the top portion 51. The lid deflector wall 55 is slanted in a direction opposite to the rotational direction of the airstream A', to discourage continued rotation of any air entering the dirt cup 48, as shown by the arrows in FIG. 15A. Similarly, the deflector wall 52 in the top portion 51 may also be slanted in a direction opposite the rotational direction of the airstream A' (not shown in the Figures).

The dirt cup 48 thus captures and retains coarse and fine dirt particles that fall through or are deflected through the exits ports 46 in the slinger passages 44. The vortex return platform 36 is located over the dirt cup 48 to isolate the dirt and debris contained in the dirt cup 48 from the cyclonic flow occurring above the platform 36. This isolation minimizes or eliminates the amount of coarser dirt particles and debris that might be re-entrained into the airstream A. The movement of air in the dirt cup 48 is minimized so that little, if any, air returns back into the cyclone slinger portion 35 from the dirt cup 48.

Figure 7:
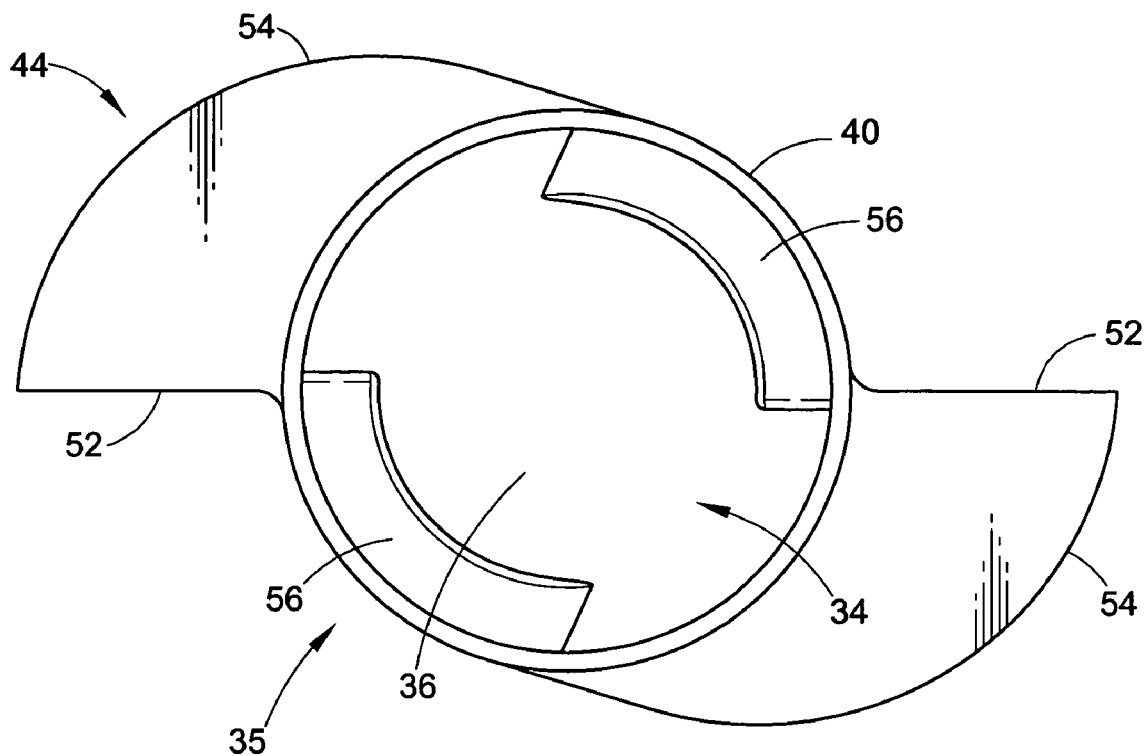
FIG. 7 is a top plan view of the cyclone slinger portion of FIGS. 5-6, illustrating the central vortex air return platform, ramps on the platform to break up dirt clumps or bundles, and the two slinger arms.

As already stated, the main airstream A strikes the bottom wall 36 of the slinger chamber 34 and passes back upwardly though the center of the slinger chamber 34. The bottom wall 36 may be configured in any manner which does not interfere with that function. For example, the bottom wall 46 may form a return air platform which is generally planar (as shown in the Figures), arcuately concave or arcuately convex. This return air platform may be provided with ramps 56 disposed around its periphery, as shown in FIGS. 5 and 7. These ramps 56 help prevent clogs from forming in the slinger passages 44, especially clogs of low density dirt or other debris such as lint. The change in direction caused by the ramp surfaces 56 can assist in breaking up clumps of dirt and debris to minimize clogging and to feed the broken-up dirt to the dirt cup 48.

Figure 16:
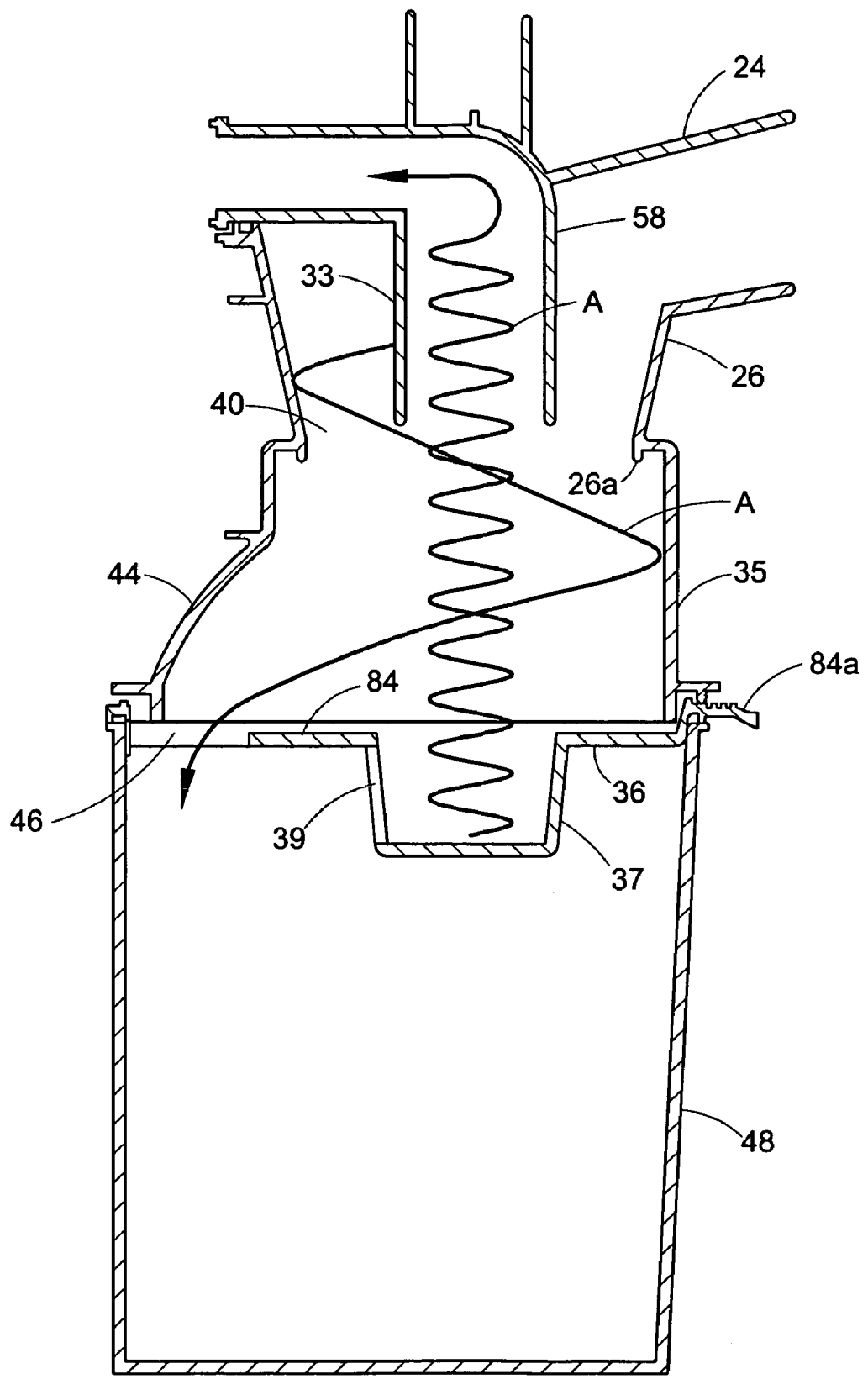
FIG. 16 is a schematic sectional view taken vertically through a cyclone separation system, including a subjacent dirt cup, illustrating entering and exiting flow paths, a slinger arm, and a return air platform with a basket.
Figure 17:
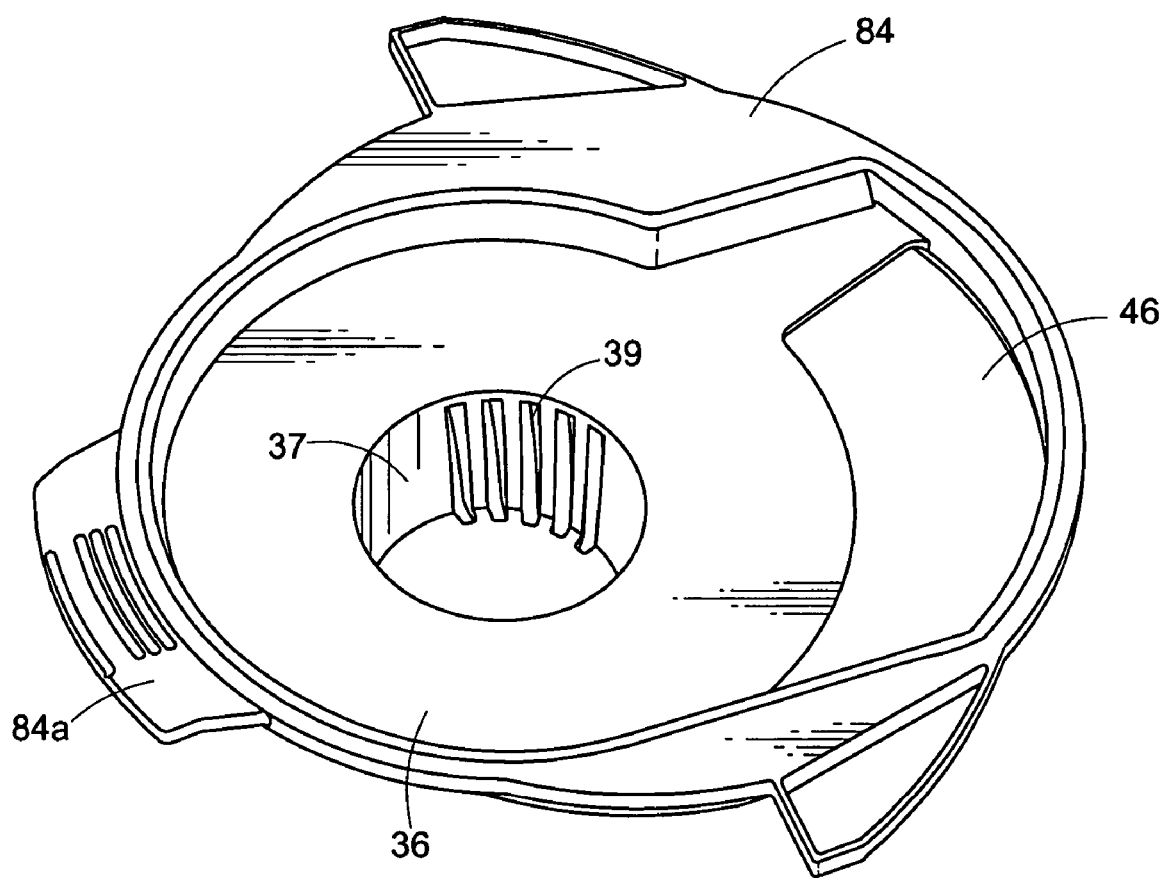
FIG. 17 is a top perspective view of the return air platform shown in FIG. 16 having a basket.

A particularly preferred configuration for the bottom wall 36 is shown in FIGS. 16 and 17. The bottom wall 36 there has a basket 37 which helps to focus the airstream A and keep it centered as it reverses upon reaching the bottom wall 36. The basket 37 may have vents, screens or holes 39 to enable more air to enter the dirt cup 48 and deposit dirt and debris therein. This increased airflow can help compact the dirt and debris at the bottom of the dirt cup 48, thus increasing the effective dirt holding capacity for a given volume dirt cup. The bottom wall 36 with the basket 37 also serves as the lid 84 of the dirt cup 48. FIG. 16 additionally shows a slinger portion 35 having a larger diameter than the bottom of the frustoconical cyclone 26 on top of it. This allows more dirt and debris to move outwardly away from the central airflow moving back up towards the cyclone outlet 58, encouraging the dirt and debris to fall down into the dirt cup 48 rather than towards the outlet 58. An annular rib 26a depending from the cyclone 26 around the open top 40 down into the cyclone slinger portion 35 also may help to keep dirt away from the upwardly flowing airstream.

After the airstream A reverses axial direction to proceed upwardly back up to and through the central portion of the cyclone 26, it passes out of the cyclone 26 through a cyclone outlet 58 in the top wall 28 of the cyclone 26 (FIG. 4). A center tube 33 depending downwardly from the top wall 28 may be used to discourage interference between the entering and exiting airstreams near the top wall 28 of the cyclone 26. This center tube 33 may also act as a vortex finder for the upwardly returning, cleaner air.

Figure 18:
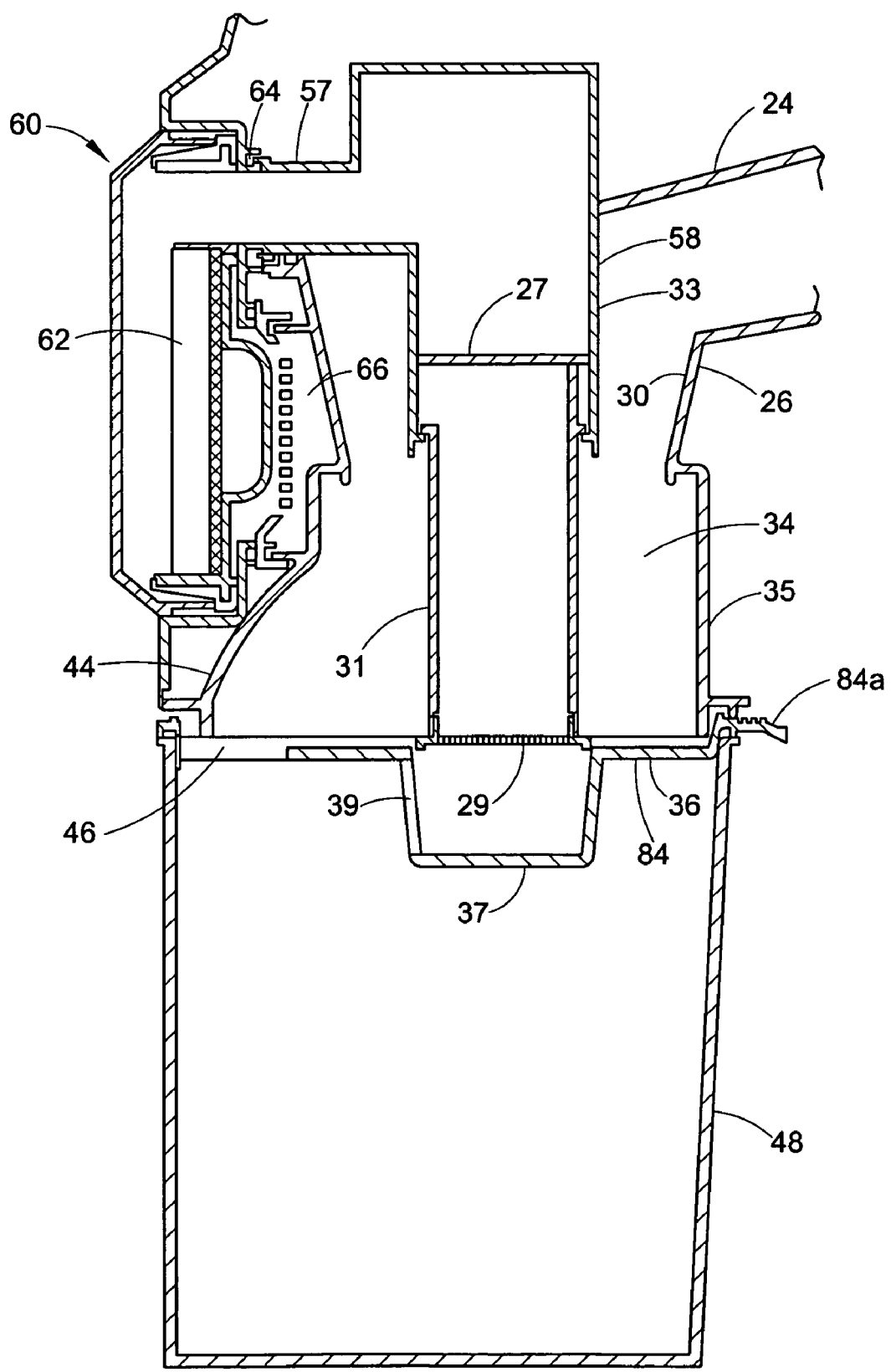
FIG. 18 is a schematic sectional view taken vertically through a cyclone separation system, including a subjacent dirt cup, illustrating an inner tube in a lower position.
Figure 19:
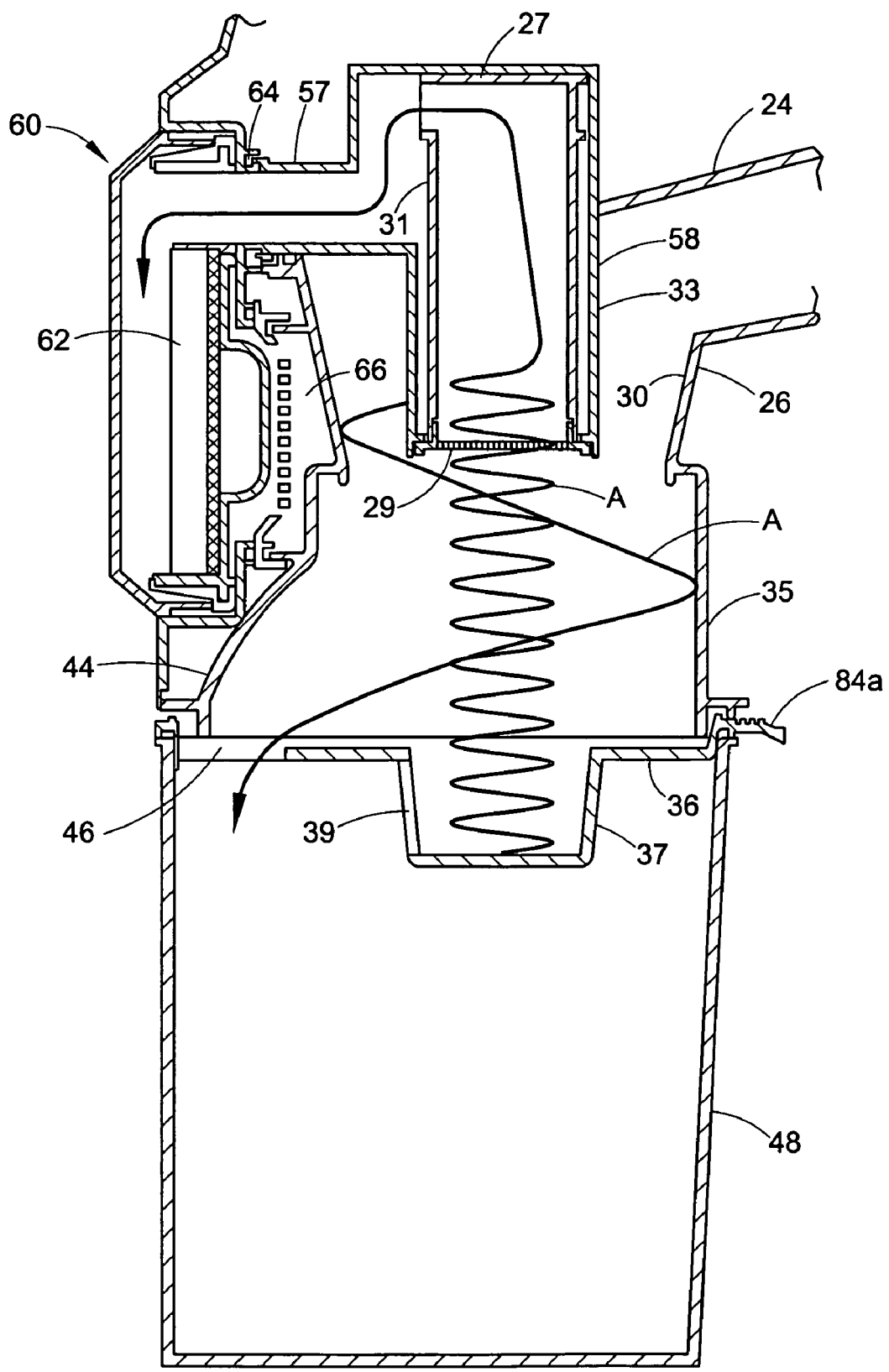
FIG. 19 is a schematic sectional view as in FIG. 18, but illustrating the inner tube in an upper position.

As shown in FIGS. 18 and 19, the center tube 33 may include an inner tube 31 slidingly fitted into the center tube 33 and having a screen or other filter 29 affixed across an opening at its bottom end. The screen 29 prevents some debris from passing into the inner tube 31 and reaching a post-cyclone filter 62 (discussed further below), thus extending the life of the filter 62 and also helping to maintain a high airflow through the vacuum cleaner. When the inner tube 31 is in the lower position shown in FIG. 18 and the dirt cup 48 is removed from the upright body of the vacuum cleaner, the screen 29 is easily reachable for cleaning. With the dirt cup 48 back in place and the vacuum cleaner 10 turned on, the suction force causes the inner tube 31 to rise up to the upper position shown in FIG. 19. In this position, the airstream A exits the cyclone 26 by passing through the screen 29 and into the inner tube 31, exiting at its upper end 27 and continuing on to the filter 62. When the vacuum cleaner 10 is shut off, gravity causes the inner tube 31 to fall back down into the lower position shown in FIG. 18, making it accessible for maintenance once again.

Despite the several opportunities presented by the cyclone 26 and it slinger portion 35 for filtering dirt and other debris out of the airstream A, some fine dirt and debris may still remain in the airstream A after it exits the cyclone 26. Therefore the airstream A may be advantageously passed through yet another filtration stage before passing through the motor and fan assembly 20 and/or passing out into the atmosphere. For this purpose a conduit 57 may lead from the cyclone outlet 58 to a filter chamber indicated generally at 60. As shown in FIGS. 18-21, a main filter 62 disposed in the filter chamber 60 removes most of the fine dirt and debris remaining in the airstream A.

Figure 22:
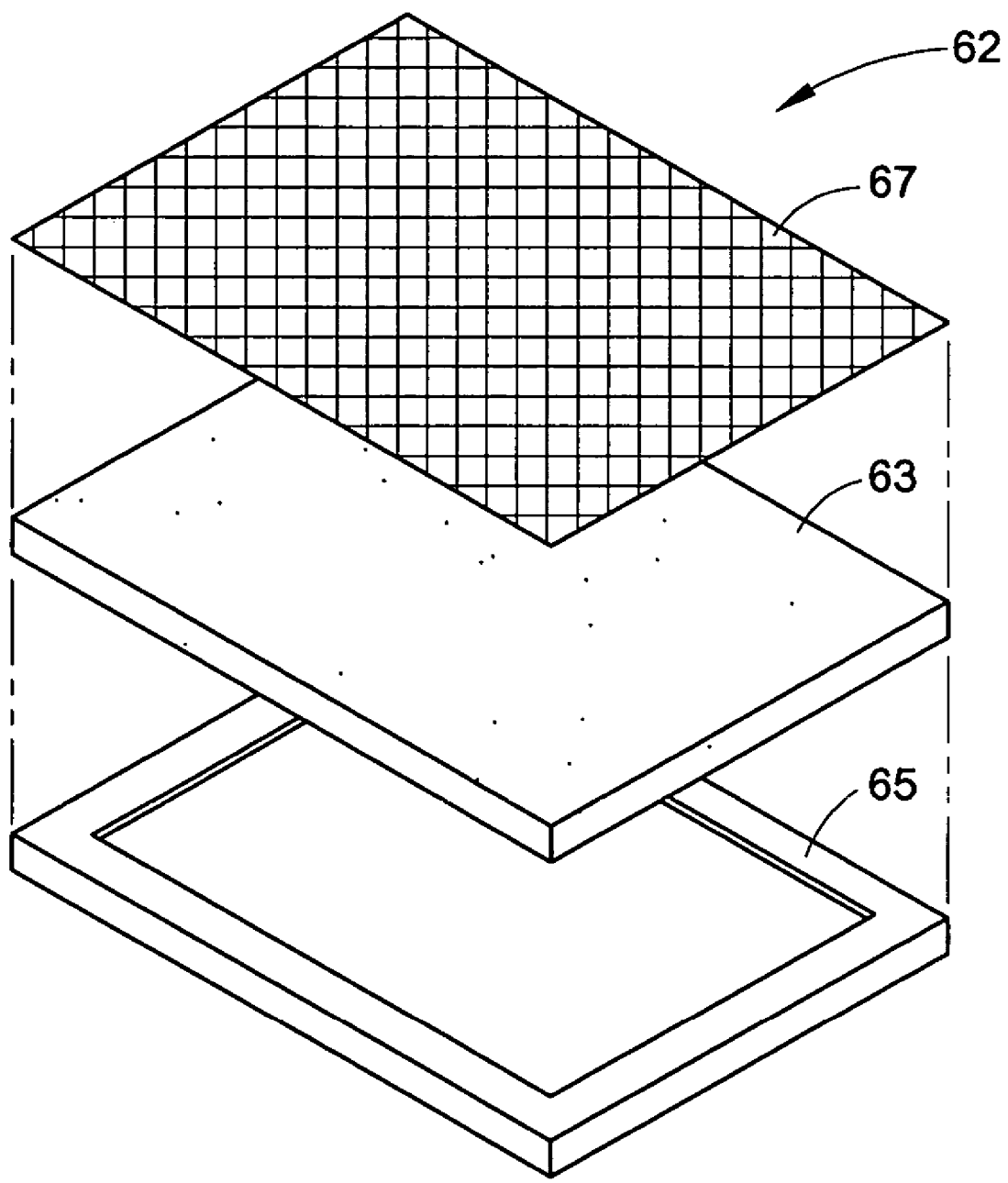
FIG. 22 is an assembly view of a multiple layer main filter made of a filter frame, a filter pad and a filter screen.

The main filter 62 may be comprised of any filtration media suitable for particle separation and capture, such as a filter paper material, a polyester material, a polyethylene material, a foam material, or any other material suitable for filtering out the fine particles remaining in the airstream A after it passes through the cyclone 26 and slinger assembly 35. Combinations of filter media also might be used. For example, FIG. 22 shows a main filter 62 including a filter pad 63 mounted on a filter frame 65 and covered by a filter screen 67. Particularly preferred materials for the filter pad 63 are a polyester material available from Custom Filter, LLC (Aurora, Ill.) as Part No. PE 200-72, or a polypropylene needle felt material available from the same company as Part No. PO 200-72G. The filter screen 67 operates principally to prevent items such as lint, hair, and fuzz from reaching and clogging the filter pad 63, and may for example be made from NALTEX® 15 mesh netting. The filter screen 67 preferably provides a surface to which such items will not adhere to facilitate cleaning of the filter. A second cyclone may be used in place of or in conjunction with the main filter 62, as discussed further below.

Figure 23:
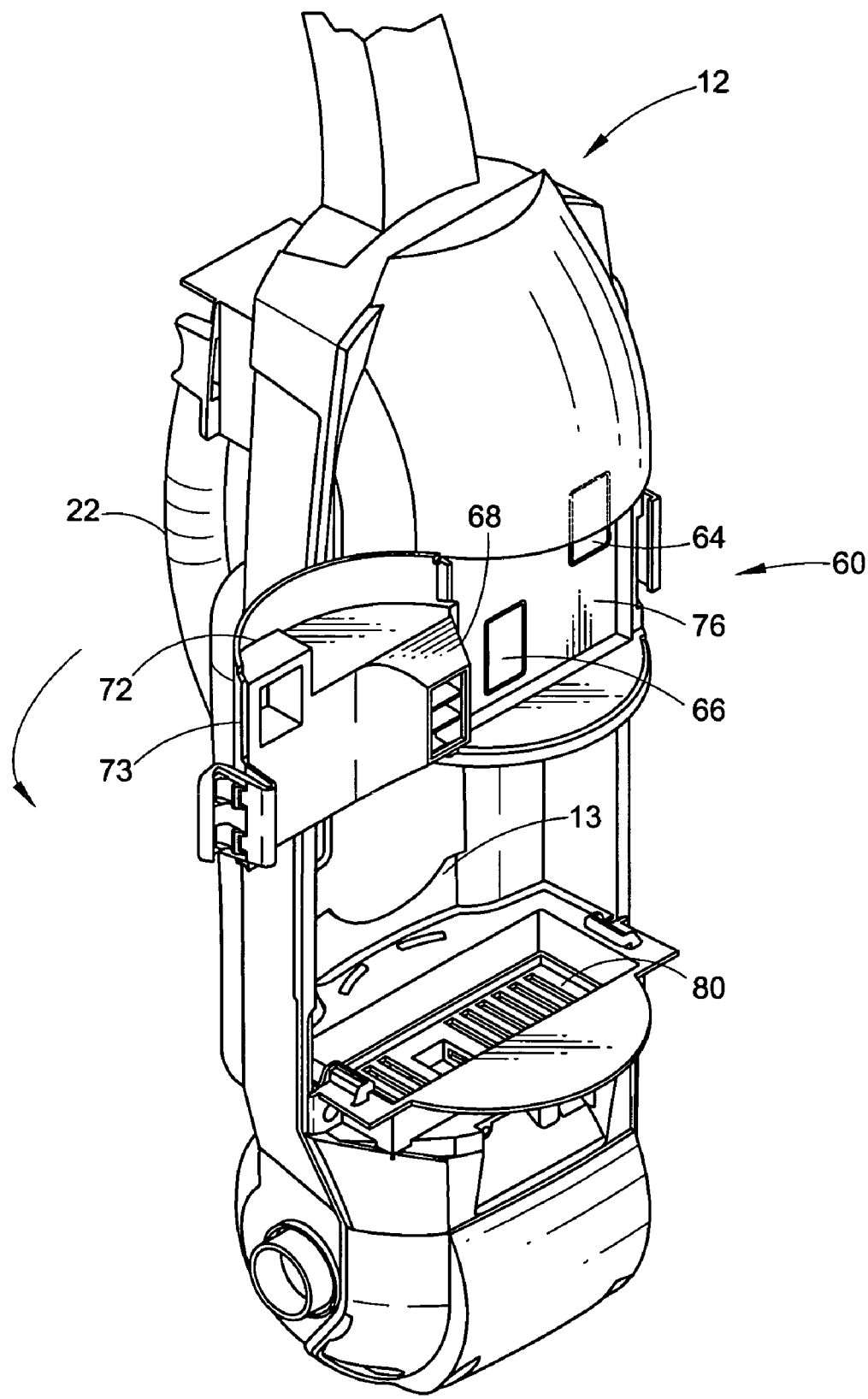
FIG. 23 is a front, top, right perspective view of the upright body portion of a second embodiment illustrating a pivotal front door assembly for the visible post cyclone filter, a partition wall, a receptacle for the dirt cup and an exhaust filter positioned in a motor cover forming the floor of the receptacle.
Figures 52, 53:
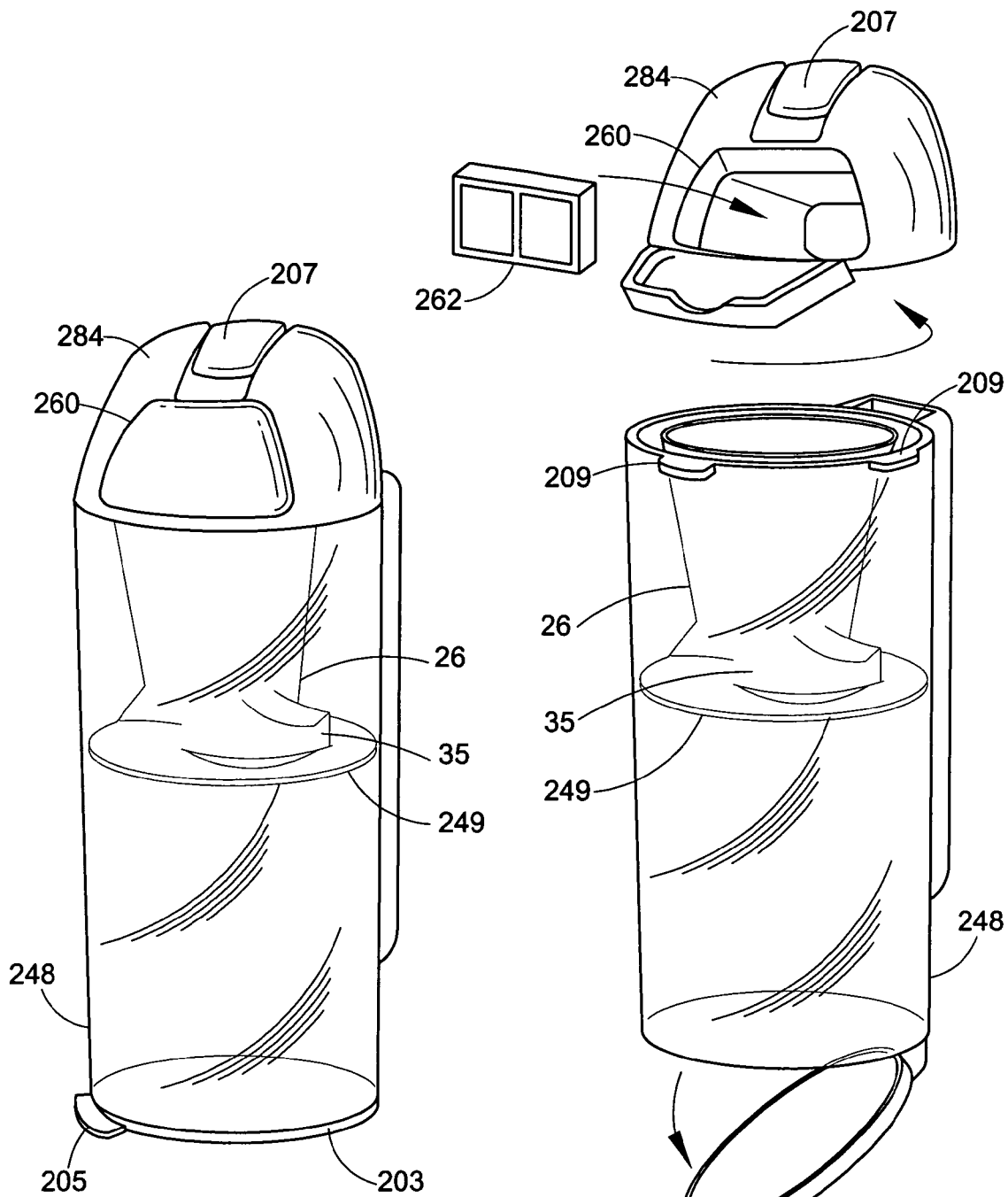
FIG. 52 is a perspective of another embodiment illustrating a main filter and cyclone starter module, and a cyclone having two slinger arms disposed in the dirt cup below the main filter and cyclone starter module.
FIG. 53 is a perspective of the embodiment of FIG. 52 with the main filter and cyclone starter module removed and the bottom cover of the dirt cup swung to an open position to empty the dust cup.

The filter chamber 60, as shown in FIGS. 2 and 18-21, comprises a filter chamber inlet 64, a filter chamber outlet 66 and a transfer passage 68. The main filter 62 is disposed in the middle of the filter chamber 60 so as to define a front plenum 70 between the main filter 62 and the front wall 72 of the filter chamber 60 as well as a back plenum 74 between the main filter 62 and the back wall 76 of the filter chamber 60. Preferably the front wall 72 containing the filter 62 comprises a door 73 (FIG. 23) which permits access to the main filter 62 for cleaning, removal or other maintenance. Thus the door 73 may for example be a removable cover element as shown in FIG. 55A, a hinged enclosure as shown in FIG. 23 or FIG. 53, a removable hinged enclosure, or any other construction suitable for holding the main filter 62 in place in a sealed arrangement.

Figure 20:
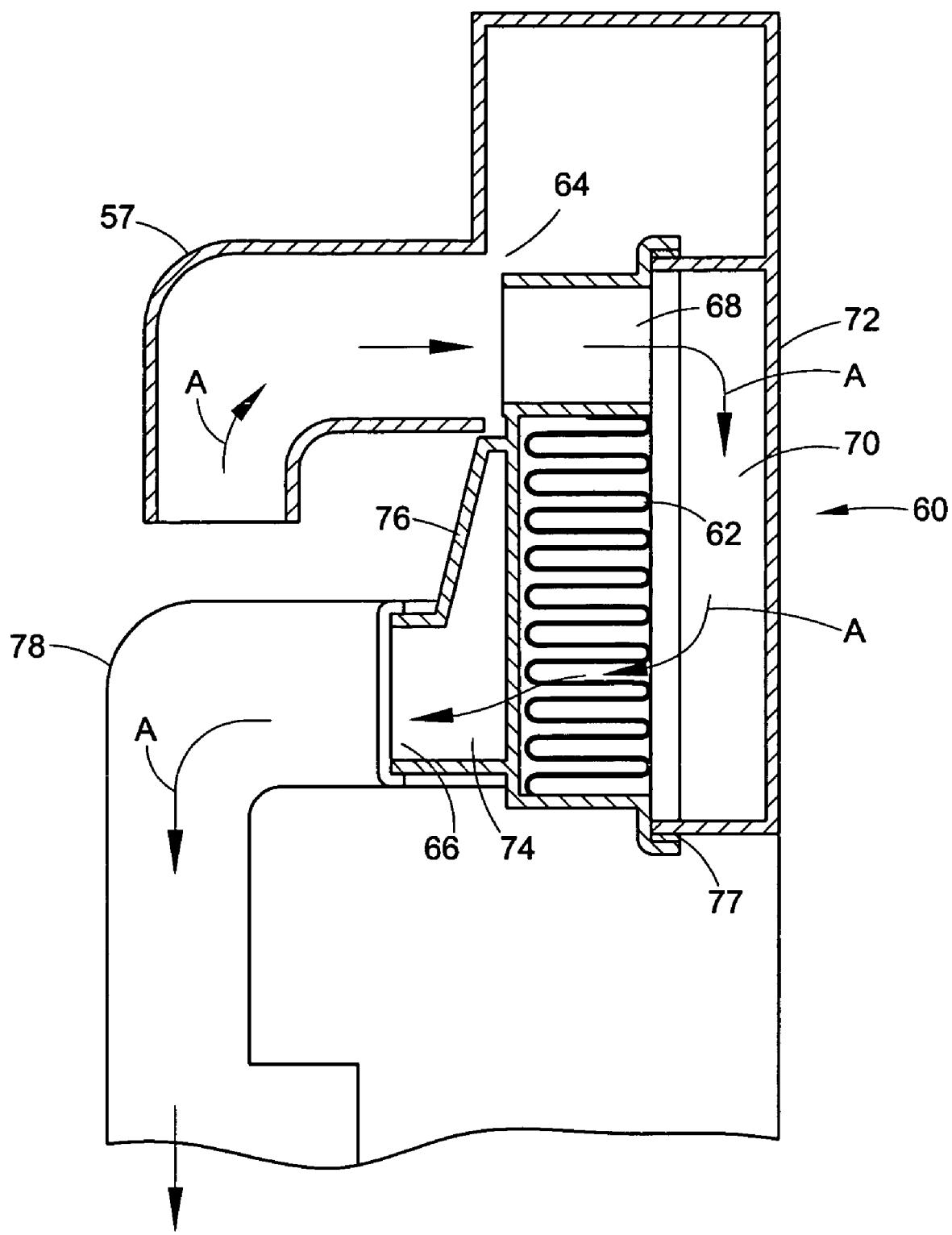
FIG. 20 is a schematic side sectional view taken vertically through a filter chamber comprising a filter door and associated conduits, illustrating the post-cyclone air path from the cyclone to the front of the filter and then rearwardly through the main filter to the conduit leading to the suction source.

As best shown in FIG. 20, the conduit 57 carries the airstream A to the filter chamber inlet 64, where the airstream A passes to the front plenum 70 via the transfer passage 68. The airstream A travels down into the front plenum 70 and then rearwardly through the main filter 62. The front plenum 70 assists in obtaining a relatively uniform airflow across the full extent of the main filter 62.

Fine dirt and other debris separated from the airstream A by the main filter 62 either falls down into the bottom of the front plenum 70 or adheres to the surface of the main filter 62. The front wall 72 may advantageously be made wholly or partially transparent, such as with a window placed in a filter door 73, so the user can determine whether a sufficient amount of dirt and other debris has accumulated so as to require filter cleaning or replacement. The front wall 72 may alternatively be opaque.

If the main filter 62 requires cleaning, the door 73 can be opened and the filter 62 removed. The door 73 is preferably configured so that the user handles the clean side of the main filter 62 when removing it from the filter chamber 60, to minimize the user's exposure to dirt when cleaning or replacing the filter 62. For example, in the embodiment of FIGS. 1 and 23, the door 73 can be swung open through an arc (approximately 180° is shown in FIGS. 1 and 23) to expose the clean back side for the user to grasp when removing the main filter 62. The door 73 may be configured so that, when opened, the main filter 62 stays within the filter chamber 60 (as shown for example in FIG. 24) or comes away with the door 73 (as shown for example in FIG. 25). Once separated from the vacuum cleaner, the main filter 62 may be transported to a sink for cleaning or to a waste receptacle for disposal.

Moreover, if the user forgets to replace the main filter 62 within the filter chamber 60, the user will be alerted to the problem. That is because, without the main filter 62 properly in place, the system is not properly sealed so that suction force at the nozzle is reduced or even eliminated. Air is pulled into the system through the leaks caused by the absence of the filter 62, rather than through the nozzle. Thus, when the vacuum cleaner fails to produce suction and pick up dirt, the user will be alerted and will know to insert a filter 62.

By locating the main filter 62 out of the cyclone 26 and dirt cup 48, the lifetime of the filter 62 is extended. The airstream A does not reach the main filter 62 until a substantial amount of dirt and debris is separated from the airstream by the cyclone 26 and its slinger portion 35. Thus particularly large or dense particles will be separated from the airstream A before it reaches the main filter 62, so they cannot strike and thereby degrade the main filter 62. Also, locating the main filter 62 outside of the dirt cup 48 increases the dirt-containing capacity of the dirt cup 48.

Figure 21:
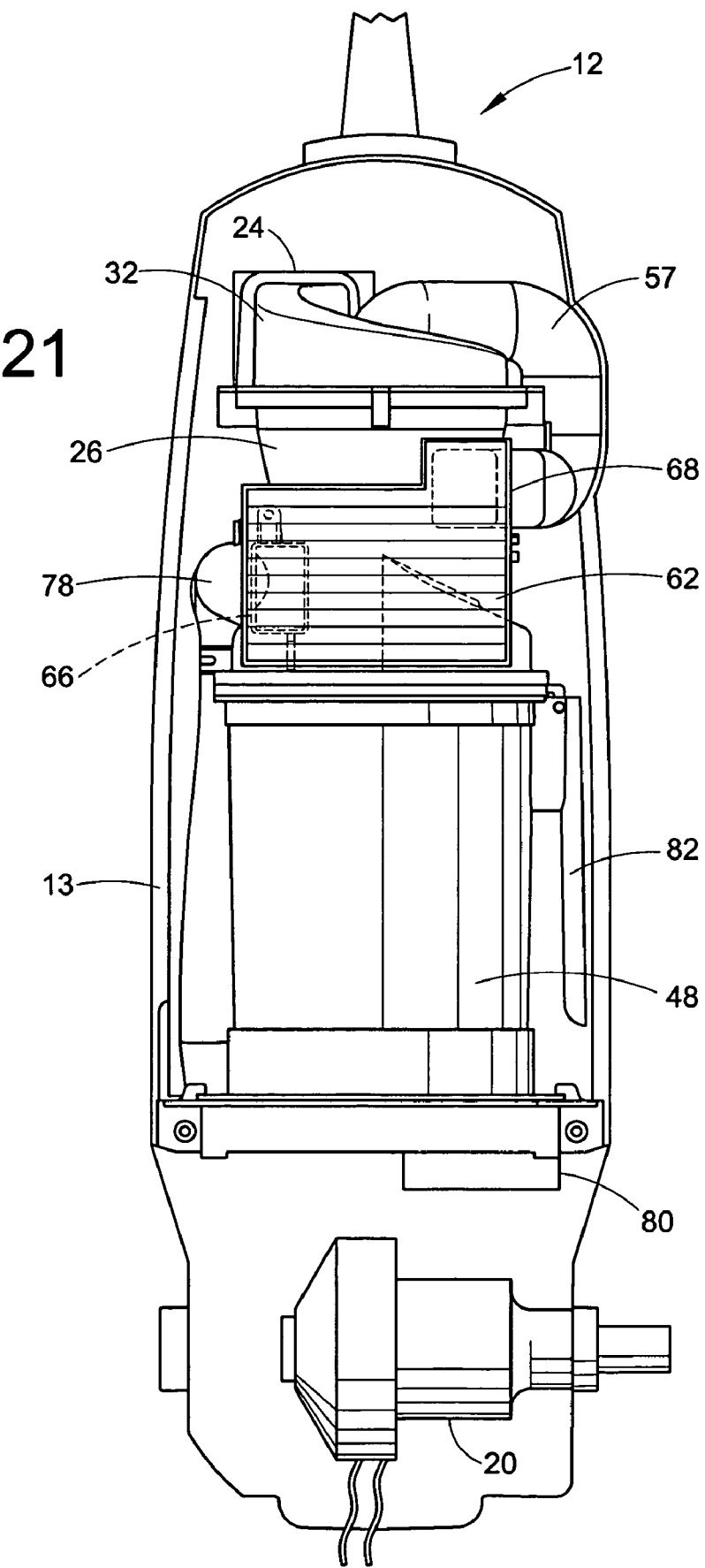
FIG. 21 is a schematic front elevational view of the filter chamber of FIG. 20, showing the associated cyclone and its cyclone slinger portion, the dirt cup, the main filter, the motor/fan assembly, and the post-motor filter.
Figure 26:
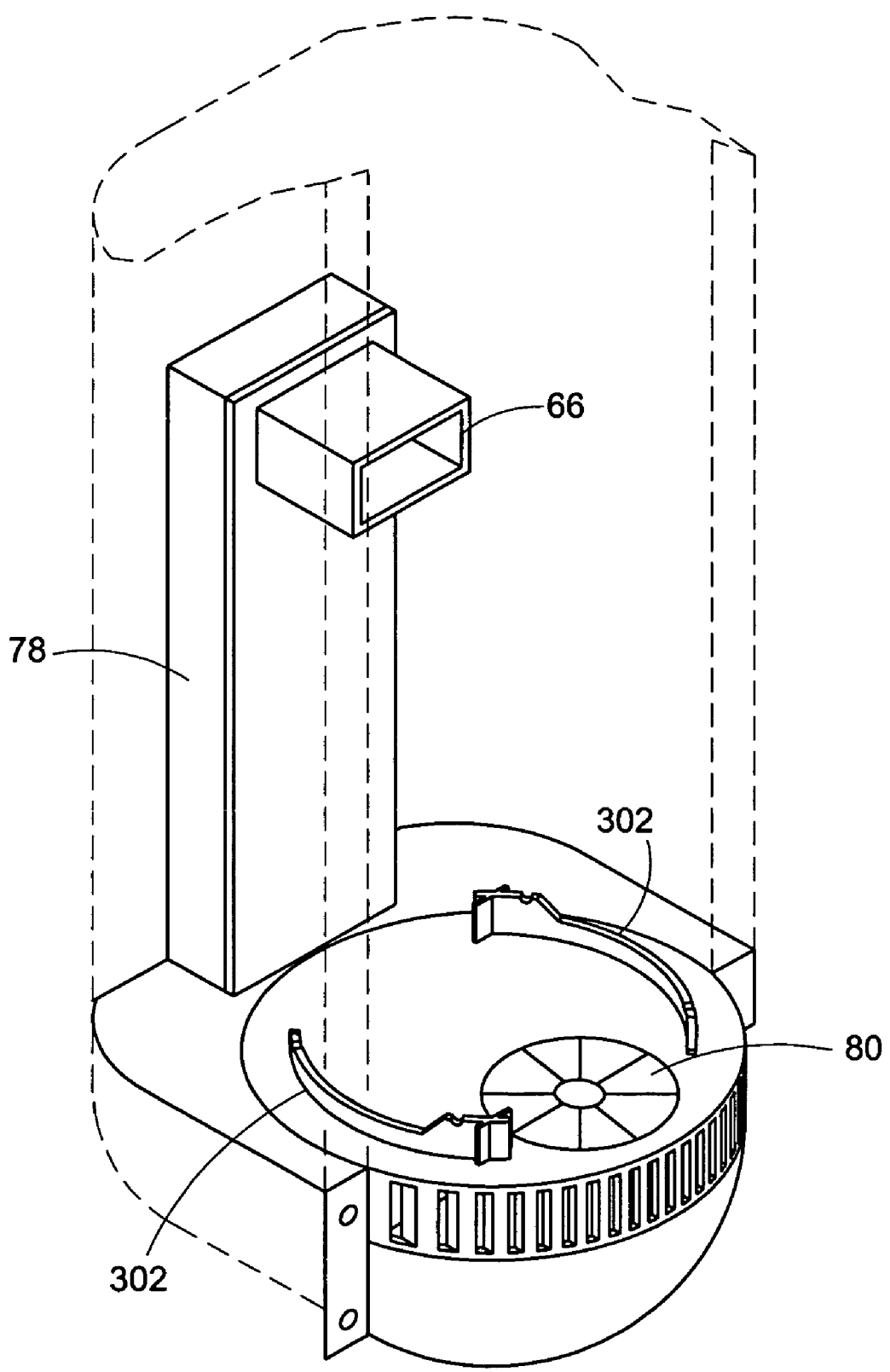
FIG. 26 is a partial perspective of the conduit leading from the main filter to the motor/fan assembly in the motor cover, the dust cup platform formed by the top of the motor cover with dust cup camming ramps, and the post-motor exhaust filter disposed in the dust cup platform.
Figure 27:
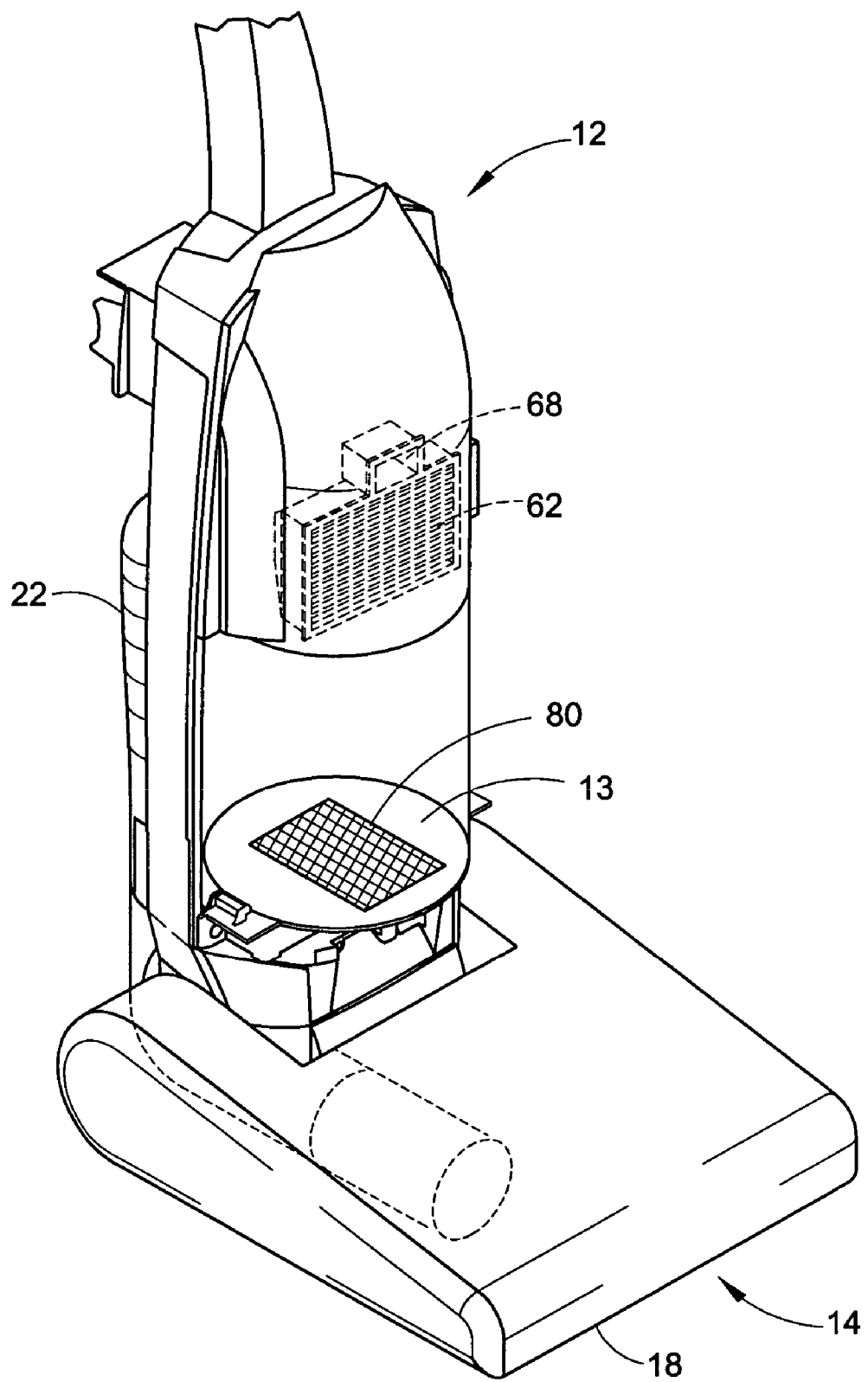
FIG. 27 is a front, top, right perspective of an upright cyclonic vacuum cleaner showing the pre-motor main filter and the post-motor exhaust filter.

After passing through the main filter 62, the now cleaner airstream A passes into the back plenum 74 and flows out of the filter chamber 60 via the filter chamber outlet 66. Another conduit 78 carries the airstream A to the motor and fan assembly 20. As best shown in FIGS. 21 and 26-27, after passing through the motor and fan assembly 20 the airstream A may be passed to a post-motor filter assembly 80 for final filtration before the airstream A exits to the atmosphere. The final filter assembly 80 preferably includes a HEPA class filter. This cyclonic air separation system and downstream filter(s) maintain filtration and air flow performance at high levels over extended periods of use.

Figure 28:
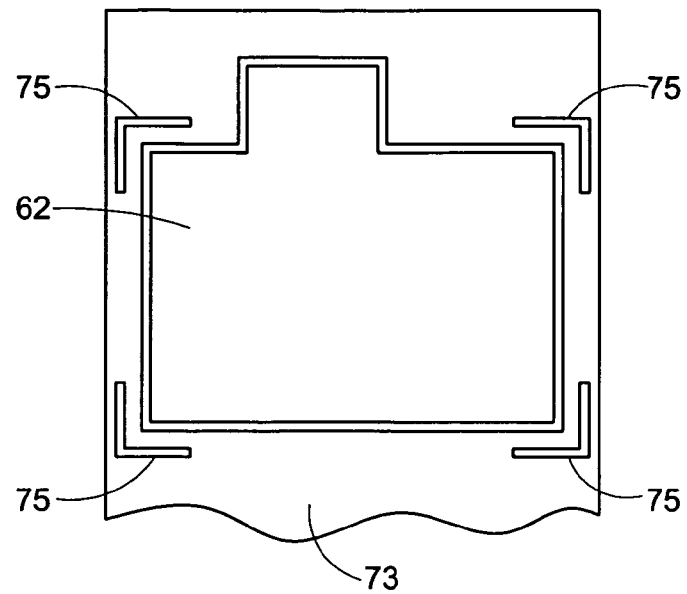
FIG. 28 is a front elevational view of a main filter being held in place in a filter door by a rib structure.
Figure 29:
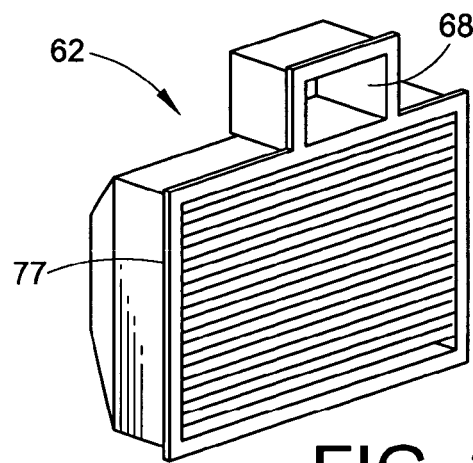
FIG. 29 is a front, top, right perspective of a main filter for placement in a filter door.
Figure 30:
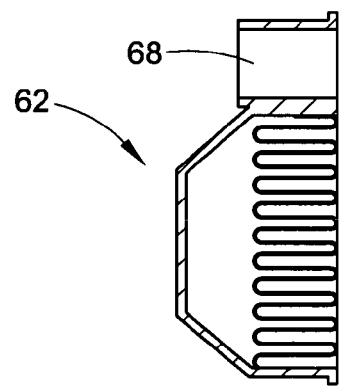
FIG. 30 is a side sectional view through the main filter of FIG. 29, including a transfer passage which also serves as a handle for the main filter.
Figure 31:
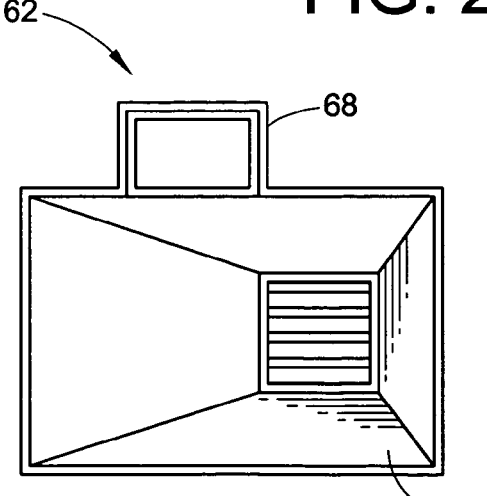
FIG. 31 is a rear view of the filter chamber, including the filter of FIG. 29.
Figure 32:
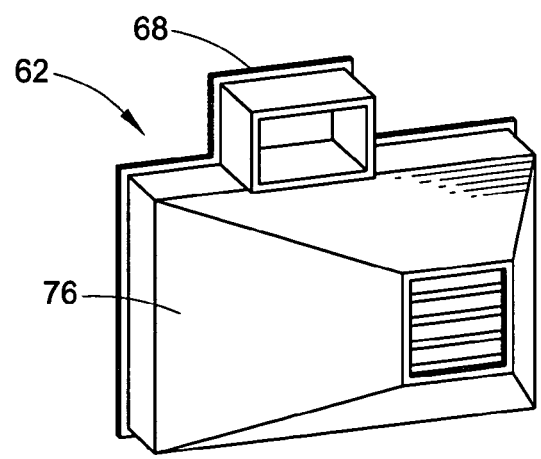
FIG. 32 is a rear, top, left perspective view of the filter chamber, including the filter of FIG. 29.

FIGS. 28-32 illustrate some preferred features for components used as part of a filter chamber 60. FIG. 28 shows how the main filter 62 may be held in place in a door 73 by clamping rib structures 75 surrounding the peripheral edges of the main filter 62. FIG. 29 show how a gasket 77 can be used to improve sealing of the main filter 62 within the filter chamber 60 (see also FIG. 20). This gasket 77 is compressed between the main filter 62 and the outer boundary or peripheral face of the front plenum 70 to improve sealing at this point in the system, thereby forcing all the air to pass through the main filter 62. FIGS. 29-30 show how the transfer passage 68 may be made a part of the main filter 62 and also serve as a handle for removing the main filter 62 from the filter chamber 60. FIGS. 31-32 show how the back wall 76 of the filter chamber 60 also may be made an integral part of an assembly also including the main filter 62. This configuration may obviate the need for a separate sealing engagement with the back wall 76, such as the gasket 77 used in the front end for sealing against the outer boundary of the front plenum 70.

Figure 33:
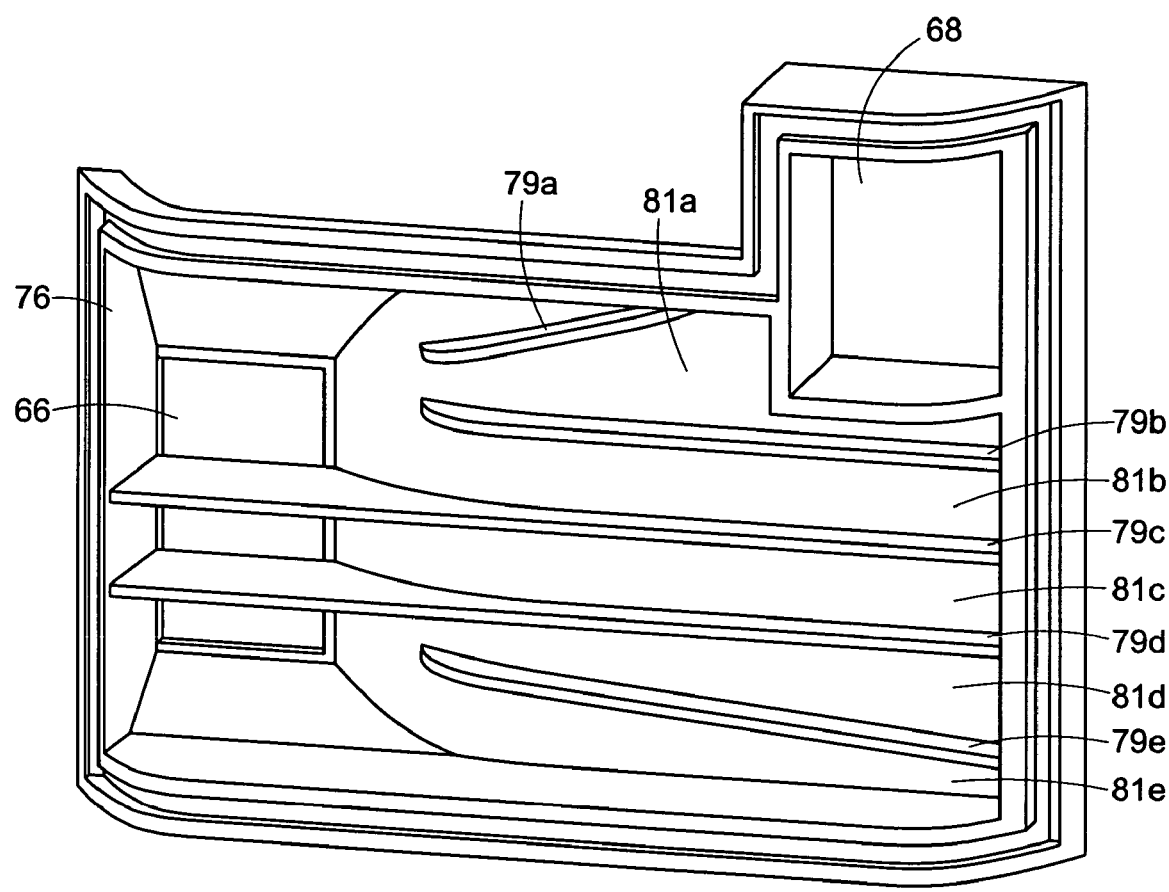
FIG. 33 is a front, top, right perspective view of the back wall portion of a filter chamber, the inlet and outlet openings for the filter chamber and a series of ribs disposed on the back wall so as to define several air passage channels in between the ribs.

FIG. 33 shows a series of ribs 79*a*-79*e* disposed on the back wall 76 of the filter chamber 60. Such ribs 79 help to properly align the main filter 62 placed in the filter chamber 60 so that it rests against the ribs 79. Proper alignment of the main filter 62 within the filter chamber 60 helps to assure that all the seals are properly maintained, thus preventing the airstream A from bypassing the main filter 62 as it passes from the front plenum 70 to the back plenum 74. When the main filter 62 is a pad of flexible filter material, the ribs 79 further serve to support the filter 62 and keep it from collapsing into the filter chamber outlet 66 due to the suction forces created there. The ribs 79 define between them a series of channels 81*a*-81*e* through which the airstream A may travel after it passes from the transfer passage 68 and through the main filter 62, on its way to the filter chamber outlet 66.

Figure 34:
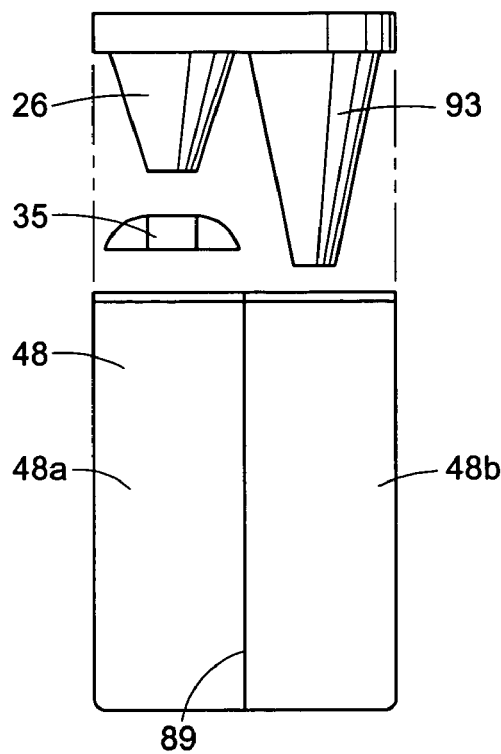
FIG. 34 shows a schematic front assembly view of dirt cup having two compartments and containing a cyclone including a cyclone slinger portion and a second, auxiliary cyclone, both of which are removable from the dirt cup so the dirt cup may be emptied.
Figure 35:
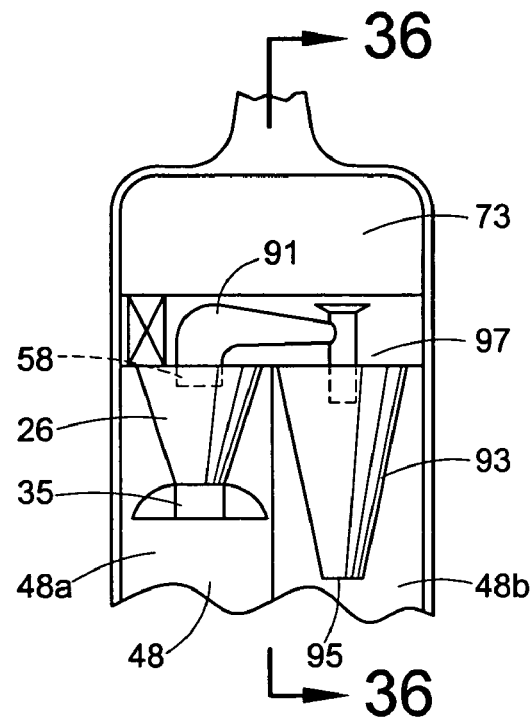
FIG. 35 is a schematic front view of the dirt cup and cyclones shown in FIG. 34 further including a filter chamber behind a filter door, with certain portions taken away to show several interior conduits for carrying an airstream, including the conduit for carrying an airstream from the cyclone to the second, auxiliary cyclone as well as the outlet from the second, auxiliary cyclone.

Instead of or in addition to a main filter 62, a second auxiliary cyclone may be placed downstream of the cyclone 26 and its slinger portion 35. For example, as shown in FIGS. 34-35, the dust cup 48 may be divided by a wall 89 into two separate dust cup compartments 48*a* and 48*b*. The cyclone 26 and its slinger portion 35 are disposed within (as shown in the Figures) or above the first dust cup compartment 48*a*, and operate as already described. Dirt and debris separated from the airstream A by the cyclone 26 and its slinger portion 35 is collected in the first dust cup compartment 48*a*. When the airstream A passes through the cyclone outlet 58 it is carried by a conduit 91 to an auxiliary cyclone 93 disposed in (as shown in the Figures) or above the second dust cup compartment 48*b*. The auxiliary cyclone 93 separates the fine dirt and debris remaining in the airstream A, to fall though the bottom 95 of the auxiliary cyclone 93 and down into the second dust cup compartment 48*b*. The auxiliary cyclone 93 is preferably frustoconcial in configuration, with a longer axis than the cyclone 26, to facilitate separation of finer particles left in the airstream A after it has already passed through the cyclone 26 and its slinger portion 35. The airstream A exits the auxiliary cyclone 93 through an outlet 97 and is carried by a conduit 78 (not shown in FIGS. 34-35) to the motor and fan assembly 20. As shown in FIG. 34, the two cyclones 26, 93 may be formed as a removable assembly so that the dust cup 48 may more easily be emptied of collected dirt and debris.

Figure 36:
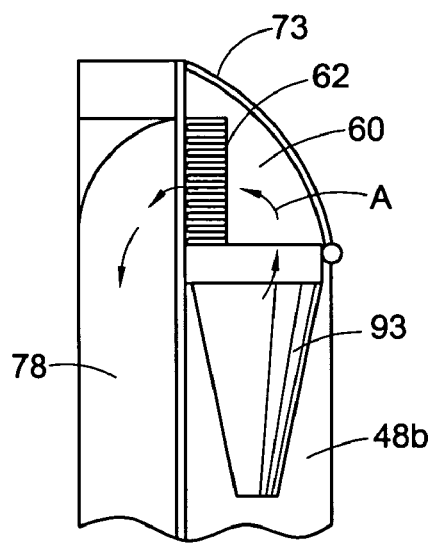
FIG. 36 is a schematic sectional side view taken vertically along line 36-36 in FIG. 35, showing a filtration assembly with a main filter used in conjunction with a cyclone and a second, auxiliary cyclone in a dirt cup, with the main filter disposed in a hinged door of a filter chamber.
Figure 37:
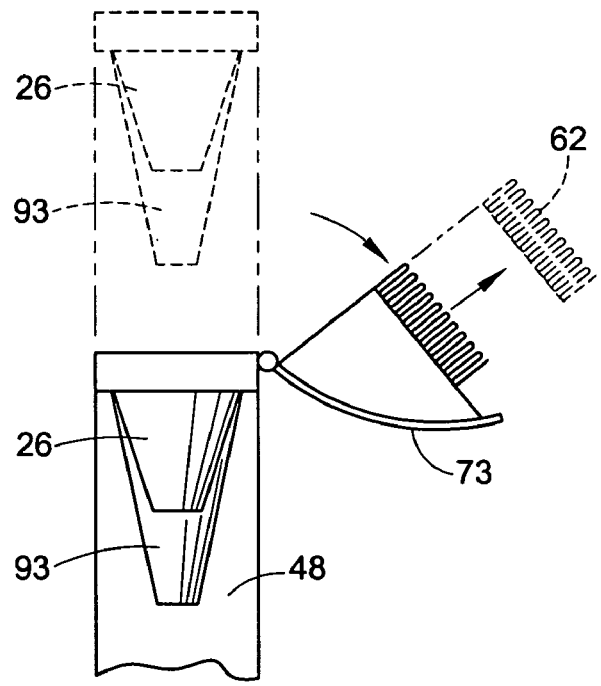
FIG. 37 is a schematic side view of the filtration assembly of FIG. 36, additionally showing how the cyclones may be removed from the dirt cup so the dirt cup may be emptied.

FIGS. 36-37 show that the airstream A may additionally pass through a main filter 62 disposed between the auxiliary cyclone 93 and the motor/fan assembly 20. The airstream A passes from the auxiliary cyclone 93 to a filter chamber 60. The main filter 62 may be held in the filter chamber 20 by a door 73 for easy maintenance of the main filter 62. After passing through the main filter 62, the airstream A is taken by a conduit 78 to the motor/fan assembly. Although the cyclone 26 is shown in these Figures without a cyclone slinger portion, of course a cyclone slinger portion may easily be included at the bottom of the cyclone 26.

As already indicated, the dirt cup 48 is preferably removable from the upright body 12 so that dirt and other debris collected in the dirt cup 48 may easily be discarded. The dirt cup 48 may have a handle 82 (FIG. 38A) to help the user remove and transport the dirt cup 48.

As shown in the various views of FIGS. 38A-H, the dirt cup 48 may also advantageously have a lid 84 to help prevent dirt and other debris from leaving the dirt cup 48 after it is removed from the upright body 12. The lid 84 may be provided with one or more apertures 86 corresponding to the exit ports 46 in the slinger arms so that dirt and debris may enter the dirt cup 48 from the slinger passages 44. To empty dirt and other debris from the dirt cup 48, the user may depress a flange 84*a* to rotate the lid 84 about a hinge 85 (best shown in FIG. 38A).

It is advantageous for a good sealing arrangement to be provided between the dirt cup 48 and the cyclone slinger portion 35. Such a seal helps to prevent dirt from escaping from inside the vacuum cleaner to the atmosphere (where it will fall back on the surface S being cleaned) and also helps to avoid loss of suction power applied at the nozzle opening 18. Several ways can be employed to provide such a seal.

Figure 38A:
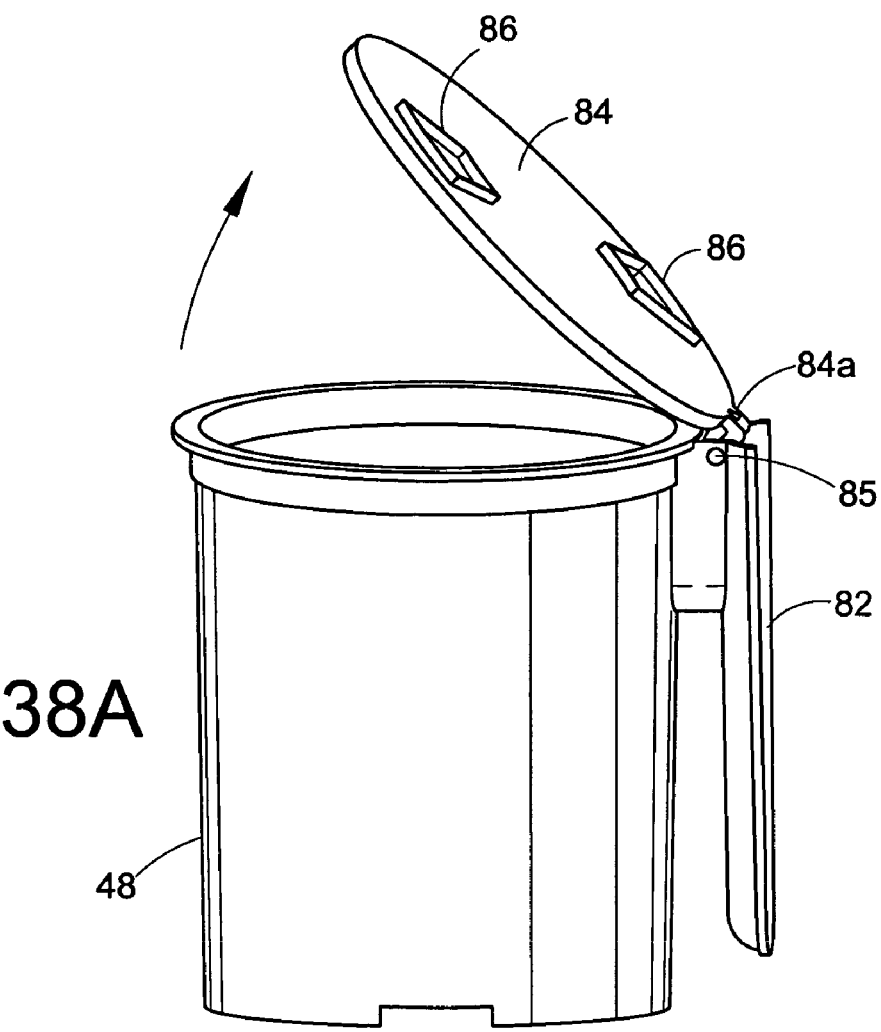
FIG. 38A is a perspective view of a dirt cup embodiment according to another aspect of the present invention, incorporating a lid on a dirt cup having the general form of a coffee pot with a handle, where the lid has two openings therein that cooperate with the bottom openings of two slinger arms, the lid openings being at least partially covered by gasket flaps.
Figure 38B:
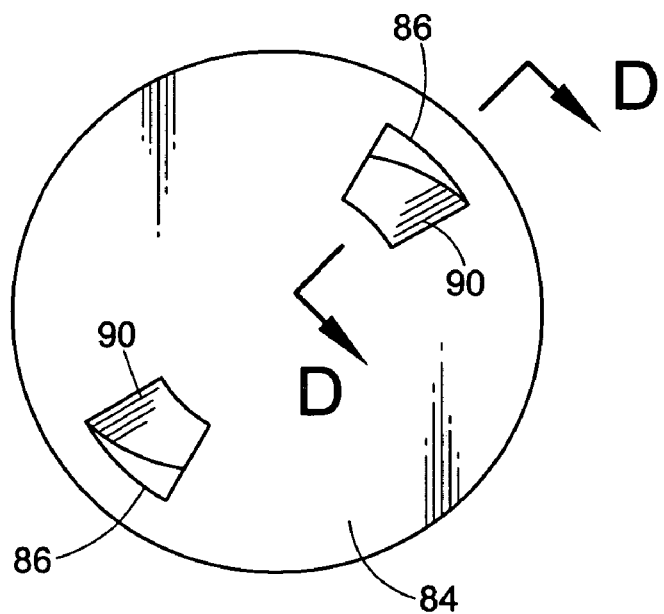
FIG. 38B is a top plan view of the lid in FIG. 38A, absent the handle, with two openings in the lid for passage of dirt and other debris into the dirt cup.
Figure 38C:
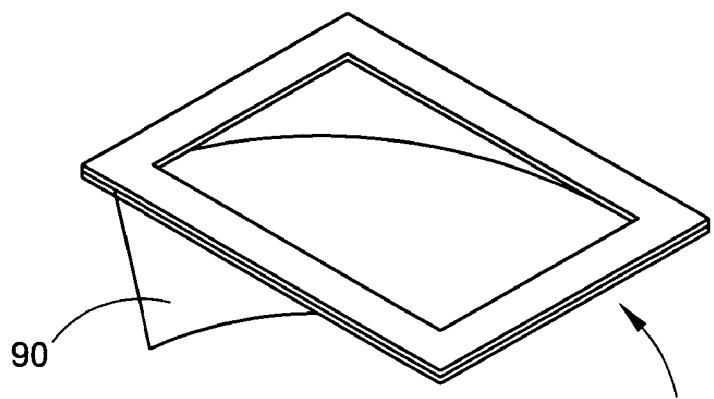
FIG. 38C is a perspective of a gasket disposed on the bottom wall of a slinger assembly or on the lid of a dirt cup, having a gasket flap or a compression seal for helping to prevent dirt from escaping the dirt cup and for maintaining a sealed system.
Figure 38D:
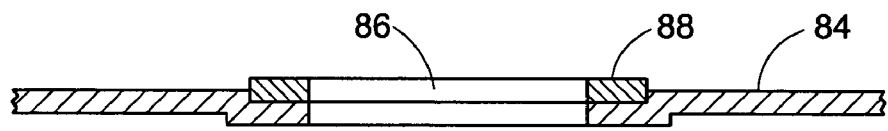
FIG. 38D is a schematic, sectional view taken along line D-D in FIG. 38B, showing a gasket attached to the top of the dirt cup lid for mating with the rim surrounding an opening in a bottom wall of the cyclone slinger portion.
Figure 38E:
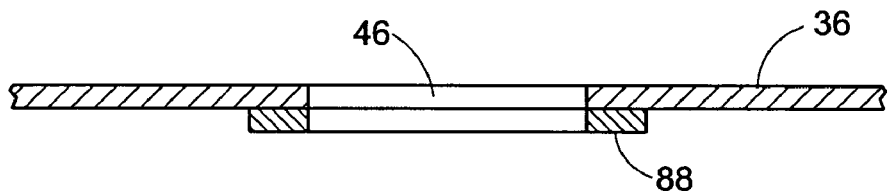
FIG. 38E is a sectional view showing a gasket, with a gasket flap, attached to the bottom wall of the cyclone slinger portion for mating with the rim surrounding an opening in the top of the dirt cup lid.
Figure 38F:
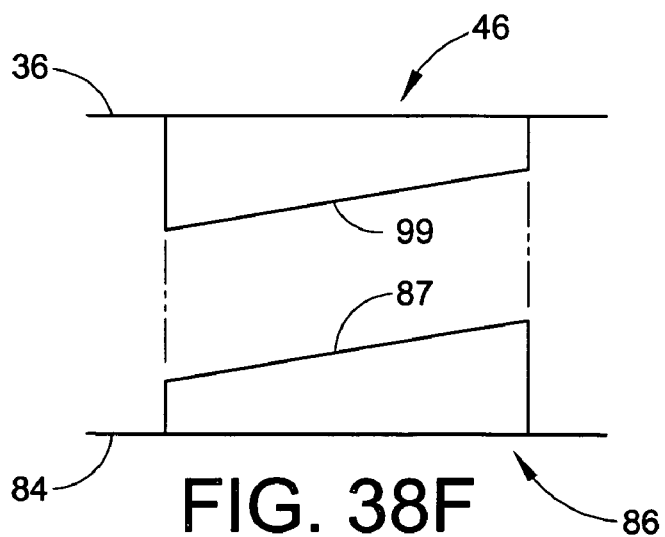
FIG. 38F is a side view of a dirt cup lid structure designed for easy mating with a bottom wall of a slinger portion in a cyclone when the dirt cup is rotated into operative position.

For example, as shown in FIG. 38F, the lid 84 may have an upright flange 87 surrounding each aperture 86, with the flange 87 having an inclined upper edge to mate with a corresponding inclined lower edge of a mating flange 99 depending from around the slinger passage exit ports 46. Use of these mating inclined edges permits a good sealing arrangement between the lid 84 and the underside of the bottom wall 36 of the slinger chamber 34.

A resilient gasket 88 may further be employed to maintain such a seal, as illustrated in FIGS. 38B-38E. The gasket 88 may include a flexible flap 90 which normally closes off the dirt cup aperture 86, but which may be bent down into the dirt cup 48 by the diverted airstream A' during operation of the vacuum cleaner to allow dirt and debris to pass through. The gasket 88 may be affixed either to the upper side of the dirt cup lid 84 (FIG. 38D) or to the underside of the bottom wall 36 of the cyclone slinger portion 35 (FIG. 38E). By being compressed between the dirt cup lid 84 and the bottom wall 36 of the cyclone slinger portion 35, the gasket 88 provides a seal to minimize or eliminate air leakage at the interface between these two parts in the system.

Figure 39:
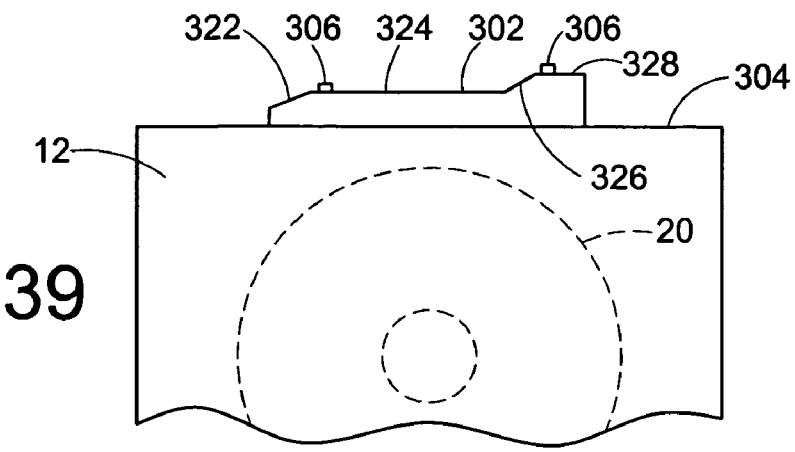
FIG. 39 is a side view of a cam rib on the motor cover with an upper surface having horizontal sections of different heights separated by inclined ramps.
Figure 40:
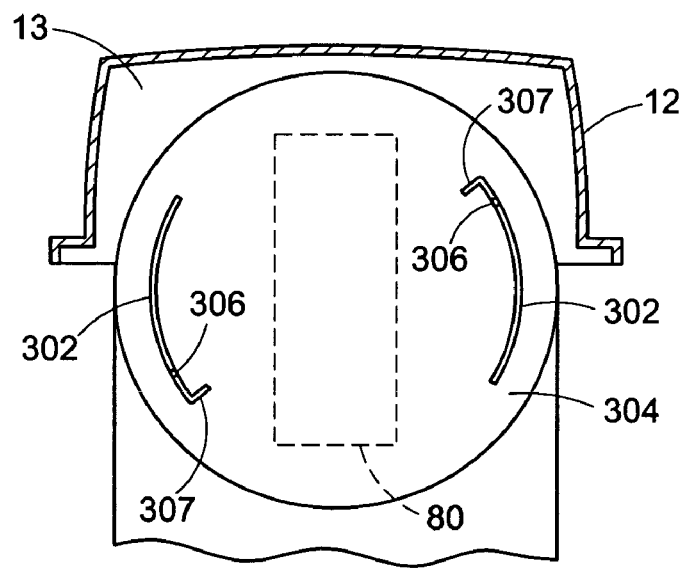
FIG. 40 is a top plan view of the motor cover shown in FIG. 39, disposed in an upright body, and showing the arcuate shape of the cam ribs.
Figure 41:
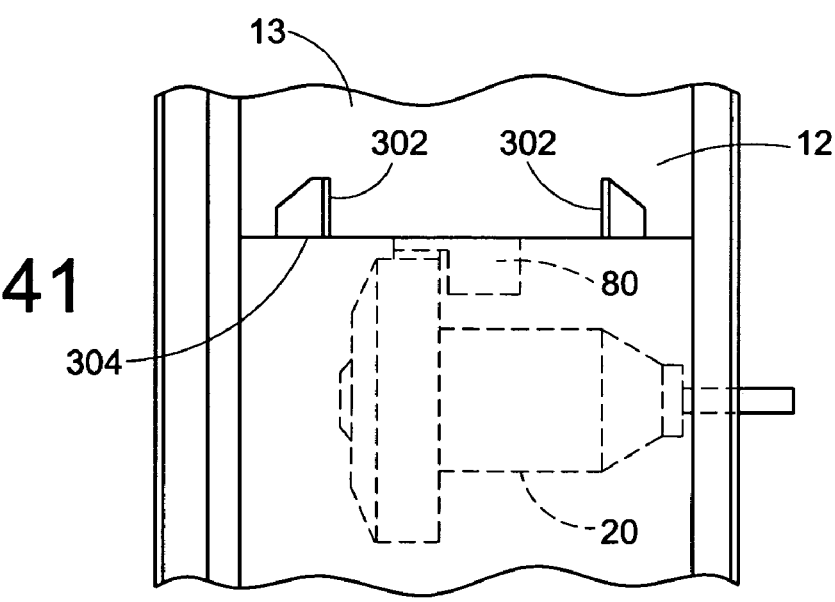
FIG. 41 is a front plan view of the cam rib and motor cover shown in FIGS. 39 and 40, showing the motor/fan assembly in phantom outline.

Another mechanism for providing a seal between the dust cup and the cyclone slinger portion 35 is placing cooperating rotational camming structures on the dust cup 300 and the upright body 12, as shown in FIGS. 39-48. In this embodiment, the dust cup 300 is disposed immediately above the motor cover 304 formed in the upright body 12. The top of the motor cover 304 has two arcuate cam ribs 302, as shown in FIGS. 39-41, wherein the height of the cam ribs 302 ramps up from a lowest height at one end to a highest height at the other end (particularly shown in FIG. 39). This arcuate ramping structure cooperates with corresponding arcuate structure on the bottom wall 301 of the dirt cup 300 so that, as the dirt cup 300 is rotated upon the motor cover 304, it is elevated and sealed against the bottom wall 36 of the slinger chamber 34. The cam ribs 302 may additionally have one or more projecting bumps 306 on their top surface to help lock the dust cup 300 into place, and/or a rotation stop 307 at one end.

Figure 42:
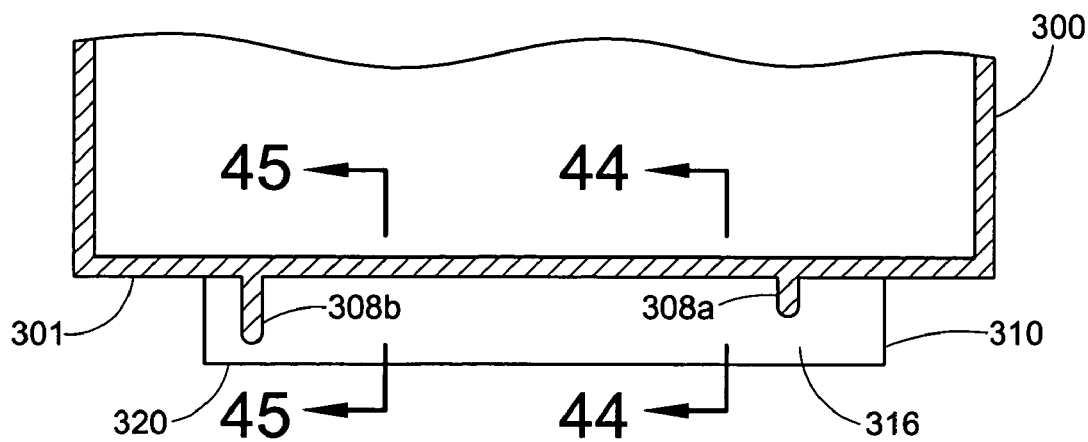
FIG. 42 is a schematic sectional view of a dirt cup, taken along line 42-42 in FIG. 43, showing a guide wall and projections on the bottom wall of the dirt cup.
Figure 43:
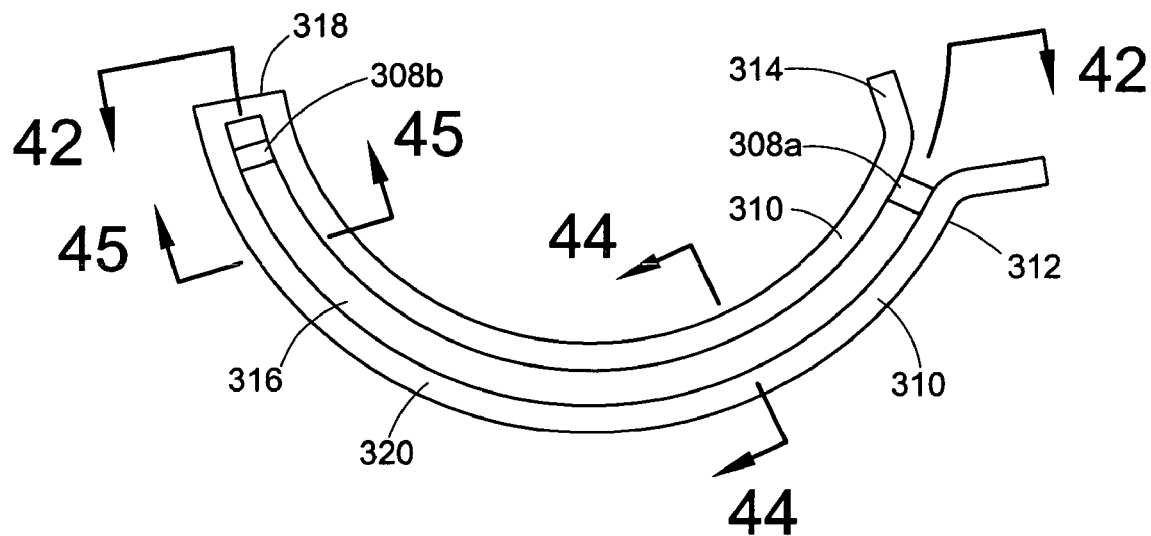
FIG. 43 is a bottom plan view of a guide wall structure on the bottom of a dirt cup forming a channel for receiving a cam rib on the motor cover of an upright vacuum cleaner body.
Figure 44:
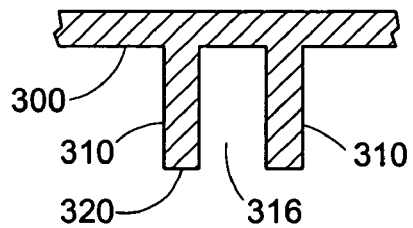
FIG. 44 is a sectional view taken along line 44-44 in FIGS. 42 and 43, and showing the guide walls and channel on the bottom of a dirt cup.
Figure 45:
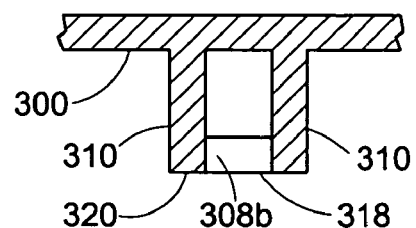
FIG. 45 is a sectional view taken along line 45-45 in FIGS. 42 and 43, and showing the guide walls and channel on the bottom of a dirt cup with a projection disposed in the channel.

The bottom wall 301 of the dust cup 300 has one or more generally rectangularly shaped projections (with two 308a and 308b being shown in FIGS. 42-45) disposed in a channel 316 in between two guide walls 310 curved to receive a cam rib 302. As best shown in FIG. 42, the projection 308a is shorter than the projection 308b in order to cooperate with different portions of the cam ribs 302 as described in more detail below.

At a first end 312 (FIG. 43) the guide walls 310 flare out 314 to guide the cam rib 302 on the top of the motor housing 304 into the channel 316 between the guide walls 310 on the bottom 301 of the dirt cup 300. The guide walls 310 may be closed at the second end 318. The bottom surfaces 320 of the generally parallel guide walls 310 are flat so that the dust cup 300 may easily rest upon a flat surface when removed from the upright body 12.

Figure 46:
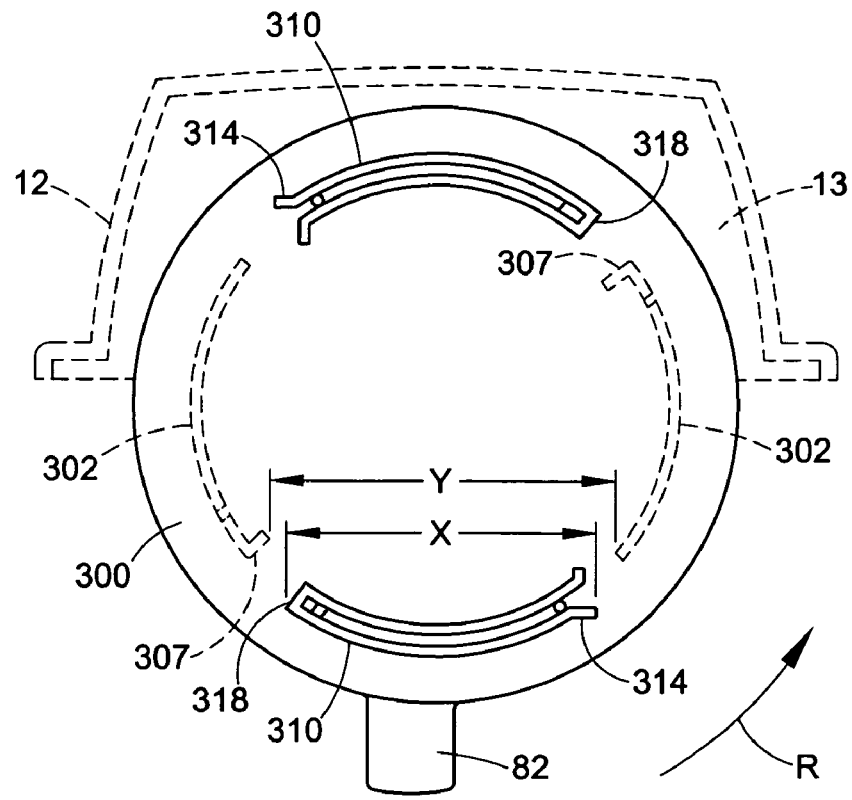
FIG. 46 is a bottom view of a dirt cup in an upright body, not showing the motor cover for ease of illustration but showing in phantom where the cam ribs of the motor cover would be oriented, to illustrate schematically the dirt cup right after it is inserted into the upright body and before any rotation, and the spatial relationship of the guide walls on the dirt cup and the cam ribs on the motor cover.
Figure 47:
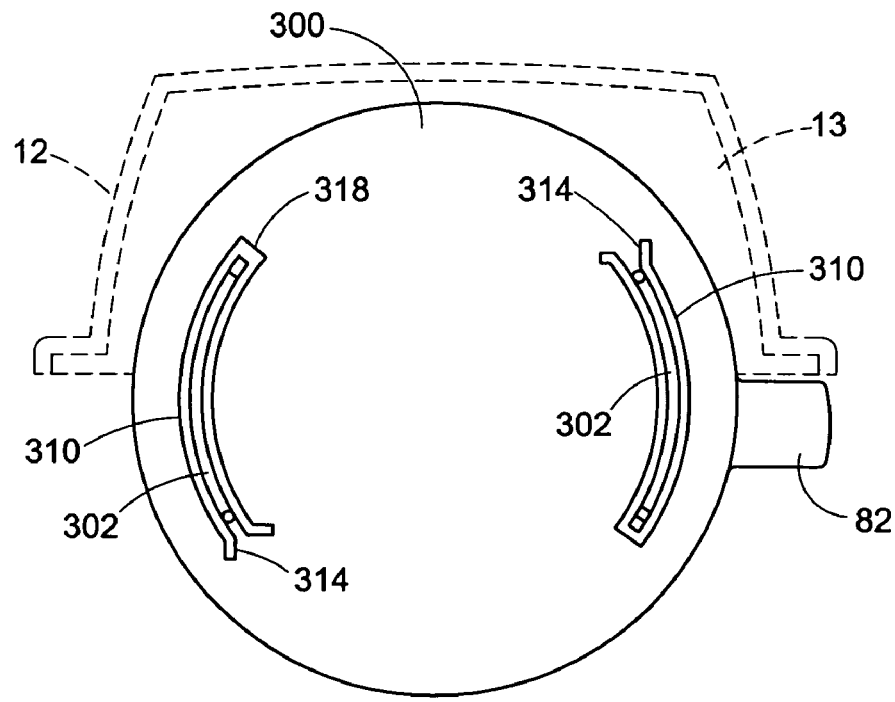
FIG. 47 is a bottom view of a dirt cup in an upright body, not showing the motor cover for ease of illustration, to illustrate schematically the dirt cup after it has been fully rotated into its final rest position, and the spatial relationship of the guide walls on the dirt cup and the cam ribs on the motor cover.

FIGS. 46-47 and 48A-48C show how the cam ribs 302 on the motor cover 304 cooperate with the projections 308a and 308b and guide walls 310 to upwardly cam the dust cup 300 into a seal with the upright body 12. FIGS. 46 and 47 schematically show, respectively, the dirt cup 300 right after it is inserted into the upright body and before any rotation (FIG. 46), and the dirt cup 300 after it has been fully rotated R through approximately a 90° rotation into its final rest position (FIG. 47). These Figures are bottom views of the dirt cup 300, not showing the motor cover 304 for ease of illustration but showing in phantom where the cam ribs 302 would be oriented.

FIG. 46 shows the dust cup 300 immediately upon insertion into the upright body 12, and illustrates how the guide walls 310 on the dust cup 300 fit in between the cam ribs 302 until the dust cup 300 is fully inserted in the receptacle 13 of the upper body 12 with the dirt cup handle 82 pointing straight out. If the widest lateral extent of the guide walls 310 is X (FIG. 46), then the smallest lateral gap between the cam ribs 302 is Y which is greater than X by some small amount. This relative dimensioning ensures that the user will be able to insert the dirt cup 300 into the proper position.

As shown in FIGS. 46-47, rotation of the dust cup 300 in the upright body 12 (in a counterclockwise direction in the views of the Figures) causes the cam ribs 302 to be guided in between the guide walls 310. The flares 314 may help this guidance to occur. Further rotation may be stopped in one or more of several ways: the handle 82 running up into the upright body 12; the cam ribs 302 reaching the closed end 318 of the guide walls 310; a rotation stop 307 reaching the flares 314; and any other such method as would be known to one of ordinary skill in the art.

Figure 48A:
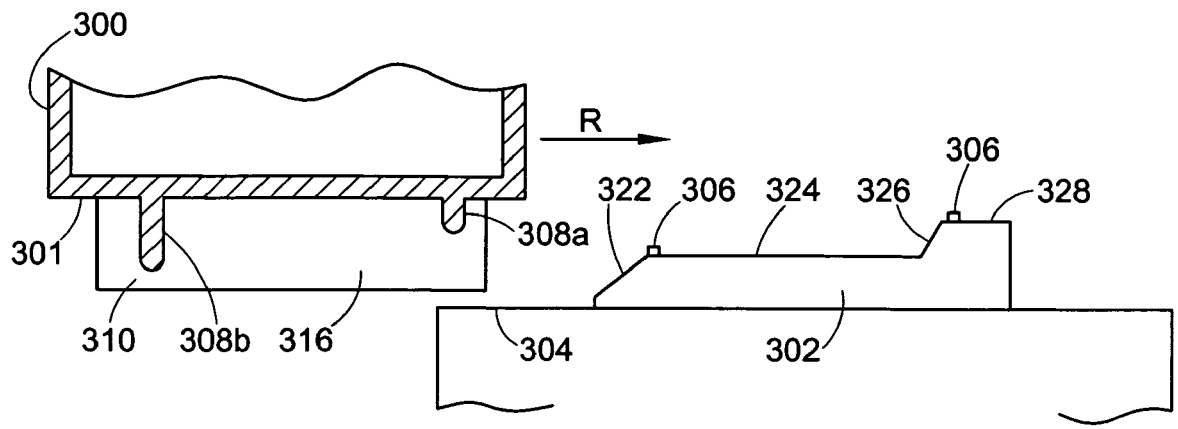
FIGS. 48A to 48C each show an arcuate cross section of the dirt cup through the channel between the guide walls, along line 42-42 in FIG. 43 and a side view of the cam rib on top of the motor cover, to illustrate the successive stages, as the dust cup is rotated, of the cam rib entering the channel between the guide walls.
Figure 48B:
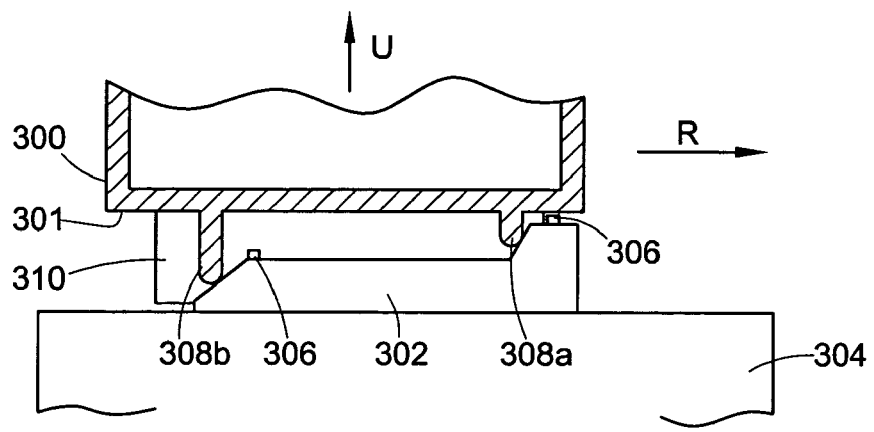
Figure 48C:
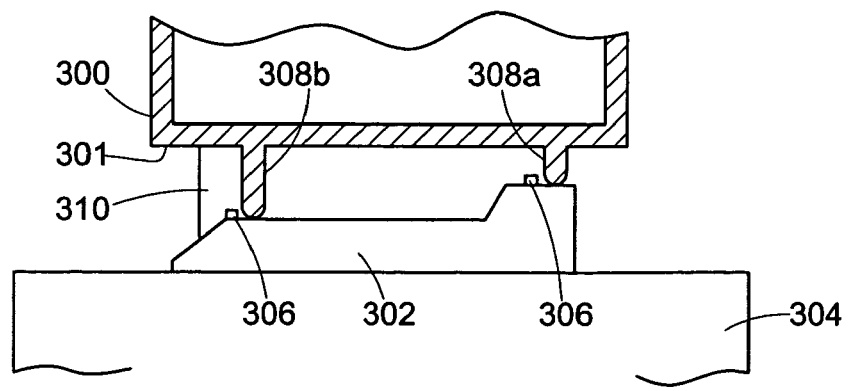

As the dust cup 300 is inserted and rotated R within the upright body 12, the dust cup 300 is elevated by the sliding cooperation between the ramped surfaces of the cam ribs 302 on the motor cover 304 and the projections 308 on the dust cup 300. FIGS. 48A-48C show the successive stages, as the dust cup 300 is rotated R, of a cam rib 302 entering the channel 316 between the guide walls 310. These Figures show an arcuate cross section of the dirt cup 300 through the channel 316 between the guide walls 310, and a side view of the cam rib 302 on top of the motor cover 304.

FIG. 48A shows the relationship just as rotation R of the dust cup begins. As rotation R continues, the shorter projection 308a encounters the cam rib 302 first and is cammed upwardly along a first ramp 322 to reach a horizontal surface 324 of the cam rib 302. The first ramp 322 also helps to guide the cam rib 302 into the channel 316 between the guide walls 310. With continued rotation R of the dirt cup 300, projection 308a traverses across the first horizontal surface 324 on the cam rib 302. The spacing between the first and second ramps 322 and 326 substantially equals the spacing between projections 308a and 308b. Therefore, when the shorter projection 308a starts up the second ramp 326, the longer projection 308b will substantially simultaneously start up the first ramp 322. FIG. 48B shows the projections 308a and 308b following the ramps 322, 326 during this rotation R of the dirt cup 300, so that the dirt cup 300 is cammed upwardly U until the upper edge of the dirt cup 300 (or the dirt cup lid) seals against the bottom surface of the bottom wall 36 of the cyclone slinger portion 35.

Figure 49:
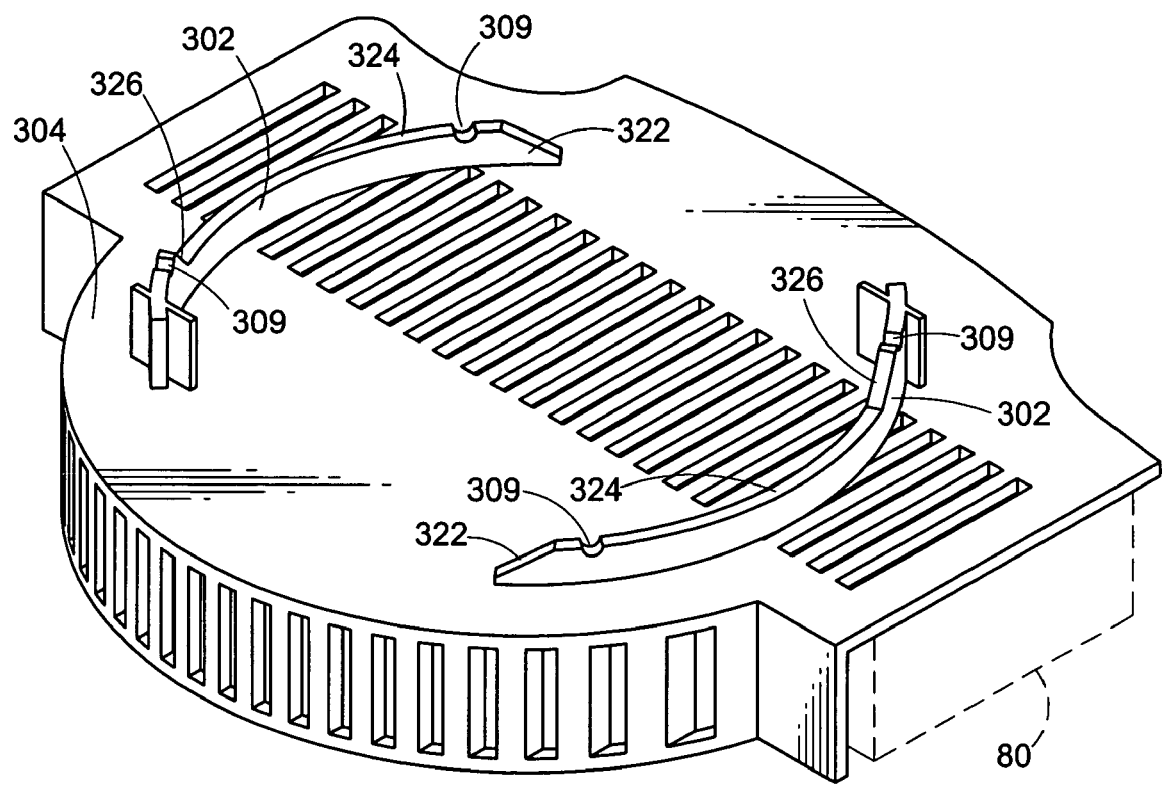
FIG. 49 is a top perspective view of a motor cover with cam ribs having depressions in them for mating with projections on the bottom of a dirt cup camming structure, as well as vents for release to the atmosphere of air passed through a post-motor filter.
Figure 50:
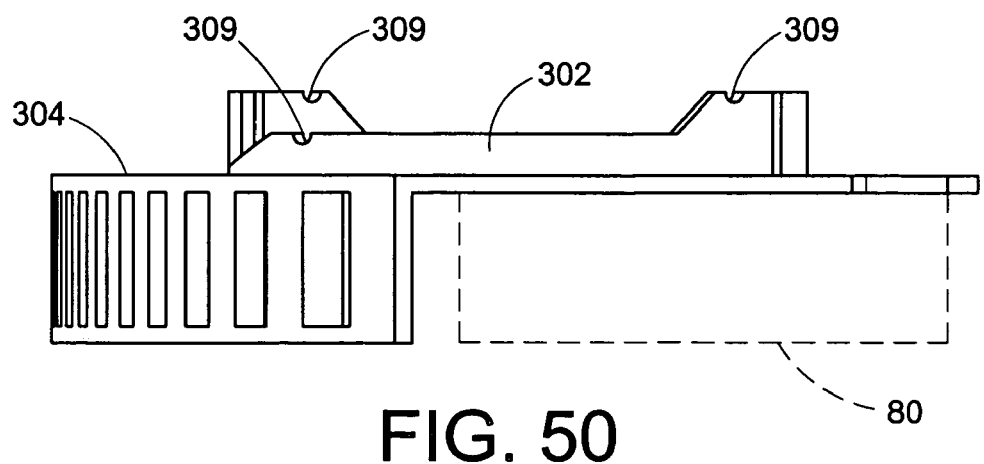
FIG. 50 is a side view of the motor cover of FIG. 49.

Because the first and second ramps 322 and 326 are of approximately equal length, the projections 308b and 308a will respectively reach the first horizontal surface 324 and the second horizontal surface 328 at the same time. Rotation continues until the projections 308a and 308b may flex to overcome and pass correspondingly placed projecting bumps 306 on the cam rib 302. FIG. 48C shows the final resting place of the dirt cup 300, where the projections 308a and 308b have just passed the bumps 306. Alternatively, the projections 308a and 308b may come to rest in correspondingly placed depressions 309 in the cam ribs 302, as shown in FIGS. 49-50. The second ramp 326 provides the final upward thrust to push the dust cup 300 so that the opening(s) in the dust cup 302 for receipt of dirt and other debris become sealed by a gasket, as described above. The projections 308a and 308b may be sized so that they must bend slightly to overcome the bumps 306 on the cam rib 302, so that the dirt cup 300 is kept from rotating out of the upright body 12 until a sufficient force is applied for the projections to bend back the other way and pass the bumps 306 again. This camming arrangement minimizes surface contact between the face of a gasket 88 and the mating surface (such as the bottom wall 36 of the cyclone slinger portion 35) until the final few degrees of rotational movement of the dirt cup 300. This minimized "scrubbing" of the gasket 88 against a sealed surface extends the lifetime of the gasket 88, by preventing excessive warping and abrasion of the gasket due to excessive wear.

To remove the dirt cup 300, the user rotates it in the opposite direction and the process occurs in reverse. As the dust cup 300 is reverse rotated (in a clockwise direction in the views of FIGS. 46-47), the cooperative camming ramps 304 lower the dust cup 300 to an unsealed position for ready removal.

The Figures show cam ribs 302 disposed on the motor cover 304 and the projections 308 on the dirt cup 300. Of course, the cam ribs 302 may alternatively be disposed on the dirt cup 300 with the projections 308 located on the motor cover 304.

The dirt cup 48, 300 may be configured to look like a coffee pot, somewhat like as shown in FIG. 38A, for customer recognition and comfort in use. The dirt cup handle 82 may be hidden, enclosed or otherwise not readily noticeable when the dirt cup is placed in its closed, sealed position (as for example shown in FIG. 47) to minimize any tendency of a person trying to lift the vacuum cleaner by the dirt cup handle. The handle 82 is located on the dirt cup such that it conveniently faces the user upon installation or removal of the dirt cup, and also may act as a lever to induce rotation of the dirt cup and cause a camming action to occur. When rotated into the locked, operating position the handle is moved away from the front of the cleaner. In such a position, the extent of the vacuum cleaner's profile is reduced during use so that it may more easily fit underneath objects such as tables and chairs.

Several of the Figures show the dirt cup lid 84 as being a separate component from the cyclone slinger portion 35, particularly as being separate from the bottom wall or platform 36. Alternatively, as already discussed in connection with FIGS. 15A-15B and 16-17, the lid 84 may be formed as an single, integral piece which incorporates part or all of the cyclone slinger portion 35. For example, the top surface of the lid 84 may form the flat bottom wall or platform 36 of the cyclone slinger portion 35. In that case, gaskets likely should be provided around the interface between the exit port(s) 46 from the slinger arms 44 above the lid 84 and the aperture(s) 86 in the lid 84. This embodiment is preferred where the dirt cup is provided with a lid 84. It reduces the number of components and thereby reduces the cost of making the vacuum cleaner. It further permits easier access to the housing receptacle retaining the cyclone 26 and its slinger portion 35, so that removing clogs from the system is facilitated. The dirt cup may be raised and lowered, for example, by the camming configurations shown in FIGS. 39-47 and 48A-48C.

Figure 51:
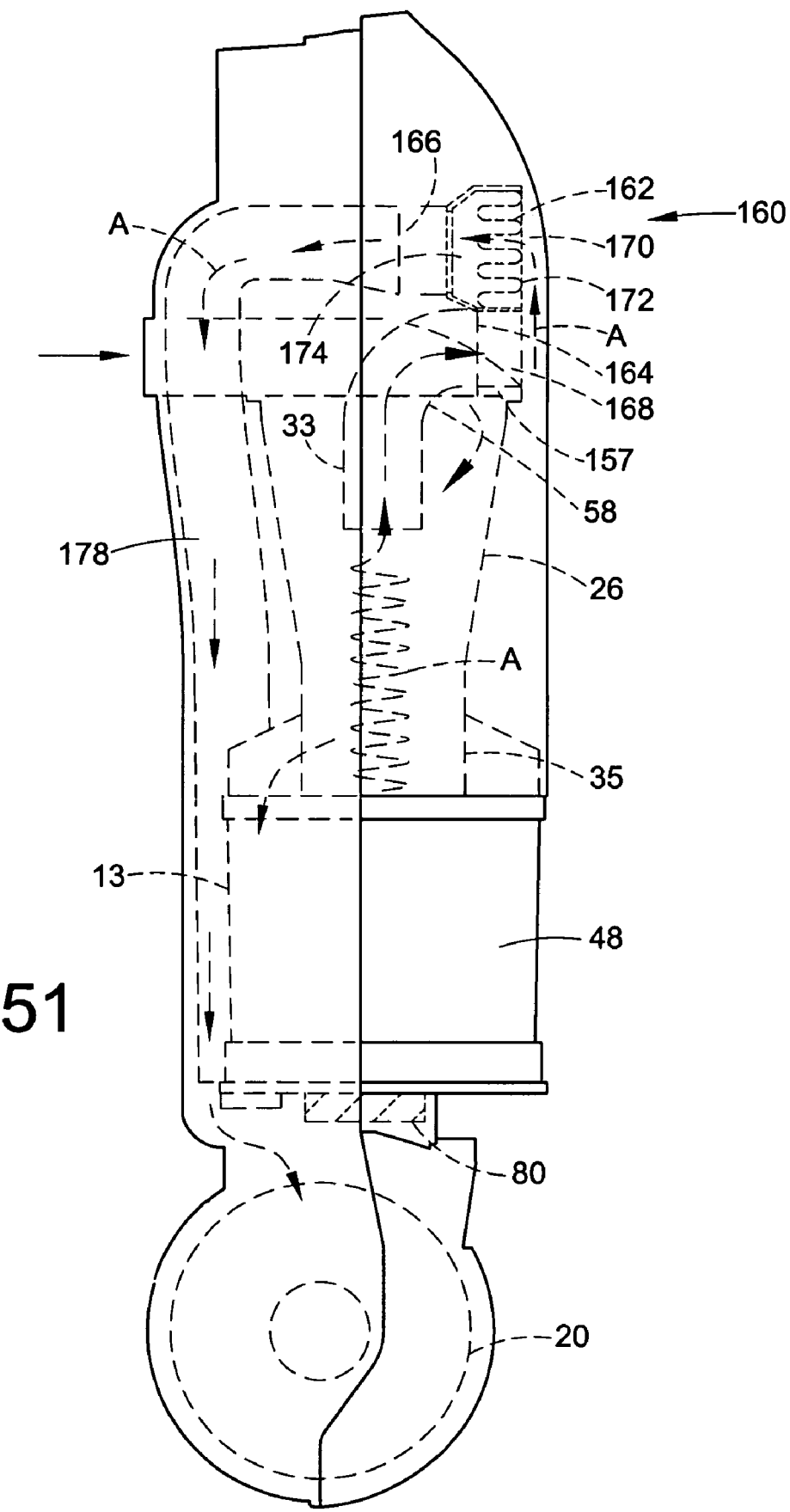
FIG. 51 is a schematic side sectional view taken vertically through another embodiment of a vacuum cleaner upright body incorporating a cyclone separation system according to the present invention, with the main filter disposed above the cyclone.

FIG. 51 shows an alternative embodiment to the cleaner shown in FIG. 2, wherein a filter chamber 160 is disposed generally above the cyclone 26 instead of next to it. In this alterative embodiment, a conduit 157 carries the airstream A upwardly from the cyclone outlet 58 to a filter chamber inlet 164. The airstream A passes through the transfer passage 168 to a front plenum 170 and passes through the filter 162 to enter the back plenum 174 of the filter chamber 160. From there the airstream A exits the filter chamber 160 through a filter chamber outlet 166 to enter a conduit 178 to the motor and fan assembly 20. As in the FIG. 2 embodiment, the filter 162 may be disposed in a transparent, pivotal filter door configuration similar to FIG. 23 so that the filter 162 is readily viewable by and accessible to the user. When the filter 162 becomes dirty, the filter 162 can be cleaned or replaced by access through the door. A camming arrangement such as the one shown in FIGS. 39-47 and 48A-48C may be used for holding the dirt cup in the upright body.

FIGS. 52 and 53 show another embodiment, where the cyclone 26 and its slinger portion 35 are both disposed within a dirt cup 248. A wall 249 may span the entire dirt cup 248 to form two separate compartments. The upper compartment houses the cyclone 26 and its slinger portion 35 while the lower compartment acts as the dirt cup. The wall 249 may be used to help keep dirt and debris from entering the annular region between the cyclone 26 and the dirt cup 248, thus making it easier to clean the dirt cup 248. The dirt cup 248 may be removed from the upright body 12 together with its cap 284 by releasing a latch 207 disposed on the cap 284. The cap 284 may be releasably held in place on the dirt cup 248, for example, by a bayonet connection interlocking with tabs 209 on the dirt cup 248. The cap 284 may contain the main filter 262 and a cyclone starter. Once removed, the dirt cup 248 may be emptied of dirt by pivotally opening up its bottom wall 203 which is normally held closed by a latch mechanism 205. A filter 262 may be disposed in a filter chamber 260 in the cap 284. In this way the consumer may remove both the dirt cup 248 and the cap 284 from the vacuum cleaner as one assembly and easily perform maintenance on both items at once (empty the dirt cup 248 and wash or clean the filter 262).

Figure 54:
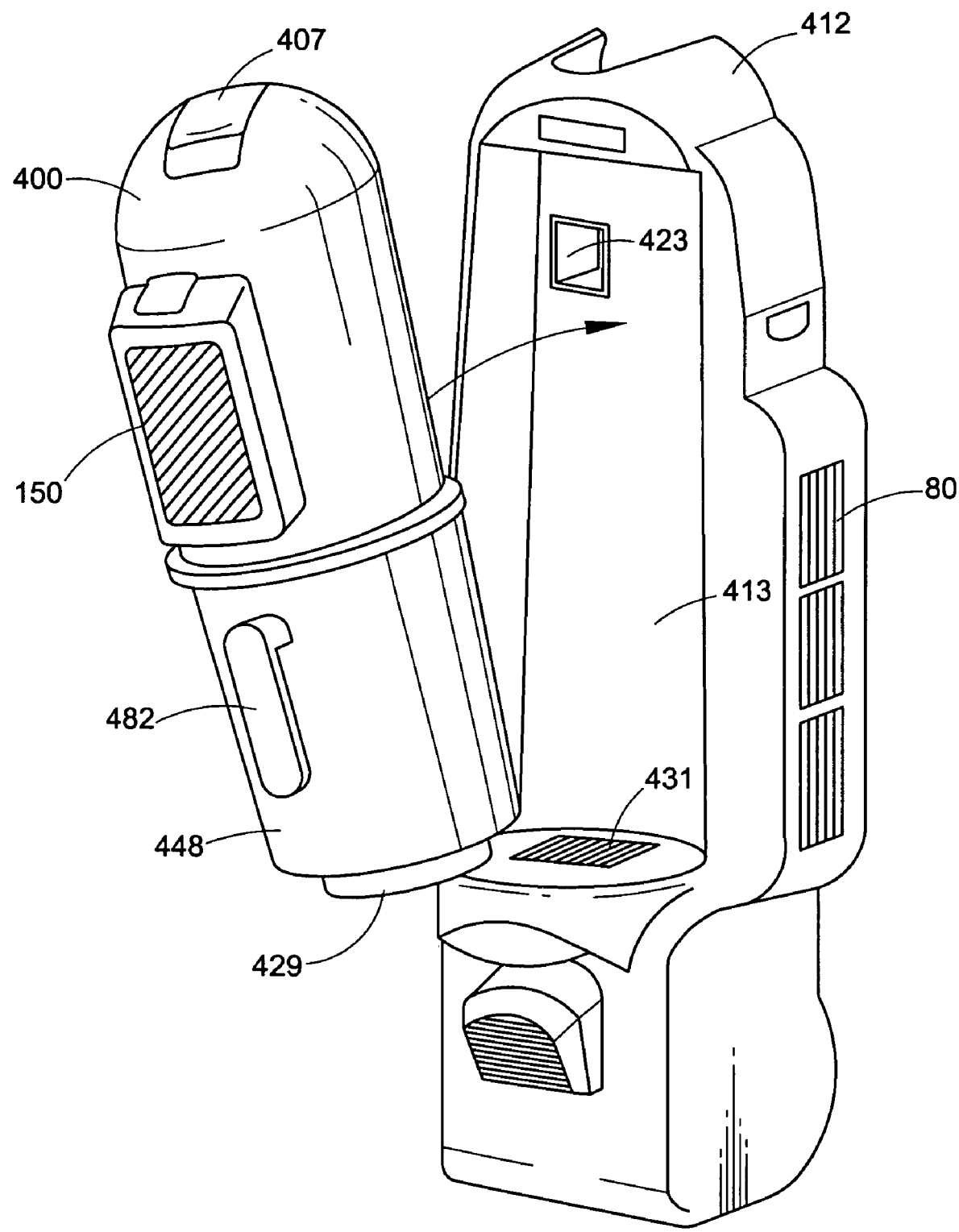
FIG. 54 is a front, top, left perspective view of another embodiment, showing a removable cyclone starter and filter module and dirt cup.

FIGS. 54, 55A and 55B show yet another embodiment. As shown best in FIG. 55A, the filter 463 in the filter chamber 460, the cyclone 26 and the cyclone slinger portion 35 are all disposed in a cyclone starter and filter module 400. The filter module 400 is removably attached to the dirt cup 448 having a handle 482, for example by an interlocking tab slot combination shown in FIG. 55A. The filter module 400 and dirt cup 448 are removably held within a receptacle 413 of an upright body 412, for example by a latch mechanism 407. This embodiment achieves the same ease of maintenance as the embodiment of FIGS. 45-46, but the dirt cup 448 is even easier to clean because there is no cyclone 26 in the way. Although the Figures show a removable transparent filter cover 150 protecting the filter 463 and holding it in place, of course the filter 463 may alternatively be disposed in a transparent, pivotal filter door configuration similar to FIG. 23. The filter cover 150 may alternatively be opaque.

In this embodiment, the airstream A flows from the nozzle opening 18 to an upright body outlet port 423 which is sealingly connected to the inlet 24 of the cyclone 26. The airstream A then passes through the cyclone 26 and the cyclone slinger portion 35 to reach a cyclone outlet 58, as previously described with respect to FIGS. 2-8. From the cyclone outlet 58 the airstream A passes through a conduit (not shown) in the filter module 400 to exit the filter module 400 at a bottom exit port (also not shown). The bottom exit port in the filter module 400 mates with the top entry 427 of a dirt cup conduit 425 on the side of the dirt cup 448, preferably with a gasket to improve the sealing. The airstream passes from the filter module 400 into the top entry 427 of the dirt cup conduit 425 and travels to the bottom exit 429 of the conduit 425. After exiting the dirt cup conduit 425 the airstream passes through a pre-motor filter 431 and then into the motor/fan assembly 20. A post-motor filter 80 may be employed, preferably a HEPA filter.

Figure 56:
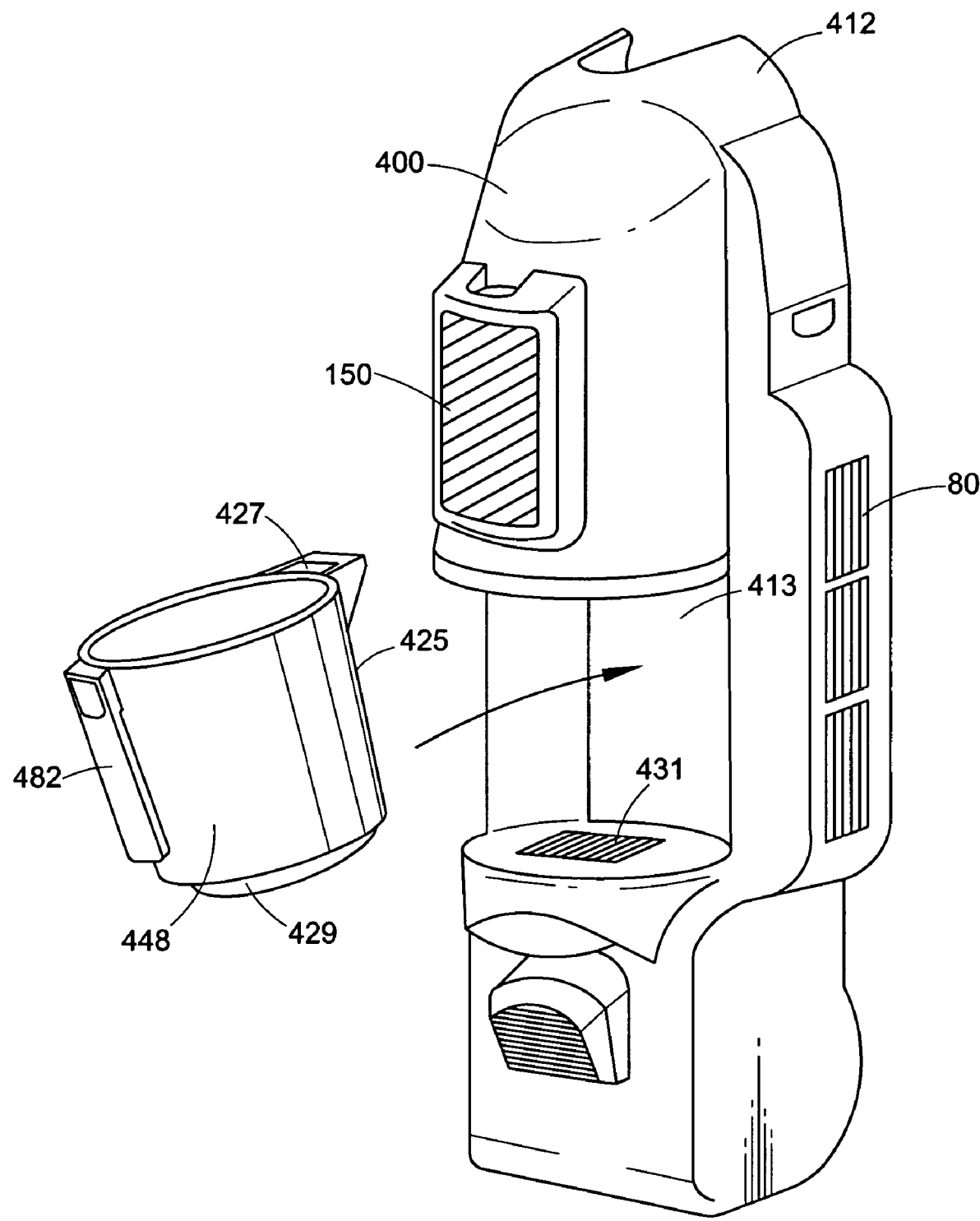
FIG. 56 is a perspective of an embodiment similar to the one disclosed in FIGS. 54 and 55A-55B, except that the cyclone starter and filter module is formed integrally with the upright body so that only the dust cup is removable as shown.

The embodiment of FIG. 56 is similar to the embodiment of FIGS. 54, 55A and 55B except that the filter module 400 is formed as an integral part of or secured to the upright body 12. The dirt cup 448 may be inserted, sealed and removed using the camming structures of FIGS. 39-47 and 48A-48C while still incorporating the dirt cup conduit 427 of FIGS. 54 and 55A-55B. FIG. 56 also shows an optional post-motor filter 80, preferably a HEPA filter.

Figure 57:
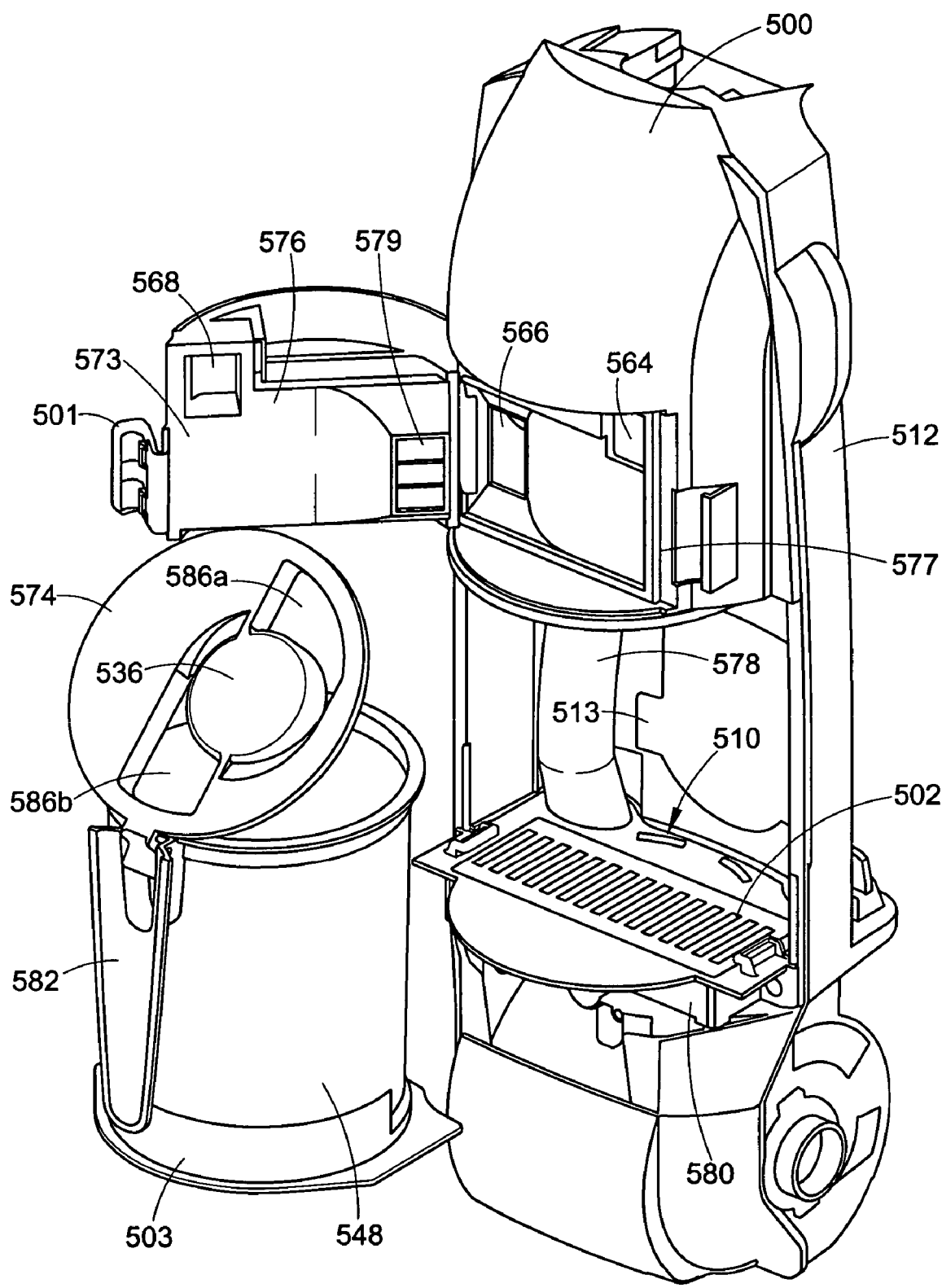
FIG. 57 is a perspective, assembly view of a vacuum cleaner embodiment showing a body portion and a dirt cup for removable positioning in the body portion, with a main filter disposed in a filter door of the cyclone starter and filter module of the body portion, and the dirt cup having a hinged lid on its top and a camming plate on its bottom.

FIGS. 57-62 show a further vacuum cleaner embodiment incorporating several of the structures described above. FIG. 57 shows the upright body 512 and a dirt cup 548 removably fitted into a receptacle 513 of the upright body 512. The cyclone starter and filter module 500 of the upright body 512 houses a cyclone 526 (shown in FIG. 58) and a cyclone slinger portion 535 with two slinger arms 544 (not shown). The dirt cup 548 has a lid 574 and a handle 582. The dirt cup lid 574 has two apertures 586a, 586b through which dirt and other debris pass out of the cyclone slinger portion 535 and into the dirt cup 548. The circular portion 536 of the dirt cup lid 574 disposed in between the apertures 586a, 586b forms the bottom wall 536 of the cyclone slinger portion 535. A dirty airstream passes into and through the cyclone 526 and the cyclone slinger portion 535, with separated dirt collecting in the dirt cup 584, as described in more detail above.

Figure 58:
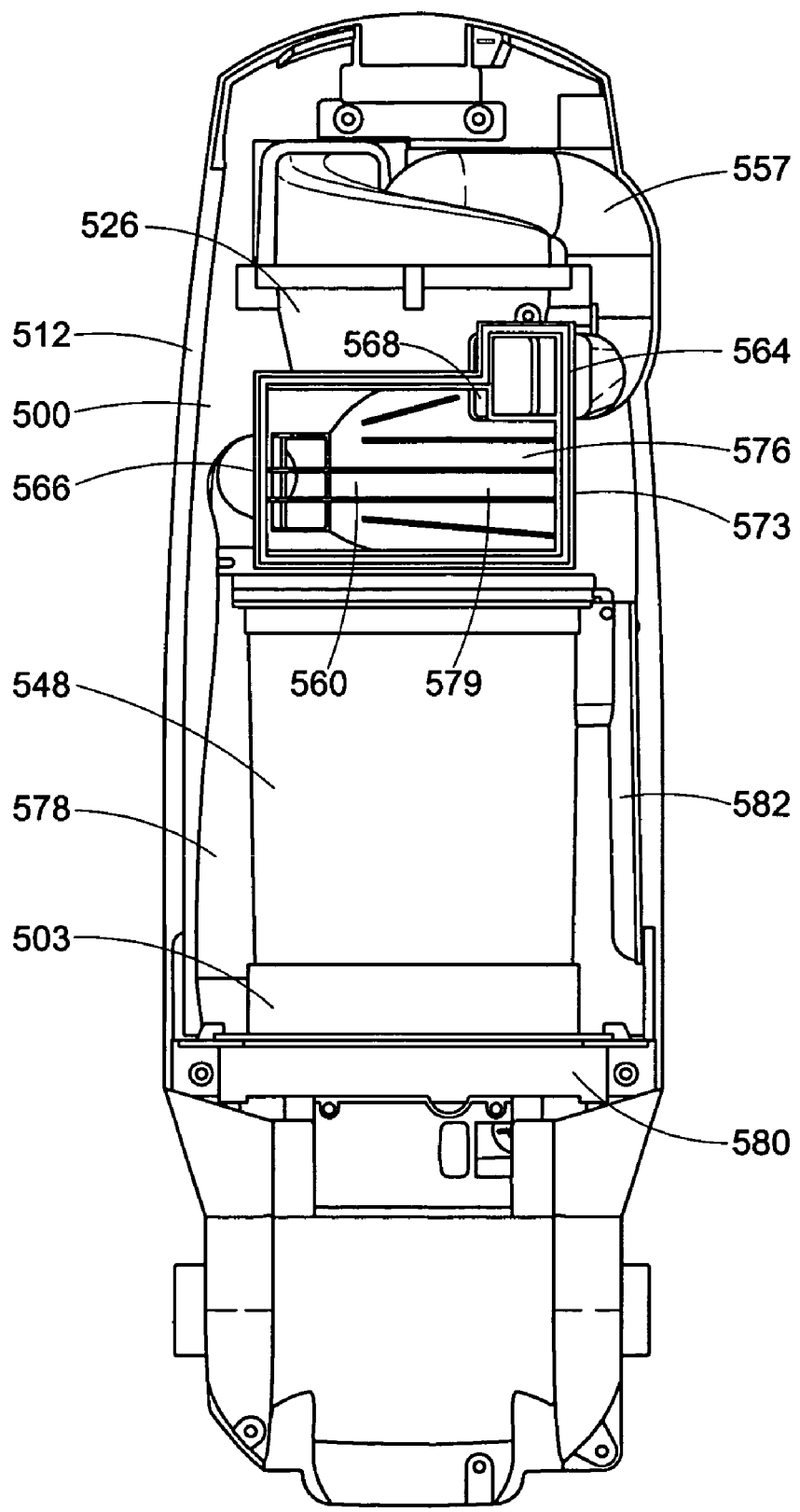
FIG. 58 is a schematic front view of the vacuum cleaner embodiment shown in FIG. 57, with a cover of the cyclone starter and filter module removed to show the cyclone in that module, and the back wall of the filter chamber with ribs.
Figure 59:
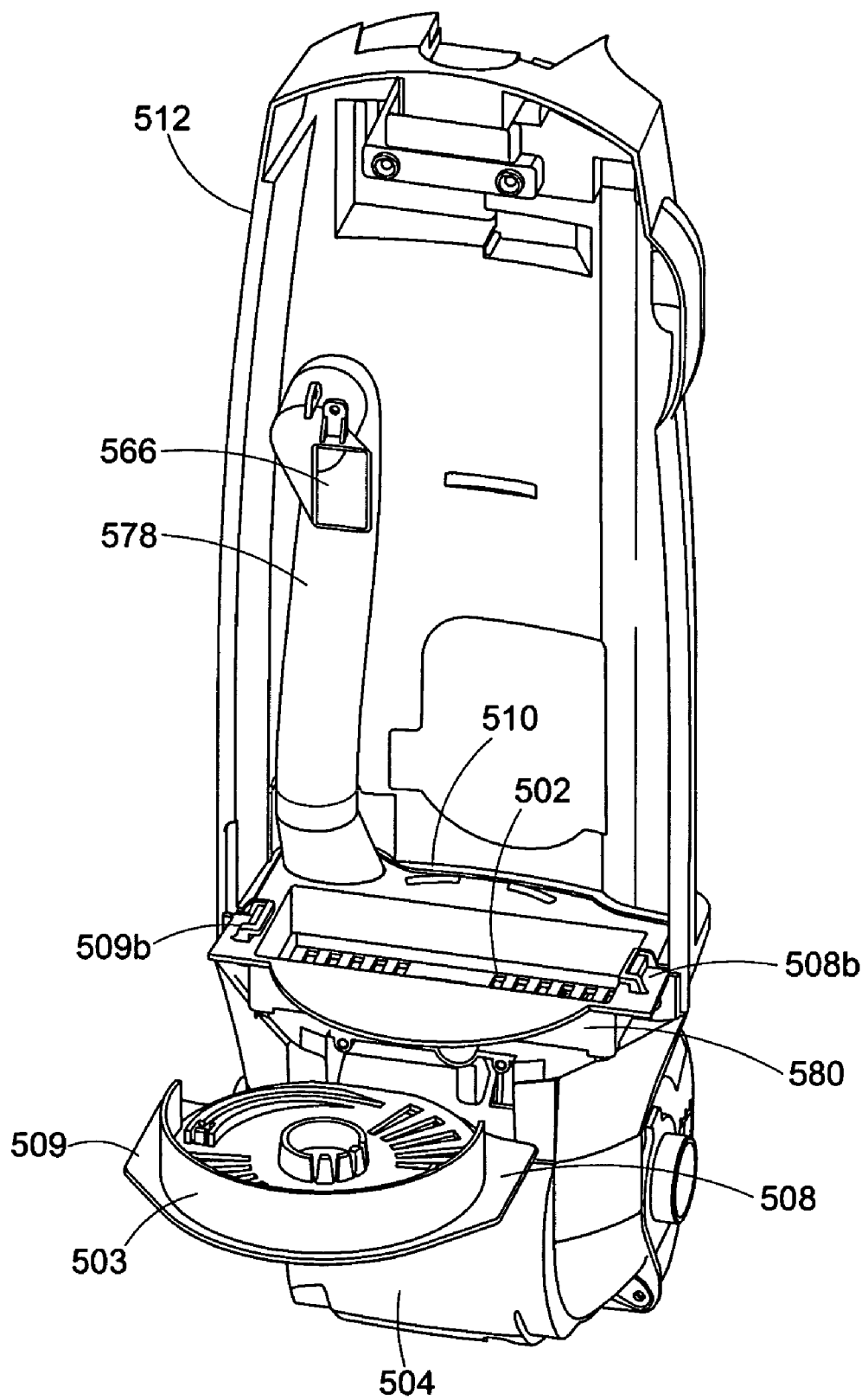
FIG. 59 is a front, top, right perspective view of the vacuum cleaner embodiment shown in FIG. 57, with the entire cyclone starter and filter module removed and the dirt cup not shown, illustrating a conduit for carrying an airstream from the filter chamber to the motor/fan assembly and a camming plate to be disposed underneath the dirt cup.

FIG. 58 shows a conduit 557 for carrying an airstream from the cyclone outlet 558 (not shown) to a filter chamber 560 comprising a door 573. The airstream enters through a filter chamber inlet 564 and passes through a transfer passage 568 in the door 573 to a front plenum (not shown). The airstream then passes through a filter (not shown) which is securely placed at a proper position in the door 573 by ribs 579 on the back wall 576 of the door 573. The ribs 579 further help guide the airstream to the filter chamber outlet 566. A latch 501 securely holds the door 573 in the closed position, and a gasket 577 helps to maintain a proper seal to keep the airstream from leaking out of the filter chamber 560 when the door 573 is closed. As shown in FIGS. 58-59, another conduit 578 takes the airstream from the cyclone chamber outlet 566 to a suction source 520 inlet (not shown).

The suction source outlet leads to a post-motor chamber 580 housing a post-motor filter, preferably a HEPA class filter. The filter chamber 580 outlets the airstream through a series of vents 502 in the top of the motor cover 504.

To permit access to the filter chamber 580 for maintenance of the post-motor filter, and at the same time provide the camming structure for securely inserting and sealing the dirt cup 548 into the upright body 512, a camming plate 503 may be provided as best shown in FIGS. 59-62. The camming plate 503 is removably attached to the bottom of the dirt cup 548 by one or more flexible fingers 505a disposed in a ring 505. The fingers 505a engage in an interference fit with an annular recess 506 disposed in a boss 507 protruding from the bottom of the dirt cup 548 along its central axis and into the ring 505. The camming plate 520 further has vents 523 to permit the passage of air coming from the vents 502 in the top of the motor cover 504.

The camming plate 503 has side flanges 508, 509 with rear edges 508a and 509a (FIG. 53) which are contoured to match the profile 510 (FIGS. 57 and 59) of the rear portion of the upright body 512. Thus, when the dirt cup 548 is inserted into the upright body 512 and rotated, interference between the side flanges 508, 509 and the upright body 512 prohibits the camming plate 503 from rotating with the dirt cup 548. Alternatively or additionally, the side flanges 508, 509 may slide into grooves 508b, 509b formed either by upstanding holding members as shown in FIG. 59 or formed in the sides of the upright body 512 itself.

Figure 60:
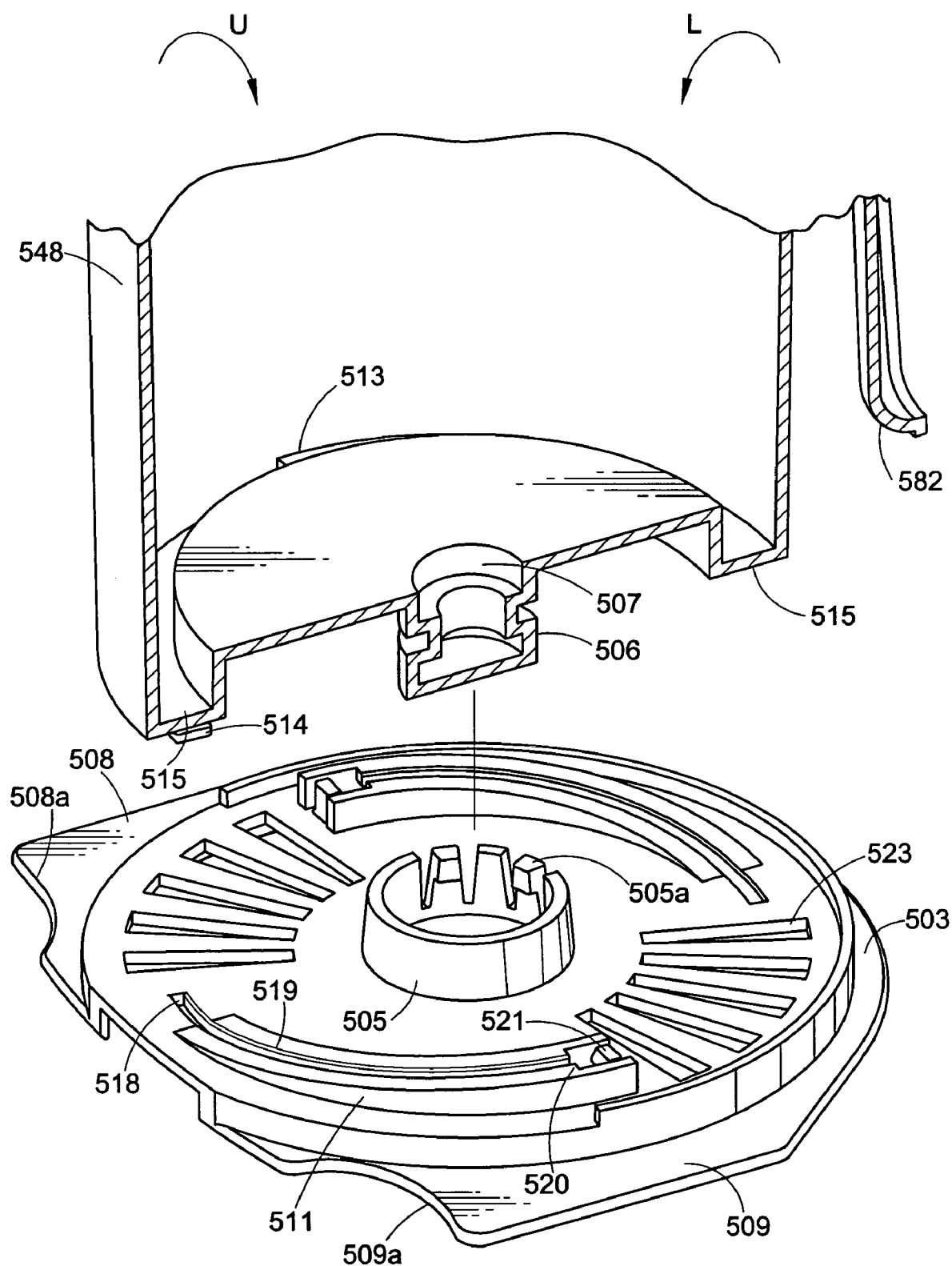
FIG. 60 shows a camming plate and dirt cup combination, with the camming plate shown in a perspective view and the dirt cup shown in a sectional view taken along a diameter of the dirt cup which bisects the dirt cup handle, illustrating a central dirt cup boss for insertion into a ring on the camming plate, and a sloping section with a tab at its bottom end on the dirt cup for interaction with a cam rib having a slot on the camming plate.
Figure 61:
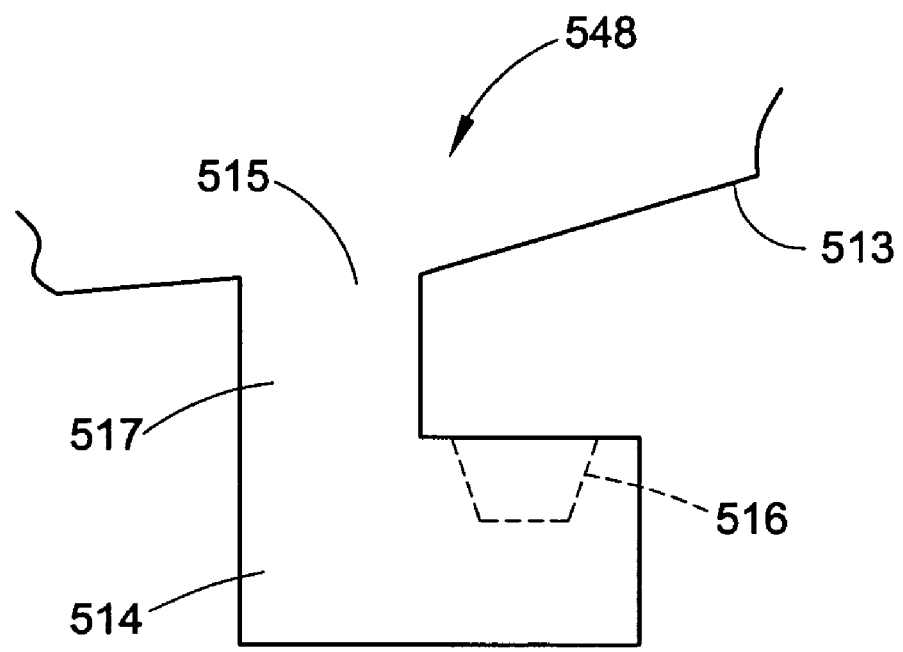
FIG. 61 is a side view of a tab projecting from a trailing end of a sloping section on a dirt cup, having a neck and a locking detent which is shown in phantom outline.

FIG. 60 shows the relative positioning of the camming plate 503 and the dirt cup 548 when they are initially inserted into the upright body 512. In that position, the top surfaces of the two cam ribs 511 on the camming plate 503 respectively abut against the bottom surfaces of two sloping sections 513 on the dirt cup 548 (only one sloping section 513 is shown in the sectional view of the dirt cup 548 in FIG. 60). One tab 514 projects from a trailing end 515 of each sloping section 513, as shown in FIG. 61, with a locking detent 516 in each tab 514. The neck 517 of each tab 514 projects through the bottom end 518 of a slot 519 disposed in the camming plate 503. Although the Figures illustrate two cam rib/sloping section combinations, of course one or three or more may be used.

Figure 62:
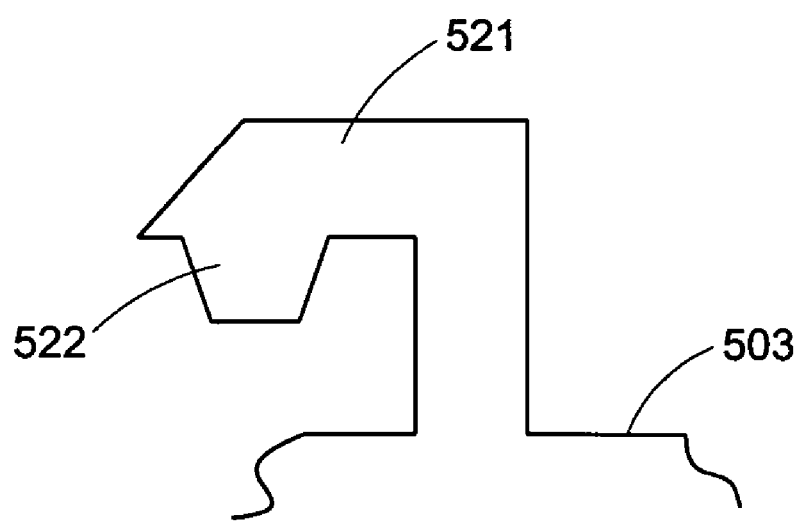
FIG. 62 is a side view of a tab lock disposed on a camming plate and having a locking projection for insertion into the locking detent of a tab on the dirt cup.

As the dirt cup 548 is rotated in a locking direction L, the trailing ends 515 of the sloping sections 513 on the dirt cup 548 slide up the cam ribs 511, thus forcing the dirt cup 548 up. The tab necks 517 slide within the slots 519 until they reach the top end 520 of the slots 519. Disposed at those top ends 520 are flexible tab locks 521 with locking projections 522 (FIG. 62). The locking projections 522 snap into the locking detents 516 to releasably hold the dirt cup 548 in its upper, sealed position. The user may exert enough rotational force in an unlocking direction U to force the locking projections 522 out of the locking detents 516 and remove the dirt cup 548 from the upright body 512. The height of the annular recess 506 should be greater than the height of the portions of the flexible fingers 505a extending into the annular recess 506, so that the dirt cup 548 may move up and down with respect to the camming plate 503.

Figure 63:
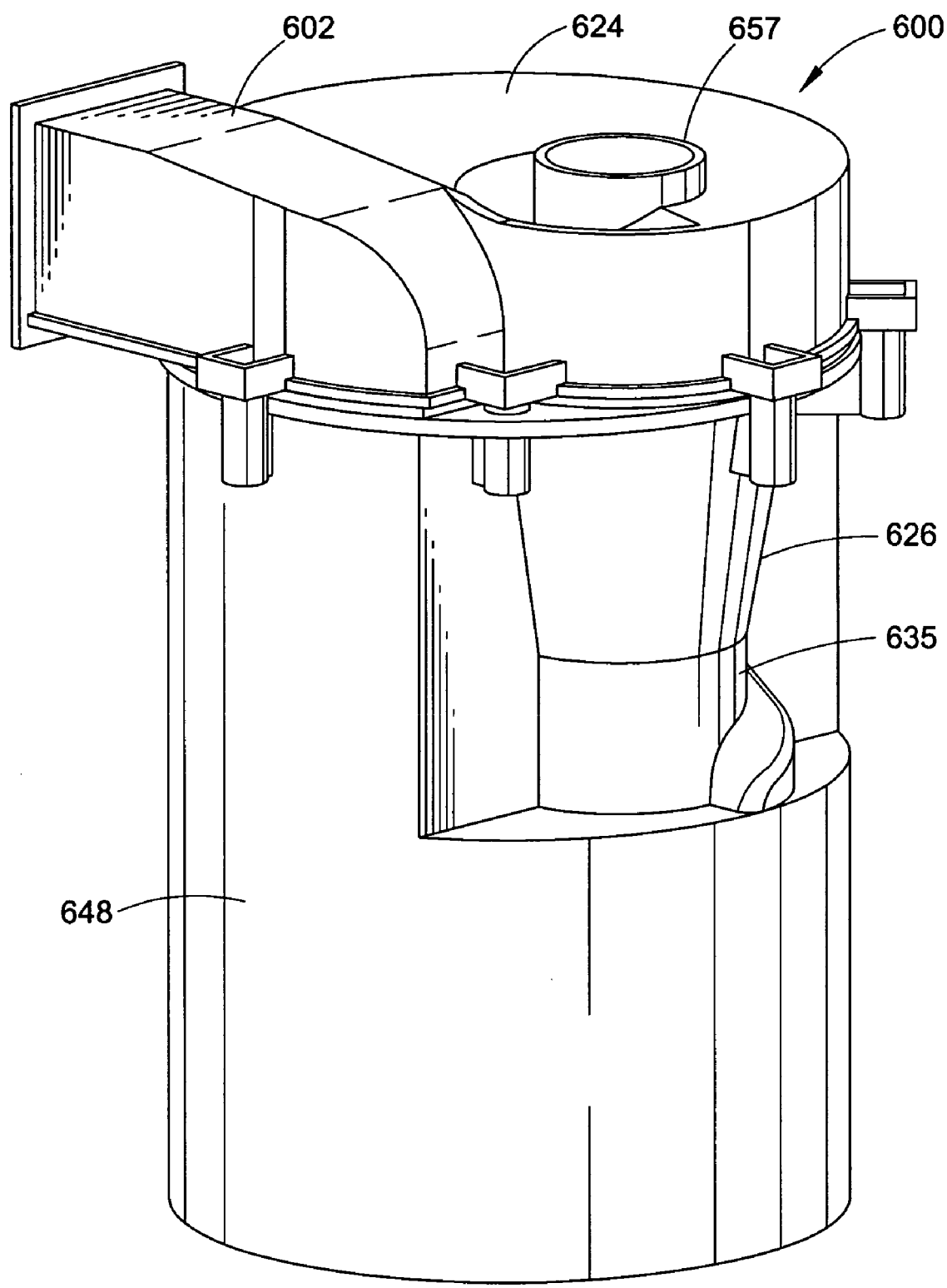
FIG. 63 is a top perspective view of an assembly including a dirt cup, a cyclone with a helical ramp entry and a slinger portion.
Figure 64:
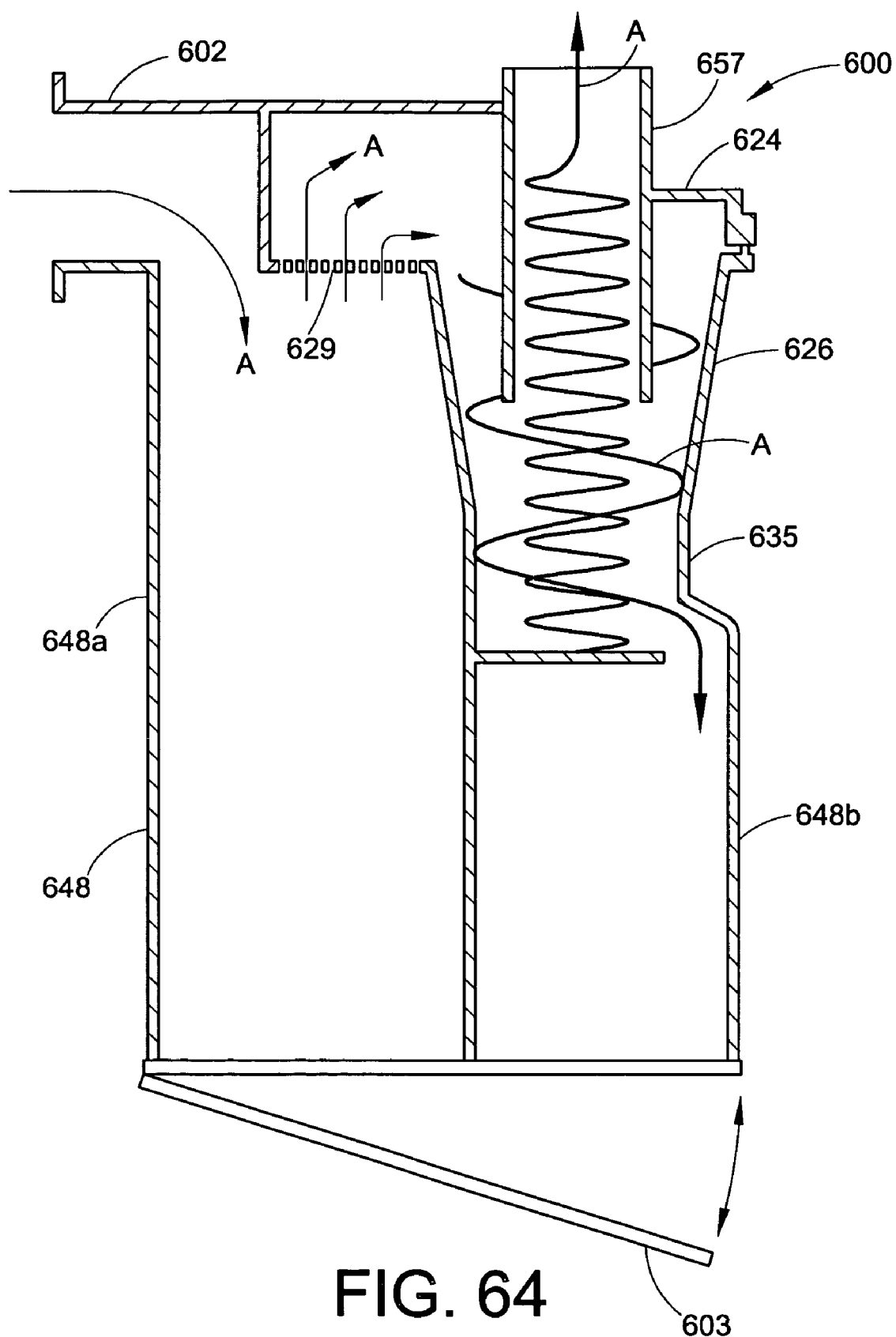
FIG. 64 is a sectional view of the assembly shown in FIG. 63, illustrating the two chambers of the dirt cup and the flow of the airstream through the assembly.

Yet another embodiment is illustrated in FIGS. 63 and 64, where an assembly 600 includes a dirt cup 648 having two chambers 648a and 648b. The airstream A initially enters the first chamber 648a via passage 602, and very large and very dense particles are removed from the airstream by a filter 629 such as the perforated screen shown in FIG. 64 to be stored in the first chamber 648a. Other potentially useful filters 629 include foam filters, paper filters, a series of slots, and the like. From the first chamber 648a the airstream A is carried to a cyclone 626, entering through a helical entry ramp 624 to travel down to a slinger portion 635 all as described above. Fine dirt and debris falls down into the second chamber 648b, with the filter airstream exiting through cyclone outlet 657. Dirt and debris may be emptied from the assembly 600 by pivotally opening up the bottom wall 603 which is normally held closed by a latch mechanism (not shown). The assembly 600 may be fitted into an upright body of a vacuum cleaner, having ports corresponding to passage 602 and cyclone outlet 657 to maintain a suction airstream. The upright body may include additional filtration stages, as described above.

This written description and the accompanying drawings concern an upright vacuum cleaner. The general principles of the device, however, may be used in any type of vacuum cleaner, including a canister vacuum cleaner, a central vacuum cleaner, a stick vacuum cleaner, or any combination wet/dry cleaning apparatus. For example, the cyclone/slinger portion combination may easily be incorporated into a canister vacuum cleaner body with a flexible hose connecting the canister body to a nozzle section.

While the present invention has been illustrated by the description of embodiments thereof, and while the embodiments have been described in considerable detail, it is not the intention of the applicants to restrict or in any way limit the scope of their claimed invention to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicants' general inventive concept. In particular, the system of dust separation described in this application transcends application to vacuum cleaner products and could be successfully adapted to any of a wide variety of cyclonic dust separating needs.

We claim:

1. A vacuum cleaner comprising:
a body portion;
a nozzle portion having a nozzle opening with a first conduit leading from the nozzle opening to the body portion;
a cyclone having a cyclone inlet, a cyclone outlet, and a cyclone slinger, wherein the first conduit leads to the cyclone inlet and the cyclone is configured to contain a swirling airflow traveling from the cyclone inlet through the cyclone slinger and out the cyclone outlet, and the cyclone slinger comprises
a bottom platform, a peripheral wall extending upwardly from the bottom platform and having one or more side ports, and a slinger passage leading away from at least one of the one or more side ports of the peripheral wall, the slinger passage leading to a bottom port opening substantially downwardly; and a dirt cup removably retained within the body portion underneath the cyclone slinger for retaining dirt or other debris exiting from the cyclone slinger through the bottom port; and a suction source disposed in the body portion or the nozzle portion for generating the airflow within the vacuum cleaner, wherein a second conduit leads from the cyclone outlet to an inlet of the suction source.

2. A vacuum cleaner as in claim 1, wherein the second conduit includes a filter chamber containing a main filter.

3. A vacuum cleaner as in claim 2, wherein the filter chamber comprises a front plenum and a back plenum, wherein the front plenum is defined between a front wall of the filter chamber and the main filter, and the back plenum is defined between a back wall of the filter chamber and the main filter.

4. The vacuum cleaner as in claim 3, further comprising a filter chamber inlet and a transfer passage for carrying an airflow from the filter chamber inlet to the front plenum.

5. A vacuum cleaner as in claim 3, wherein the main filter is positioned within a filter chamber door which, when opened, exposes a clean side of the main filter for handling by a user.

6. The vacuum cleaner as in claim 1, wherein the slinger passage comprises a ceiling that slopes downwardly in both a radial and a tangential direction.

7. The vacuum cleaner as in claim 6, wherein a deflector wall is disposed at an end of the slinger passage proximate to the bottom port.

8. The vacuum cleaner as in claim 7, wherein the deflector wall is slanted in a direction opposite to the rotational direction of the swirling airflow in the cyclone.

9. A vacuum cleaner as in claim 1, further comprising a lid on the dirt cup, the lid having a top surface and an aperture, wherein the top surface of the lid forms the bottom platform of the cyclone slinger and the aperture of the lid forms the bottom port of the cyclone slinger, wherein the lid is selectively attached to the dirt cup, and removable from the body portion with the dirt cup.

10. A vacuum cleaner as in claim 1, wherein a center tube forms the cyclone outlet, and the vacuum cleaner further comprises an inner tube slidingly fitted into the center tube and having a top opening and a bottom opening, with a filter affixed across the bottom opening.

11. A vacuum cleaner as in claim 1, further including a second slinger passage leading away from a second side port in the peripheral wall of the cyclone slinger.

12. A vacuum cleaner comprising:
a body portion;
a nozzle portion having a nozzle opening with a first conduit leading from the nozzle opening to the body portion;
the body portion including a cyclone having a cyclone inlet, a cyclone outlet, and a cyclone slinger, wherein the first conduit leads to the cyclone inlet and the cyclone is configured to contain a swirling airflow traveling from the cyclone inlet through the cyclone slinger and out the cyclone outlet, and the cyclone slinger comprises:

a bottom platform,
a peripheral wall extending upwardly from the bottom platform and having at least a first side port and a second side port,
a first slinger passage leading away from the first side port and leading to a first bottom port opening substantially downwardly, and
a second slinger passage leading away from the second side port and leading to a second bottom port opening substantially downwardly;
a dirt cup removably retained within the body portion underneath the cyclone slinger for retaining dirt and other debris exiting from the cyclone slinger through the first or second bottom port; and
a suction source disposed in the body portion or the nozzle portion for generating the airflow within the vacuum cleaner, wherein a second conduit leads from the cyclone outlet to an inlet of the suction source.

13. A vacuum cleaner as in claim 12, wherein the second conduit includes a filter chamber containing a main filter.

14. A vacuum cleaner as in claim 13, wherein the filter chamber comprises a front plenum and a back plenum, wherein the front plenum is defined between a front wall of the filter chamber and the main filter, and the back plenum is defined between a back wall of the filter chamber and the main filter.

15. A vacuum cleaner as in claim 12 further comprising a lid on the dirt cup, the lid having a top surface and an aperture, wherein the top surface of the lid forms the bottom platform of the cyclone slinger and the aperture of the lid forms the bottom port of the cyclone slinger.

16. An upright vacuum cleaner comprising:
an upright body portion pivotally secured to a suction base;
a cyclone separator positioned in and axially extending along the upright body portion, wherein the cyclone separator has a top end and a bottom end;
the cyclone separator including a frustoconical portion having a tangential airstream entry at the top end, a central airstream exit at the top end, and a return air platform at the bottom end;
at least one slinger arm adjacent the bottom end of and fluidically connected to the cyclone separator, the slinger arm having at least one sidewall that extends generally tangentially and radially outwardly from the cyclone separator, a top wall, an end wall and a bottom outlet port; and
a dirt cup positioned below the cyclone separator to receive dirt separated from an airstream flowing through the cyclone separator, wherein the dirt passes downwardly through the bottom outlet port of the slinger arm to be received in the dirt cup such that the dirt is thereby isolated from the cyclone separator by the platform.

17. A vacuum cleaner comprising:
a cyclonic chamber to separate dirt from air, the cyclonic chamber having a slinger arm disposed at the bottom of the cyclonic chamber including a tangential inlet opening, a passage extending circumferentially, downwardly and radially outwardly from the inlet opening, and an outlet opening from the passage leading to a dirt cup;
and a filter view able through a door positioned downstream of the cyclonic chamber.

* * * * *